(12) United States Patent
Kimball et al.

(10) Patent No.: US 7,556,841 B2
(45) Date of Patent: Jul. 7, 2009

(54) METHOD OF APPLYING A DESIGN TO A SURFACE

(75) Inventors: James F. Kimball, Greenfield, WI (US); Eric J. Minor, Lake Villa, IL (US); Ketan N. Shah, Gurnee, IL (US); Marcia L. Santaga, Waterford, WI (US); Daniel R. Bullis, Jr., Madison, WI (US); Gafur Zainiev, West Bloomfield, MI (US); Douglas S. Rodenkirch, Sun Prairie, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 647 days.

(21) Appl. No.: 11/447,817

(22) Filed: Jun. 6, 2006

(65) Prior Publication Data

US 2007/0014921 A1      Jan. 18, 2007

Related U.S. Application Data

(60) Provisional application No. 60/687,953, filed on Jun. 7, 2005.

(51) Int. Cl.
*B05D 3/12* (2006.01)
(52) U.S. Cl. .................. 427/292; 510/278; 427/501; 427/513; 427/514
(58) Field of Classification Search .............. 427/292, 427/501, 513, 514; 510/278
See application file for complete search history.

(56) References Cited

U.S. PATENT DOCUMENTS

| | | | |
|---|---|---|---|
| 3,030,227 A | 4/1962 | Clifford et al. | |
| 3,595,166 A | 7/1971 | Sherman | |
| 3,663,262 A | 5/1972 | Cogan | |
| 3,716,330 A | 2/1973 | Kitamura et al. | |

(Continued)

FOREIGN PATENT DOCUMENTS

DE       2122714       10/1972

(Continued)

OTHER PUBLICATIONS www.coloryourcarpet.com, Home Page (3 pages).

(Continued)

*Primary Examiner*—Roberts Culbert

(57) ABSTRACT

Compositions, methods, apparatuses, kits, and combinations are described for permanently or temporarily re-designing, decorating, and/or re-coloring a surface. The compositions useful in the present disclosure include a décor product that is formulated to be applied and affixed to a surface. If desired, the décor product may be substantially removed from the surface before being affixed thereto. If a user desires to remove the décor product, the décor product is formulated to be removed by a number of methods including, for example, vacuuming, wet extraction, chemical application, and the like. If the user desires to affix the décor product to the surface in a permanent or semi-permanent manner, the décor product may be affixed to the surface by applying energy thereto in the form of, for example, heat, pressure, emitted waves, an emitted electrical field, a magnetic field, and/or a chemical. The décor product may also be utilized in the form of a kit or in conjunction with a design device, such as a stencil, to control the application of the décor product to create, for example, a pattern on the surface.

40 Claims, 12 Drawing Sheets

U.S. PATENT DOCUMENTS

| | | |
|---|---|---|
| 3,723,323 A | 3/1973 | Morgan et al. |
| 3,849,159 A | 11/1974 | Palmer et al. |
| 3,867,171 A | 2/1975 | Ellsworth |
| 3,910,848 A | 10/1975 | Froehlich et al. |
| 3,929,068 A | 12/1975 | Budden et al. |
| 3,945,791 A | 3/1976 | Bohrn |
| 4,006,273 A | 2/1977 | Wolinski et al. |
| 4,013,594 A | 3/1977 | Froehlich et al. |
| 4,046,505 A | 9/1977 | Cobb et al. |
| 4,085,159 A | 4/1978 | Marsiat |
| 4,089,722 A | 5/1978 | Holoubek |
| 4,129,669 A | 12/1978 | Lopez et al. |
| 4,131,422 A | 12/1978 | Thomas et al. |
| 4,140,728 A | 2/1979 | Hahn et al. |
| 4,147,737 A | 4/1979 | Sein et al. |
| 4,180,527 A | 12/1979 | Schmid et al. |
| 4,195,140 A | 3/1980 | Sexsmith et al. |
| 4,239,490 A | 12/1980 | Kelly et al. |
| 4,243,565 A | 1/1981 | Nishino et al. |
| 4,263,352 A | 4/1981 | Kaltenbach et al. |
| 4,397,650 A | 8/1983 | Gregorian et al. |
| 4,471,108 A | 9/1984 | Belder et al. |
| 4,560,604 A | 12/1985 | Shimizu et al. |
| 4,568,606 A | 2/1986 | Hart et al. |
| 4,604,308 A | 8/1986 | Widmer et al. |
| 4,659,494 A | 4/1987 | Soldanski et al. |
| 4,681,791 A | 7/1987 | Shibahashi et al. |
| 4,713,084 A | 12/1987 | Bohrn et al. |
| 4,778,742 A | 10/1988 | Ong et al. |
| 4,782,672 A | 11/1988 | Secolo |
| 4,834,900 A | 5/1989 | Soldanski et al. |
| 4,836,828 A | 6/1989 | Hussamy |
| 4,871,604 A | 10/1989 | Hackler |
| 4,913,952 A | 4/1990 | Fowler |
| 4,960,433 A | 10/1990 | Renton |
| 4,965,172 A | 10/1990 | Matrick |
| 4,978,390 A | 12/1990 | Snedeker |
| 4,981,488 A | 1/1991 | Cates et al. |
| 4,990,369 A | 2/1991 | Burchill et al. |
| 5,010,131 A | 4/1991 | Wagner |
| 5,037,485 A | 8/1991 | Chromecek et al. |
| 5,041,488 A | 8/1991 | Meades |
| 5,047,261 A | 9/1991 | Moussa et al. |
| 5,057,392 A | 10/1991 | McCabe et al. |
| 5,064,443 A | 11/1991 | Ricci |
| 5,071,440 A | 12/1991 | Hines et al. |
| 5,091,213 A | 2/1992 | Silbermann et al. |
| 5,091,257 A | 2/1992 | Nonogaki et al. |
| 5,110,317 A | 5/1992 | Hangey et al. |
| 5,110,625 A | 5/1992 | Burchill et al. |
| 5,110,626 A | 5/1992 | Burchill et al. |
| 5,110,634 A | 5/1992 | Silbermann et al. |
| 5,112,715 A | 5/1992 | DeMejo et al. |
| 5,112,883 A | 5/1992 | Gallas |
| 5,116,243 A | 5/1992 | Wills |
| 5,122,404 A | 6/1992 | Fowler |
| 5,126,191 A | 6/1992 | Fourezon |
| 5,131,914 A | 7/1992 | Kelley |
| 5,131,918 A | 7/1992 | Kelley |
| 5,143,754 A | 9/1992 | Long et al. |
| 5,147,747 A | 9/1992 | Wilson et al. |
| 5,164,226 A | 11/1992 | Burchill et al. |
| 5,176,745 A | 1/1993 | Moore et al. |
| 5,193,457 A | 3/1993 | Hahn |
| 5,199,957 A | 4/1993 | Pascoe |
| 5,217,255 A | 6/1993 | Lin et al. |
| 5,232,535 A | 8/1993 | Brinley |
| 5,238,465 A | 8/1993 | Fritzsche |
| 5,242,994 A | 9/1993 | Nield et al. |
| 5,250,634 A | 10/1993 | Toyoda et al. |
| 5,252,379 A | 10/1993 | Kuribayashi et al. |
| 5,258,471 A | 11/1993 | Nield et al. |
| 5,262,510 A | 11/1993 | Kwon et al. |
| 5,284,902 A | 2/1994 | Huber et al. |
| 5,298,035 A | 3/1994 | Okamoto |
| 5,302,223 A | 4/1994 | Hale |
| 5,321,063 A | 6/1994 | Shimada et al. |
| 5,330,627 A | 7/1994 | Grütter et al. |
| 5,355,793 A | 10/1994 | Sato |
| 5,362,417 A | 11/1994 | Ziolo |
| 5,374,687 A | 12/1994 | Cooperman et al. |
| 5,379,947 A | 1/1995 | Williams et al. |
| 5,453,459 A | 9/1995 | Roberts |
| 5,456,725 A | 10/1995 | Bruhnke |
| 5,460,881 A | 10/1995 | Hsu |
| 5,462,996 A | 10/1995 | Portelli et al. |
| 5,466,527 A | 11/1995 | Jenkins |
| 5,472,764 A | 12/1995 | Kehr et al. |
| 5,525,125 A | 6/1996 | Cole et al. |
| 5,536,762 A | 7/1996 | Hinojosa |
| 5,571,444 A | 11/1996 | Fisher et al. |
| 5,575,877 A | 11/1996 | Hale et al. |
| 5,576,361 A | 11/1996 | Craun |
| 5,578,245 A | 11/1996 | Ziolo |
| 5,587,408 A | 12/1996 | Burns et al. |
| 5,589,256 A | 12/1996 | Hansen et al. |
| 5,601,023 A | 2/1997 | Hale et al. |
| 5,603,735 A | 2/1997 | Zimin, Sr. et al. |
| 5,626,634 A | 5/1997 | Goldmann et al. |
| 5,637,654 A | 6/1997 | Panandiker et al. |
| 5,640,180 A | 6/1997 | Hale et al. |
| 5,674,923 A | 10/1997 | Subbaraman et al. |
| 5,681,620 A | 10/1997 | Elgarhy |
| 5,698,303 A | 12/1997 | Caldwell |
| 5,708,039 A | 1/1998 | Daly et al. |
| 5,734,396 A | 3/1998 | Hale et al. |
| 5,760,122 A | 6/1998 | Susa et al. |
| 5,763,016 A | 6/1998 | Levenson et al. |
| 5,800,866 A | 9/1998 | Myers et al. |
| 5,851,595 A | 12/1998 | Jones, Jr. |
| 5,852,072 A | 12/1998 | Banning et al. |
| 5,869,172 A | 2/1999 | Caldwell |
| 5,876,792 A | 3/1999 | Caldwell |
| 5,879,746 A | 3/1999 | Tomihashi et al. |
| 5,908,663 A | 6/1999 | Wang et al. |
| 5,919,858 A | 7/1999 | Loftin |
| 5,922,088 A | 7/1999 | Cole et al. |
| 5,929,145 A | 7/1999 | Higgins et al. |
| 5,955,523 A | 9/1999 | Stephens et al. |
| 5,958,137 A | 9/1999 | Caldwell et al. |
| 5,958,547 A | 9/1999 | Fukunishi et al. |
| 5,968,689 A | 10/1999 | Torikoshi et al. |
| 5,981,021 A | 11/1999 | McCulloch |
| 5,989,638 A | 11/1999 | Nielsen |
| 6,007,955 A | 12/1999 | Verhecken et al. |
| 6,024,770 A | 2/2000 | De Lathauwer |
| 6,032,576 A | 3/2000 | Collins |
| 6,036,726 A | 3/2000 | Yang et al. |
| 6,040,359 A | 3/2000 | Santini et al. |
| 6,069,221 A | 5/2000 | Chasser et al. |
| 6,073,554 A | 6/2000 | Cutcher, Sr. |
| 6,090,447 A | 7/2000 | Suzuki et al. |
| 6,121,408 A | 9/2000 | Aoki et al. |
| 6,136,046 A | 10/2000 | Fukunishi et al. |
| 6,147,041 A | 11/2000 | Takahashi et al. |
| 6,194,106 B1 | 2/2001 | Bretscher et al. |
| 6,207,768 B1 | 3/2001 | Sato et al. |
| 6,211,308 B1 | 4/2001 | Saint Victor |
| 6,214,898 B1 | 4/2001 | Barrio et al. |
| 6,251,987 B1 | 6/2001 | Sacripante et al. |
| 6,254,995 B1 | 7/2001 | Kohno et al. |
| 6,284,845 B1 | 9/2001 | Panandiker et al. |
| 6,294,222 B1 | 9/2001 | Cohen et al. |
| 6,294,610 B1 | 9/2001 | Daly et al. |

| | | |
|---|---|---|
| 6,306,930 B1 | 10/2001 | Tsujio |
| 6,314,875 B1 | 11/2001 | Steenbergen |
| 6,341,856 B1 | 1/2002 | Thompson et al. |
| 6,348,679 B1 | 2/2002 | Ryan et al. |
| 6,348,939 B1 | 2/2002 | Xu et al. |
| 6,352,563 B1 | 3/2002 | Kusaki et al. |
| 6,358,461 B1 | 3/2002 | Law et al. |
| 6,376,589 B1 | 4/2002 | Tanaka et al. |
| 6,443,996 B1 | 9/2002 | Mihelich et al. |
| 6,458,192 B1 | 10/2002 | Tsujio |
| 6,488,719 B2 | 12/2002 | Lomasney et al. |
| 6,497,936 B1 | 12/2002 | Desai et al. |
| 6,506,221 B1 | 1/2003 | Macholdt et al. |
| 6,506,445 B2 | 1/2003 | Popat et al. |
| 6,509,555 B1 | 1/2003 | Riess et al. |
| 6,533,824 B1 | 3/2003 | Roper |
| 6,539,856 B2 | 4/2003 | Jones et al. |
| 6,585,369 B1 | 7/2003 | Sievert et al. |
| 6,593,401 B1 | 7/2003 | Yu et al. |
| 6,600,142 B2 | 7/2003 | Ryan et al. |
| 6,602,566 B2 | 8/2003 | Steenbergen |
| 6,618,066 B2 | 9/2003 | Hale et al. |
| 6,623,576 B2 | 9/2003 | Mitchell et al. |
| 6,645,569 B2 | 11/2003 | Cramer et al. |
| 6,649,317 B2 | 11/2003 | Wagner et al. |
| 6,649,888 B2 | 11/2003 | Ryan et al. |
| 6,653,265 B2 | 11/2003 | Rossi et al. |
| 6,673,503 B2 | 1/2004 | Wagner et al. |
| 6,686,314 B2 | 2/2004 | Xu et al. |
| 6,703,089 B2 | 3/2004 | DeProspero et al. |
| 6,719,467 B2 | 4/2004 | Hess et al. |
| 6,723,413 B2 | 4/2004 | Walters |
| 6,723,428 B1 | 4/2004 | Foss et al. |
| 6,743,848 B2 | 6/2004 | Nakahara et al. |
| 6,770,285 B2 | 8/2004 | Keenan et al. |
| 6,779,443 B2 | 8/2004 | Martinez et al. |
| 6,790,819 B2 | 9/2004 | Trinh et al. |
| 6,841,244 B2 | 1/2005 | Foss et al. |
| 6,844,392 B2 | 1/2005 | Suman |
| 6,849,370 B2 | 2/2005 | Wagner et al. |
| 6,863,933 B2 | 3/2005 | Cramer et al. |
| 6,872,443 B2 | 3/2005 | Franke |
| 6,872,444 B2 | 3/2005 | McDonald et al. |
| 6,887,640 B2 | 5/2005 | Zhang et al. |
| 6,887,916 B2 | 5/2005 | Zhou et al. |
| 6,890,974 B2 | 5/2005 | Park et al. |
| 6,893,662 B2 | 5/2005 | Dittmar et al. |
| 6,894,090 B2 | 5/2005 | Shinzo et al. |
| 6,916,774 B2 | 7/2005 | Trinh et al. |
| 6,927,253 B2 | 8/2005 | Lassmann et al. |
| 6,936,075 B2 | 8/2005 | Vogt et al. |
| 6,951,670 B2 | 10/2005 | Stroppiana |
| 6,977,098 B2 | 12/2005 | Gurer et al. |
| 6,977,111 B2 | 12/2005 | Yamaguchi et al. |
| 6,992,028 B2 | 1/2006 | Thomaschefsky et al. |
| 7,008,889 B2 | 3/2006 | Black et al. |
| 7,018,429 B1 | 3/2006 | Wenstrup |
| 7,022,377 B2 | 4/2006 | Kanada et al. |
| 7,041,424 B2 | 5/2006 | Xu et al. |
| 7,105,597 B2 | 9/2006 | Soda et al. |
| 7,108,728 B2 | 9/2006 | Sunamori et al. |
| 7,112,621 B2 | 9/2006 | Rohrbaugh et al. |
| 7,186,450 B2 | 3/2007 | Foxon |
| 7,264,861 B2 | 9/2007 | Zafiroglu et al. |
| 7,279,212 B2 | 10/2007 | Foxon |
| 2001/0051222 A1 | 12/2001 | Stevenson et al. |
| 2002/0040503 A1 | 4/2002 | Pace et al. |
| 2002/0046433 A1 | 4/2002 | Sellman, Jr. et al. |
| 2002/0077261 A1 | 6/2002 | Hwang et al. |
| 2003/0092589 A1 | 5/2003 | Todini et al. |
| 2003/0134114 A1 | 7/2003 | Pallotta et al. |
| 2003/0157377 A1 | 8/2003 | Muthiah |
| 2003/0194560 A1 | 10/2003 | Spera et al. |
| 2004/0076788 A1 | 4/2004 | Steinhardt et al. |
| 2004/0118305 A1 | 6/2004 | Martinez et al. |
| 2004/0154106 A1 | 8/2004 | Oles et al. |
| 2004/0177452 A1 | 9/2004 | Donaldson et al. |
| 2004/0180230 A1 | 9/2004 | Muthiah |
| 2004/0200564 A1 | 10/2004 | Kinsey et al. |
| 2004/0230008 A1 | 11/2004 | Correll et al. |
| 2005/0089540 A1 | 4/2005 | Uchiyama et al. |
| 2005/0090627 A1 | 4/2005 | Wenning et al. |
| 2005/0095933 A1 | 5/2005 | Kimbrell et al. |
| 2005/0123743 A1 | 6/2005 | Martinazzo |
| 2005/0155693 A1 | 7/2005 | Zafiroglu |
| 2005/0183207 A1 | 8/2005 | Chan et al. |
| 2005/0187124 A1 | 8/2005 | Li et al. |
| 2005/0199152 A1 | 9/2005 | Hale et al. |
| 2006/0009591 A1 | 1/2006 | Wu |
| 2006/0051571 A1 | 3/2006 | Steinhardt et al. |
| 2006/0134384 A1 | 6/2006 | Vinson et al. |
| 2006/0135668 A1 | 6/2006 | Hayes |
| 2006/0165979 A1 | 7/2006 | Kinsey et al. |
| 2006/0165989 A1 | 7/2006 | Takikawa et al. |
| 2007/0054819 A1 | 3/2007 | Li et al. |
| 2007/0082171 A1 | 4/2007 | Fulton |
| 2007/0232179 A1 | 10/2007 | Polat et al. |
| 2007/0270064 A1 | 11/2007 | Aseere |
| 2007/0275207 A1 | 11/2007 | Higgins et al. |
| 2007/0286982 A1 | 12/2007 | Higgins et al. |
| 2008/0032912 A1 | 2/2008 | Warr et al. |
| 2008/0131647 A1 | 6/2008 | Shimizu et al. |

FOREIGN PATENT DOCUMENTS

| | | |
|---|---|---|
| DE | 102 24 984 | 12/2003 |
| EP | 0 103 407 | 8/1986 |
| EP | 0 103 344 | 10/1988 |
| EP | 0 307 624 | 3/1989 |
| EP | 0 569 921 | 11/1993 |
| EP | 0 752 498 | 1/1997 |
| EP | 0 803 351 | 10/1997 |
| EP | 0 993 876 | 4/2000 |
| EP | 1 132 439 | 9/2001 |
| EP | 1 283 296 | 2/2003 |
| GB | 531766 | 1/1941 |
| GB | 669739 | 4/1952 |
| GB | 721827 | 1/1955 |
| GB | 774078 | 5/1957 |
| GB | 1 366 343 | 9/1974 |
| GB | 1 461 049 | 1/1977 |
| GB | 2152841 A | 8/1985 |
| JP | 01 111081 | 4/1989 |
| JP | 2002142956 | 5/2002 |
| WO | WO98/08915 | 3/1998 |
| WO | WO 2004/066793 | 1/2004 |

OTHER PUBLICATIONS

U.S. Appl. No. 11/447,787, Office Action dated Dec. 28, 2006.
U.S. Appl. No. 11/447,787, Office Action dated Feb. 14, 2008.
Intl. Search Report and Written Opinion dated Oct. 23, 2006, Appl. No. PCT/US 2006/021885.
Intl. Search Report and Written Opinion dated Feb. 28, 2007, Appl. No. PCT/US 2006/021884.
U.S. Appl. No. 11/447,787, Office Action dated Dec. 13, 2007.
Intl. Search Report and Written Opinion dated Jul. 20, 2007, PCT/US2006/021848.
Non-final Office action, dated Feb. 10, 2009, for U.S. Appl. No. 11/799,805, filed May 3, 2007, by K. Shah et al.
Non-final Office action, dated Apr. 9, 2009, for application No. 11447694, filed Jun. 6, 2006.

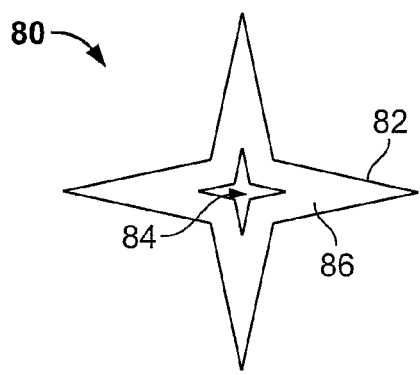
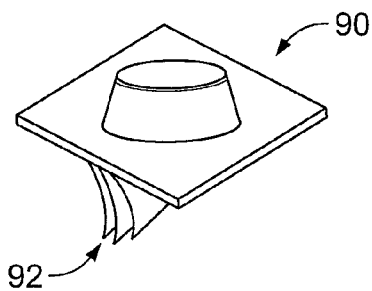
FIG. 7          FIG. 8
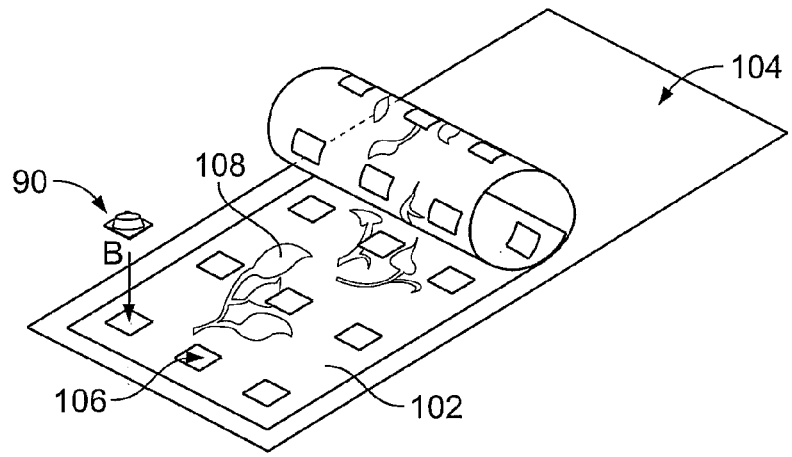
FIG. 9
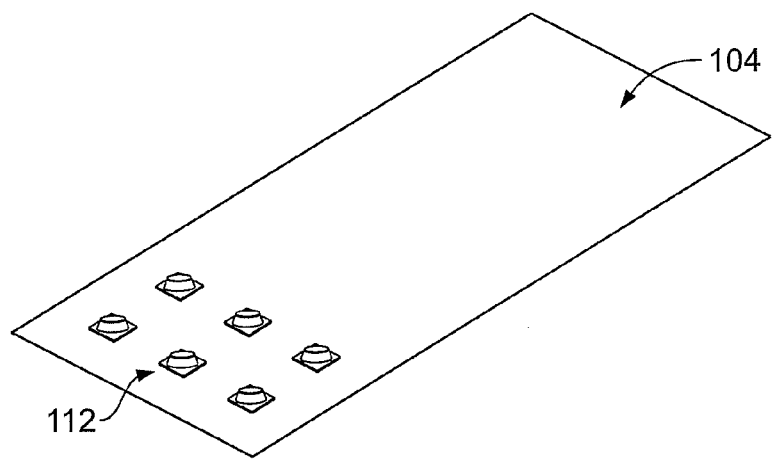
FIG. 10

METHOD OF APPLYING A DESIGN TO A SURFACE

CROSS REFERENCE TO RELATED APPLICATIONS

This application claims the benefit of U.S. Provisional Application Ser. No. 60/687,953, filed Jun. 7, 2005, and is hereby incorporated herein by reference in its entirety.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

Enhancement of surfaces that may be permanently or temporarily re-designed, decorated, and/or re-colored is disclosed herein.

2. Description of the Background of the Invention

Improving the aesthetics in homes has long been practiced by many consumers. There is a plethora of home products and techniques for cleaning surface areas of soft surfaces such as carpets, rugs, draperies, curtains, upholstery, and the like. However, for more sullied and/or worn surfaces, subtractive processes (for example, a process that chemically or physically removes something from the carpet, such as cleaning or shaving) cannot truly restore the surface to its original state; this is often very frustrating for consumers. Oftentimes, spots and stains reappear after treatment.

Additive processes (for example, a process that layers, covers, or masks something undesirable underneath) and techniques for improving the aesthetics of surfaces include painting, faux painting, stenciling, bordering, wallpapering, tiling, wainscoting, paneling, decorative plastering, adding appliqués (for example, pictures, cut-outs, stickers, or the like), laminating, and molding (for example, crown, shoe, and chair) are also known. However, these products and techniques have not been applied to soft surfaces such as carpets, rugs, draperies, curtains, upholstery, and the like.

In some instances, color of worn, faded fabric is restored or rejuvenated with a composition containing water soluble and/or water dispersible polymers and a surfactant capable of forming a bilayer structure to provide a more durable color restoration and/or color rejuvenation benefit that lasts at least after one washing cycle, preferably at least after two or more washing cycles. The composition may be applied to the fabric by a spray container.

In other instances, a method of redyeing partially bleached fabric or garments includes dyeing the fabric or garment with a background color and then gathering an area to restrict access to further reagents. The gathered area is then bleached to remove the background colors from the area outside the gathered area and then the bleached areas are redyed with a second color.

In yet further instances, a digital printing device has a rotatable wheel, a liquid dispenser for depositing a liquid paint, ink, or dye on the wheel along an outer edge, and an air jet positioned adjacent the outer edge for removing the liquid from the outer edge and directing the liquid toward a print medium as the wheel rotates through the air jet. A plurality of devices is used to produce a full color digital image.

SUMMARY OF THE INVENTION

According to one aspect of the present disclosure, a method of applying a composition to a surface includes applying an effective amount of a composition in a preselected pattern to a selected surface to affect a color change thereon. The composition includes a colorant, a surface-active agent, at least one of a polymer or a resin, and at least about 70 wt % of a liquid. The method further includes allowing the composition to substantially dry on the surface to form substantially dry particles greater than about 1 micron in size attached to the surface and applying energy to the substantially dry particles to achieve a film greater than about 0.1 micron in thickness on the surface.

According to a further aspect of the present disclosure, a method of applying a colorant to a surface includes applying an effective amount of a liquid-based composition containing a colorant in a preselected pattern to a selected surface to affect a color change thereon. The liquid-based composition is formulated to be applied in the effective amount to a nylon test carpet and to substantially dry to form particles greater than about 1 micron in size attached thereto, and upon vacuuming of the nylon test carpet resulting in a $\Delta E$ of about 20 or less.

BRIEF DESCRIPTION OF THE DRAWINGS

FIG. 7 is a plan view of a design device having a peripheral design as well as a cutout portion according to one embodiment;

FIG. 8 is a perspective view of a peg that may be used in a method for orientating a design device on a surface according to one embodiment;

FIG. 9 is a perspective view of a layout tool used to orient pegs on a surface according to one embodiment;

FIG. 10 is a perspective view of pegs arrayed on a surface according to one embodiment;

DETAILED DESCRIPTION OF THE PREFERRED EMBODIMENTS

Figure 1:
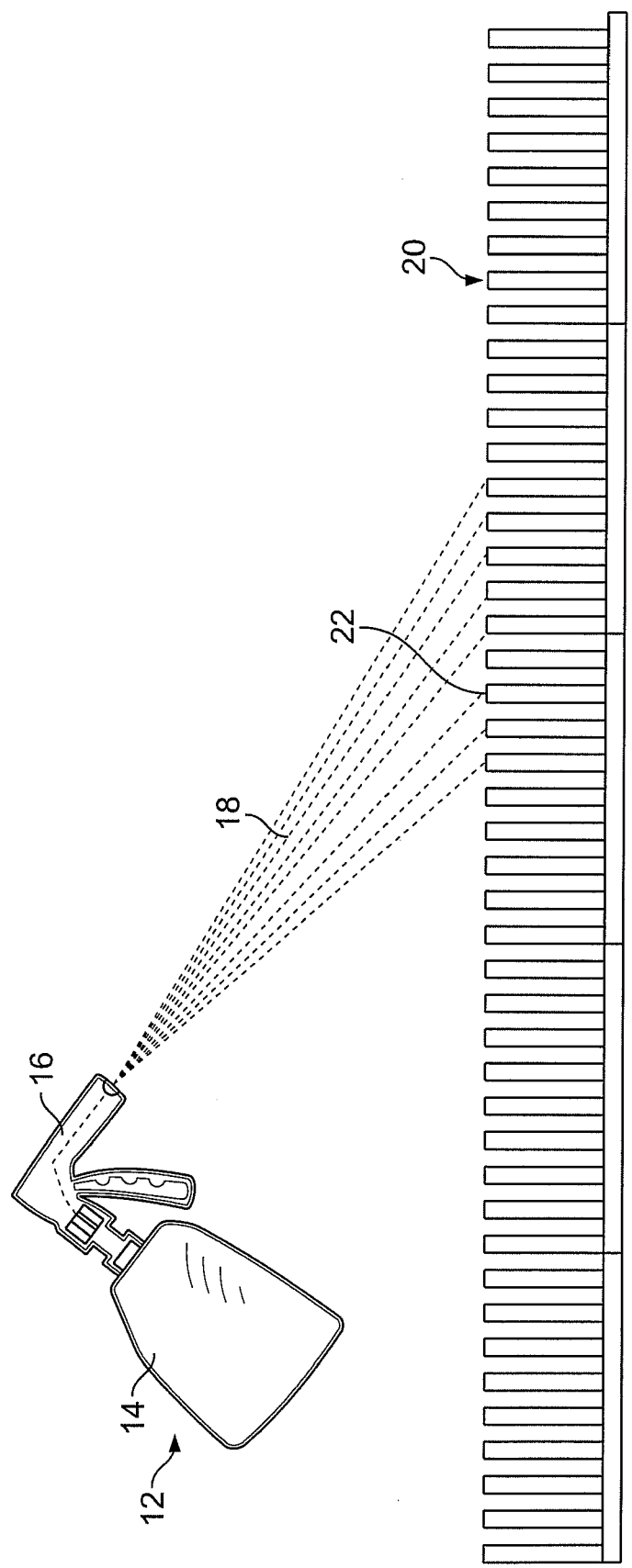
FIG. 1 is an illustration of one possible method of applying a décor product to a surface.

The present disclosure is directed to compositions, methods, apparatuses, kits, and combinations, for permanently or temporarily re-designing, decorating, and/or re-coloring a surface. While several specific embodiments are discussed herein, it is understood that the present disclosure is to be considered only as an exemplification of the principles of the invention, and it is not intended to limit the disclosure to the embodiments illustrated.

For example, a composition useful in the present disclosure includes a décor product that is formulated to be applied and affixed to a surface. As discussed more fully below, if desired, the décor product may be substantially removed from the surface before being affixed thereto. If a user desires to remove the décor product, the décor product is formulated to be removed by a number of methods including, for example, vacuuming, wet extraction, chemical application, and the like. If the user desires to affix the décor product to the surface in a permanent or semi-permanent manner, the décor product may be affixed to the surface by applying energy thereto in the form of, for example, heat, pressure, emitted waves, an emitted electrical field, a magnetic field, and/or a chemical. The décor product may also be utilized in the form of a kit or in conjunction with a design device, such as a stencil, to control the application of the décor product to create, for example, a pattern on the surface.

Any surface is contemplated to which the décor product may be applied and/or affixed, including, for example, soft surfaces such as carpets, rugs, draperies, curtains, upholstery, and the like. In addition, the décor product may be applied to hard surfaces as well, including, for example, wood, metal, ceramic, glass, a polymer, a hard floor tile, a painted surface, paper, masonry material, rock, a fiber/composite material, rubber, concrete, and the like. It is contemplated that the décor product may be applied to any prepared surface, including, for example, pre-dyed, post-dyed, pre-manufactured, and post-manufactured surfaces. Further, the décor product may be applied during the manufacturing process of a particular good or object that includes a surface in which the décor product may be applied. Surfaces to which the décor product may be applied and/or affixed may be substantially dry, substantially wet, moist, or humid depending on the particular décor product utilized. Further, a décor product of the present disclosure may be applied to a substantially flat, smooth, and/or level surface or any other surface including rough, bumpy, non-smooth, stepped, sloped, slanted, inclined, declined, and/or disturbed surfaces.

Examples of carpets to which the décor product may be applied and/or affixed include modular tiles and panels such as Milliken LEGATO®, Milliken TESSERAE®, INTER-FACEFLOR™, Tandus/C&A floorcovering, and from manufacturers such as Mohawk Industries and Shaw Industries, Inc. Additional examples of carpets include broadloom carpets, cut pile (velvet/plush, Saxony, frieze, shag), loop pile (level loop, multi-level loop, and Berber), and cut and loop pile (random sheared and tip sheared) carpets. Additional examples of soft surfaces to which a décor product may be applied and/or affixed thereto include, for example, area rugs (hand woven or machine woven), draperies, curtains, upholstery, and cellulosic materials, among others. Constituent materials of candidate soft surfaces include, for example, natural fibers such as wool and cotton, or synthetic fibers such as nylon 6, nylon 6-6, polyester, polypropylene (olefin), and acrylic, among others.

Decor products of the present disclosure may be formulated, designed, produced, manufactured, applied, removed, and/or packaged by any formulaic, chemical, and/or physical preparation appropriate for the specific embodiment desired, as would only be limited by the inherent nature of the constituent ingredients. Illustrative formulations of the décor products include a solid that may be dissolved or dispersed in a liquid to make a liquid-based décor product, a liquid carrier, an emulsion, a suspension, a colloid, a sol, a dispersion, a solution, a gel, a paste, a foam, a powder, a spray, a tablet, a solid, a gas, a diluent such as water or other solvent, an aerosol, and combinations thereof. Examples of chemical preparations include polyester polymerizations, latex aggregation, chemical milling, and microencapsulation, and other methods known to those skilled in the art. Physical preparation may consist of physically grinding the décor product ingredients or other means known to those skilled in the art. Décor products may be either synthesized from a molecular route, in which polymer resin molecules incorporate colorants, dyes, and/or pigment particles at the molecular scale, such as in the method of manufacture used in chemically prepared toners, or the resin and pigment particles may be physically blended together and crushed to appropriate size by mechanical means known to those skilled in the art.

The décor product may be chosen based on any number of criteria, including, but not limited to the surface type, condition, and/or composition to which the décor product is applied and/or affixed thereto. Further criteria for choosing a décor product include desired lightfastness, color range, intensity, uniformity of colorant, and/or desired curative and/or fixation properties of the décor product. Additional choice factors include enhancement of the appearance and/or feel of the carpet or other surface, masking a stain (for example, by laying an area rug-type décor product), or value adding to a surface (for example, to extend the life of a carpet).

A décor product useful in the present disclosure may comprise any one or combination of a colorant that includes, for example, a coloring agent, a dye, an ink, a toner, a paint, a patch, a carpet glitter, a fluorescent material, a composite thermal transfer sheet, a particle, a coating, a pigment, a luminescent material, a microparticle, magnetically responsive particles, a virtual colorant which is not colored until activated, and/or a colorant with hybrid pigment molecules, an additive, and combinations thereof. Illustratively, a décor product composition contains a colorant in an amount of greater than about 0.01% or less than about 95%, or between about 0.01% to about 70%, or between about 0.03% to about 15%, or about 0.05% to about 10%, or between about 0.1% to about 5%, of the total weight of the décor product.

Any imaginable color of the décor product is contemplated in the present disclosure including, but not limited to cyan, yellow, magenta, black, green, orange, violet, blue, red, purple, white silver, gold, metallic, clear, neutral, or non-neutral, and any combination thereof. Color may be imparted to the décor product by combining varying amounts of monochromic décor product particles of different colors or by combining varying amounts of polychromic décor product particles having different colors. Further, a specific décor product color may be achieved by combining predetermined amounts of monochromic particles of different colors or by combining predetermined amounts of polychromic décor product particles of different colors. In this way, all imaginable colors may be incorporated into the décor product.

The décor product may also comprise a virtual colorant that is not apparently colored until activated and/or deactivated. As an example, phosphorous containing colorants may be incorporated into a décor product to add special effects via fluorescent properties. Further, virtual colorants may add special visual effects by altering the apparent décor appearance according to light intensity, light angle, angle of view, and/or illumination of the décor product. Such activation of the virtual colorant includes, for example, exposing a phosphorous containing virtual colorant to various wavelengths of light. As known to those skilled in the art, phosphor containing compounds luminesce or fluoresce when exposed to light. When exposed to visible light, phosphor gives off visible white light. Exposure of a phosphor containing virtual colorant to sunlight may also make whites appear brighter because the ultraviolet light in sunlight gives the appearance that the whites in the virtual colorant glow brighter than "normal" white. When exposed to black light from, for example, a substantially ultraviolet-A wavelength emitting light bulb, phosphorous containing compounds glow with a purple hue. Black light can be provided, for example, from a tube black light that is basically a fluorescent lamp with a modified phosphor coating. This modified coating absorbs harmful shortwave ultraviolet-B and ultraviolet-C wavelengths and emits ultraviolet-A wavelengths. The tube of the tube black light is black so as to block most visible light while emitting mostly long-wave ultraviolet-A wavelengths. Another useful type of black light includes black light provided from an incandescent black light bulb. The black light emitting incandescent black light bulb is similar to a normal household light bulb, but incorporates a filter that absorbs most visible light while emitting infrared and ultraviolet-A light.

In a further embodiment, décor products containing virtual colorants may serve as night lights, indicate routes from room to room, exit routes, and/or escape routes.

Any number of products may be used in the décor product to impart reversible coloring to a surface. Such products include, for example, dyes, toners, powder paints, inks, and combinations thereof. Examples of dyes that may be used include water-based dyes such as LIQUIDTAINT™ and VERSATINT® by Milliken Chemical Company. Examples of toners that may be used include reactive toners such as powder toners. Examples of useful powder toners include those that are available from Sawgrass Technologies, Inc., such as NATURA™ powder toners, as well as the formulations and/or compositions individually disclosed in the U.S. Patents and published patent applications provided below in Table No. 1.

TABLE NO. 1

Powder toner formulations.

| Patent/Publication No. | Patent/Publication No. | Patent/Publication No. |
| --- | --- | --- |
| U.S. Pat. No. 6,649,317 | U.S. Pat. No. 5,644,988 | U.S. Pat. No. 5,248,363 |
| U.S. Pat. No. 6,673,503 | U.S. Pat. No. 6,425,331 | U.S. Pat. No. 6,686,314 |
| U.S. Pat. No. 6,618,066 | U.S. Pat. No. 6,439,710 | U.S. Pat. No. 6,631,984 |
| U.S. Pat. No. 6,840,614 | U.S. Pat. No. 6,450,098 | U.S. Pat. No. 6,894,087 |
| U.S. Pat. No. 6,849,370 | U.S. Pat. No. 5,246,518 | U.S. Pat. No. 6,794,426 |
| U.S. Pat. No. 6,887,640 | U.S. Pat. No. 5,302,223 | U.S. Pat. No. 6,759,450 |
| U.S. Pat. No. 5,734,396 | U.S. Pat. No. 5,746,816 | U.S. Pat. No. 6,737,450 |
| U.S. Pat. No. 5,488,907 | U.S. Pat. No. 6,341,856 | U.S. Pat. No. 6,710,102 |
| U.S. Pat. No. 5,487,614 | U.S. Pat. No. 6,152,038 | U.S. Pat. No. 6,664,311 |
| U.S. Pat. No. 5,601,023 | U.S. Pat. No. 6,348,939 | U.S. Pat. No. 6,348,679 |
| U.S. Pat. No. 5,642,141 | U.S. Pat. No. 6,402,313 | U.S. 2005/0123743 |
| U.S. Pat. No. 5,830,263 | U.S. Pat. No. 6,486,903 | U.S. Pat. No. 6,849,837 |
| U.S. Pat. No. 5,640,180 | U.S. Pat. No. 6,540,345 | U.S. Pat. No. 6,649,888 |
| U.S. Pat. No. 5,522,317 | U.S. Pat. No. 6,105,502 | U.S. Pat. No. 6,617,557 |
| U.S. Pat. No. 5,431,501 | U.S. Pat. No. 5,326,872 | U.S. Pat. No. 6,600,142 |
| U.S. Pat. No. 5,555,813 | U.S. Pat. No. 5,177,209 | U.S. Pat. No. 6,812,334 |
| U.S. Pat. No. 5,575,877 | U.S. Pat. No. 6,103,041 | U.S. Pat. No. 6,812,445 |
| U.S. Pat. No. 5,590,600 | U.S. Pat. No. 6,447,629 | U.S. Pat. No. 6,872,444 |

Toner particles useful in the present disclosure may have size characteristics of about 90% or more of the particles having a size less than about 100 microns, or less than about 25 microns, or less than about 10 microns, or from about 0.1 to about 50 microns, or from about 1 to about 20 microns, or from about 3 to about 10 microns, or from greater than about 750 nm to about 100 microns, or larger or smaller particle sizes depending on the desired application. In one embodiment, the toner particle melting point ranges from about 60° C. or less, to about 150° C. or higher, or from about 60° C. to about 275° C., or from about 25° C. to about 110° C., or from about 80° C. to about 100° C.

Other toners, compositions, additives, and curing processes useful in the present disclosure are disclosed in, for example, U.S. Pat. No. 6,850,725. Yet other toners, compositions, additives, and curing processes useful in the present disclosure are disclosed in, for example, U.S. Pat. No. 6,713,222. Still other toners, compositions, additives, and curing processes useful in the present disclosure are disclosed in, for example, U.S. Pat. No. 6,680,153.

Examples of powder paints that may be useful include those with epoxy, polyester, polyurethane, and hybrid chemistries either as additives or as décor particles, described hereinafter. An example of a hybrid chemistry contemplated for use is an epoxy-polyester hybrid, which is routinely used in the reactive powder coating industry. Typical particle sizes for powder paints can range, for example, from greater than about 20 microns to about 50 microns; however, for purposes of the present disclosure, larger and smaller sizes are contemplated and may depend on, for example, the reversibility and/or affixation properties desired. Typical powder paints may have melting point temperatures from around about 107° C. to about 163° C. to about 302° C.; however, lower and higher temperatures are contemplated within the present disclosure.

Further, the décor product may comprise a colorant with a hybrid pigment particle. An example of a hybrid pigment particle may be, for example, a dye and pigment combination. In this embodiment, the pigment molecule may coat a fiber surface, while the dye molecule penetrates the fiber.

In another embodiment, the décor product is formulated to include one or more thermoplastic resins, thermoset resins, colorants, additives, and/or liquid carriers. Examples of thermoplastic resins include polymeric materials such as polyesters, unsaturated polyesters, styrene-butadiene copolymers, polyurethanes, styrene-acrylates, and/or acrylics. Illustratively, thermoplastic and/or thermoset resins that may be useful in the present disclosure have a melting point of about 260° C. or less, for example.

In another embodiment, the décor product may include encapsulated décor product particles including, for example, nanoencapsulated, microencapsulated, macroencapsulated, and compartmentalized particles. Illustratively, microencapsulated décor product particles may include, for example, one or more outer shells, one or more inner compartments, one or more colorants, and/or one or more additives. The one or more colorants and/or one or more additives may be in the same or different compartments. This microencapsulated décor product particle may, for example, provide advantages such as to lengthen the shelf-life of the décor product, enhance décor product compatibility with delivery systems, promote bonding of the décor product to the surface, promote removability of the décor product from surfaces before and/or after fixation, and/or promote thermal fixation of the décor product to a surface. Other benefits associated with encapsulation of compounds include, for example, timed release of compounds, and buffering systems, among others known to those skilled in the art, and are contemplated in the present disclosure. The compartmentalized and/or microencapsulated décor product particles may have multiple distinct regions of equal and/or differing sizes containing the same and/or differing substances, such as, for example, one or more solids, one or more liquids, one or more gases, and/or combinations thereof. As an example, microencapsulation technologies useful in the present disclosure are provided by Microtek Laboratories, Inc.

In a further embodiment, the décor product may include a removable paint and/or surface coating. In this regard, the décor product may be removable via wet-chemistries, such as ammonia-based, acid-based, and/or water-based chemistries. Illustratively, the décor product may be a liquid with one or more surfactants, zinc oxide, and/or one or more colored pigments. The décor product of the present embodiment may be removed by, for example, a weak acid, a buffering agent, a mildly alkaline solution, a polar or non-polar solution, a detergent, a soap, an alcohol, and/or a solid compound, and/or combinations thereof.

Illustrative ammonia-based chemistries useful in the present disclosure include those supplied by Missouri Turf Paint (for example, TITAN™ Removable), or by Pioneer, or by Sports Coatings, or by Specialist Group. Acid-based chemistries useful in the décor product of the present disclosure include those supplied by Remarkable Paint Company, and include, for example, those found in RE-MARKABLE® Paint. Additional remarkable field paints useful in the present disclosure include those disclosed in, for example, U.S. Patent Application Publication No. 2004/0127376. Other useful examples of remarkable field paints in the present disclosure include those disclosed in, for example, U.S. Pat. No. 6,653,265. Additional examples of strippable ammonia formulations useful in a décor product of the present disclosure include those disclosed in U.S. Pat. No. 5,041,488 and those that include susceptible styrene/acrylic compounds. Other useful water-based dyes and compositions include those disclosed in, for example, U.S. Pat. No. 6,834,589.

Water-based chemistries useful in the present disclosure include those supplied by Magic Colors Company (for example, Remove It Permanent Paint System). It is further contemplated that aqueous fabric paints and/or paint systems may be useful in the décor product embodiments of the present disclosure. Examples of aqueous fabric paints useful in the present disclosure include, for example, Jacquard Products including Jacquard Textile Colors, DYE-NA-FLOW™, and NEOPAGUE™, Marabu-Textil made by Marabuwerke GmbH & Co. KG, and SIMPLY SPRAY™ available from Sunshine Joy Distributing. Wet-erase inks removable by solvents after short or extended periods of time that can be used on multiple surfaces are also useful in the present disclosure. Such wet-erase inks may incorporate water-soluble binders, cellulose derivatives, and/or polyvinyl pyrolidone.

Additional embodiments may incorporate dry erase inks, peelable and/or strippable coatings, alkali soluble resins, and various value adding chemistries disclosed herein. Examples of dry-erase inks, compositions, and applicators thereof may include those provided by ITW Dymon, Pilot Pen Corp., Sanford Corp., Avery Dennison Corp., Binney & Smith Inc., and Dainippon Ink and Chemicals, Inc. Other dry erase inks, compositions, and applicators that may be useful in the present disclosure include those disclosed in, for example, U.S. Pat. No. 6,031,023.

Additional useful formulations of the present disclosure include peelable and/or strippable coatings made by Spraylat International, LTD. In addition, it is contemplated that the décor product may include a thermally releasable coating and/or blowing agent to aid in the removal of the affixed décor product. An example of thermally releasable coatings and blowing agents useful in the present disclosure includes those disclosed in, for example, U.S. Pat. No. 5,010,131. Other coatings useful in the present disclosure include nanoparticle coating compositions disclosed in, for example, U.S. Pat. No. 6,872,444.

In another embodiment, the décor product incorporates alkali soluble resin systems. Examples alkali resin systems include styrene/maleic anhydride, styrene/acrylic and methacrylic acid, isobutylene/maleic anhydride copolymers, and proprionic acid-modified urethanes. Alkali resin systems useful in the present disclosure are available from companies such as BASF Corp., Kuraray Co., LTD, Johnson Polymer, Rohm and Haas Co., Interpolymer Corp., Scott Bader Co., LTD, Sartomer Co., and DSM NeoResins, among others.

Examples of useful additives for alkali soluble resin systems include divalent zinc salts. Other useful alkali soluble resin systems are further disclosed in U.S. Pat. No. 6,147,041. Additional alkali soluble resin systems include, for example, those disclosed in U.S. Pat. No. 5,453,459.

Further embodiments of the present disclosure may incorporate value adding chemistries including powder coatings, toner and/or ink chemistries, carpet stain removers and/or maskers, odor eliminators and/or absorbers, bleaching agents. Compositions and methods of carpet stain removing and/or masking useful in the present disclosure include those disclosed in Ser. Nos. 11/447,817, 11/447,694, 11/447,439, and 11/447,787, filed on the same day as the present application, the disclosures of which are herein incorporated by reference. Further, technologies used in aftermarket carpet dyeing in the automotive industry may be useful in the present disclosure, including, for example, the "Pro Dye System" available from Top of the Line. An additional contemplated chemistry includes ultraviolet radiation cross-linking agents that crosslink décor product particles in preparation for affixation of the décor product to a surface or removal therefrom.

In other embodiments, a décor product contemplated in the present disclosure may include one or more additives that may be incorporated, for example, during formulation, added post-formulation prior to application of the décor product to a surface, and/or after the décor product has been applied to the surface. Illustrative additives useful in the present disclosure include, for example, a filler, a metallic particle, an adhesive, a binder, a toner, a resin such as an acrylic, an acrylic latex, a polyester, a urethane, and/or an epoxy resin, a carrier, a wax, a charge additive, a protein, an overcoating lacquer such as an ultraviolet initiator, an ultraviolet light absorber, an ultraviolet stabilizer, an ultraviolet blocker, a stabilizer, a thickening agent, anti-wicking additives, a dry powder, a surfactant, a wetting agent, an emulsifier, a coating, a dispersing agent, a perfume, a fragrance, a pigment, a dye, a preservative, a solvent, a lubricant, a fluidity improver, a flow additive, a humectant, a propellant (for example, a pressurized gas or a hydrocarbon based propellant such as butane and propane), an inorganic particulate additive, magnetically responsive microparticles, temporal emission agents, additives providing a safety benefit, additives providing a surface protection benefit, electrical additives, interactive sensory additives, a degassing agent, an antioxidant, a heat stabilizer, a wax, a silicone additive, a catalyst, a texturing agent, an electrical charge control agent, an electrical conductivity agent, a processing aid, a dry powder of a metal salt, a metal salt of a fatty acid, a colloidal silica, an inductive ingredient, and/or a metal oxide, and combinations thereof. Illustratively, a décor product composition contains an additive in an amount of greater than about 0.1%, or less than about 75%, or between about 0% to about 50%, or between about 0.001% to about 30%, or between about 0.01% to about 10%, or between about 0.1% to about 5%, of the total weight of the décor product.

An adhesive or binder may include resin particles chosen to exhibit a glass transition temperature that is lower than the glass transition temperature of resins employed in the color toners. Adhesives and/or binders with lower glass transition temperatures may positively affect the aesthetic feel of the décor after affixation. In addition, such adhesives and/or binders may augment the stability of a composition prepared as an emulsion and provide greater mechanical bonding of the décor product to carpet fibers including, for example, elastomeric materials including styrene/isoprene, styrene/butadiene, and isobutylene. Adhesives and binders may also be selected based on the reversibility on a soft surface, including, for example, nylon and polyester carpets, before and/or after a curing step, such as, for example, Alcoprint PTU (Ciba Geigy Corp.). A high level of retention after curing may also be desirable in certain applications. Examples of adhesives useful in the present disclosure include polymeric resin and may provide a laminating adhesive between a polymeric resin particle and/or between a soft surface and the polymeric resin particle. In one embodiment, the polymeric resin, for example, a toner such as a clear toner, may also act as an adhesive. Examples of adhesives and binders useful in the present disclosure include STYRONAL® ND 656, a styrene butadiene copolymer latex from BASF Corp., and INCOREZ® W2450, a urethane/acrylic emulsion from Industrial Copolymers Unlimited in the UK. Other resins useful in the present disclosure include, for example, crosslinked terpolymers of styrene, acrylate ester, and acrylonitrile available from Zeon Chemical L.P., which include toner resins S-103C and S-111, and styrene-acrylic resins available from Sekisui Chemicals Co. LTD, including S-LEC resin that is based on a styrene and acrylic copolymer. Other resins useful in the present disclosure include, for example, styrene/butadiene, styrene/butyl acrylate, styrene/2-ethylhexyl acrylate, and styrene/butylacrylate resins available from Elikem, including those under the PLIOTONE™ trade name. Polyester resins may offer lower temperature fusing than styrene/acrylates or styrene/butadiene resins permitting the application of less heat to the décor product and/or the soft surface. Illustrative polyester resins include thermoset polyesters, unsaturated polyester resins, such as, orthophthalic, isophthalic, dicyclopentadiene, and bisphenol A fumarate resins, and those available from, for example, Kao Specialties Americas, LLC. Polyurethane resins, including those based on an exothermic reaction of an organic polyisocyanate with a polyol, are also useful in the present disclosure. Illustratively, a décor product composition contains an adhesive in an amount of greater than about 0.1%, or less than about 75%, or between about 0% to about 50%, or between about 0.001% to about 30%, or between about 0.01% to about 10%, or between about 0.1% to about 5%, of the total weight of the décor product.

Illustrative stabilizers include a benzophenone, a benzotriazole, a salicylate, a nickel organic, a monobenzoate, a formamidene, an oxalanilide and/or a phenol. Examples of an ultraviolet stabilizer that provides enhanced protection against ultraviolet light includes those disclosed in, for example, U.S. Pat. No. 6,152,038. Examples of thickening agents useful in the present disclosure include those disclosed in, for example, U.S. Pat. No. 6,752,841. Examples of antiwicking additives useful in the present disclosure can be found in U.S. Pat. No. 5,116,682.

Another embodiment contemplated in the present disclosure may incorporate one or more surface-active (surfactant) agents, for example, emulsifiers. The use of surfactants in the decor product may promote colorant and/or filler wetting, as well as improve flow and leveling of the powder finish. In addition, surfactants promote substrate wet-out during the cure reaction, which improves adhesion and corrosion resistance of the décor product. The addition of surfactants may increase the gloss and distinctness of images of the cured décor product, as well. The addition of one or more surfactants may act to stabilize the décor product formulation, as well as to assist in suspending the particles of a décor product formulation and attaching the décor product to a surface. Surfactants useful in the present disclosure include ionic, nonionic, and/or cationic surfactants. Emulsifiers and/or emulsifying agents useful herein include ALCOPRINT™ PTU from Ciba Geigy Corp., the JONCRYL™ series of emulsifying agents available from Johnson Polymer, and others known to those skilled in the art including, for example, adhesive formulations and latex formulations. Other examples of suitable emulsifiers include sodium laurylsulfate, potassium laurylsulfate, or ammonium laurylsulfate, including, for example TRITON™ 100 (octylphenoxypolyethoxy-ethanol-polyethylene glycol). Illustrative examples of cationic surfactants include dodecyl ammonium chloride, dodecyl ammonium bromide, dodecyl trimethyl ammonium bromide, dodecyl pyridinium chloride, dodecyl pyridinium bromide, and hexadecyl trimethyl ammonium bromide. Illustrative examples of anionic surfactants include aliphatic soap such as sodium stearate, sodium dodecanate, sodium dodecyl sulfate, sodium dodecylbenzenesulfonate, and sodium laurylsulfate. Illustrative examples of nonionic surfactants include poly-oxyethylenedodecyl ether, polyoxyethylenehexadecyl ether, polyoxyethylenenonylphenyl ether, polyoxyethylenelauryl ether, polyoxyethylene sorbitan monoleate ether, and monodecanoyl sucrose. Illustratively, a décor product composition contains a surfactant in an amount of greater than about 0.001%, or less than about 75%, or between about 0.001% to about 50%, or between about 0.1% to about 30%, or between about 0.01% to about 10%, or between about 0.1% to about 5% of the total weight of the décor product.

A fluidity improver useful herein includes, for example, styrene resin, acrylic resin, finely divided hydrophobic silica powder, finely divided titanium oxide powder and finely divided aluminum oxide powder. Further additives may serve as fiber wetting promoters, fiber drying promoters, fiber cleaners, and fiber cleaning promoters. A formulation of the present disclosure may also contain an inorganic particulate material such as, for example, magnetite, ferrite, cerium oxide, strontium titanate and/or electrically conductive titania.

The décor product may include magnetically responsive microparticles with or without colorant. In this embodiment, the décor product may be applied using a static charge and/or magnetically directed force. As an example, iron oxide and/or other magnetic particles known to those in the art form a part of the formulation rendering the décor product magnetically responsive. The magnetically responsive property may be used for further placement onto the fiber and/or for enhanced removal from the fiber and/or to aid with aesthetic considerations such as creating designs and/or patterns.

Further, the décor product envisioned in the present disclosure may have additives designed to impart additional non-visual benefits such as fragrancing and aromatherapy. Further additives may include temporal emission agents, for example, short- or long-term emission agents, such as spot cleaners and odor eliminators, and the like, and/or bioactive agent additives such as bactericides, miticides, insecticides, pesticides, and/or fungicides, which are released over periods of seconds to minutes to hours to days to weeks to months to years.

Further, the décor product may incorporate additives such as fire retardants and anti-slip agents. Further, the applied décor product may serve to protect the surface areas to which it is affixed from stains, chips, dents, rips, blemishes, burns, splintering, abrasion, cuts, rust, oxidation, water damage, mold, and/or dirt. Further, the applied décor product may serve as an electrical insulator, for example, to reduce static electrical charges.

In another embodiment, a décor product of the present disclosure may incorporate interactive sensory elements that interact with one or more senses of the user. Examples of interactive elements include mood lighting, sound (for example, music, indicative sound, or instructive sound), and scent (for example, fragrance emitters, deodorizers, and/or odiferous pet barriers only detectable by animals).

Illustratively, a formulation of a décor product, for example, an emulsion, contains on a weight to weight basis, at least one of: 1) a surface-active agent in an amount of greater than about 0.1%, or less than about 75%, or between about 0% to about 50%, or between about 0.001% to about 30%, or between about 0.01% to about 10%; or between about 0.1% to about 5%; 2) an adhesive agent in an amount of greater than about 0.1% or less than about 75%, or between about 0% to about 50%, or between about 0.001% to about 30%, or between about 0.01% to about 10%; or between about 0.1% to about 5%; 3) a colorant in an amount of greater than about 0.01% or less than about 95%, or between about 0.01% to about 70%, or between about 0.03% to about 15%, or about 0.05% to about 10%; or between about 0.1% to about 5%; 4) an additive in an amount of greater than about 0.1%, or less than about 75%, or between about 0% to about 50%, or between about 0.001% to about 30%, or between about 0.01% to about 10%; or between about 0.1% to about 5%; and 5) the balance water.

A clear toner may also be included in a décor product composition of the present disclosure in an amount equivalent to, for example, the amount of the colorant. For example, in a toner formulation having 10% by weight a colorant, an additional 10% by weight of the toner formulation contains a clear toner. Illustratively, in a toner formulation with about 0.5% w/w yellow colorant, about 0.4% w/w magenta colorant, and about 0.2% blue colorant, the toner formulation also contains about 1.1% clear toner. In another example, an emulsifier contains about 100 grams of water, about 1 gram of yellow NATURA™ toner, about 0.4 grams of blue NATURA™ toner, about 0.8 grams of magenta NATURA™ toner, about 2.2 grams of clear NATURA™ toner, and about 0.33 grams of ALCOPRINT™ PTU. An emulsion of the present disclosure may be made by mixing the various components of the emulsion for a period of time until the particles of the emulsion are coated with the emulsifying agent or agents. The coating of the particles may enhance the stability of the formulation. The mixing time depends on the particular components utilized in a formulation and can range from, for example, from about 1 minute or less to about 48 hours, or longer.

In another embodiment, the décor product may be formulated as a stain-removing and masking agent containing a base color such as a white and/or neutral color and/or other color onto which additional desired colors may be overlain. Illustratively, the décor product may contain a pH neutralizing and/or adjusting pretreatment compound such as, for example, a peroxide and/or a bleach, and/or a titanium dioxide-type neutral color application. The décor product may further include a stain-masking agent and/or coloring agent as disclosed herein. Another embodiment contemplates the application of a highly pigmented coating that has a white and/or neutral color that provides a mask and/or hides a color difference (for example, a stain) on a surface. Further, another material with a color matching the bulk fiber of the surface (for example, a carpet or textile) may be applied subsequent to the masking of the stain.

In yet another embodiment, a décor product composition may have a glass transition temperature (Tg) from below about 25° C. up to the melting temperature (Tm) of the surface substrate to which it is to be applied. In a further embodiment, the Tg ranges from about 45° C. to about 75° C., or from about 45° C. to about 60° C., or from about 45° C. to about 70° C., or about 55° C. The Tg and Tm of a composition or a surface substrate may be measured by methods known to those skilled in the art including, for example, dynamic mechanical analysis, thermomechanical analysis, and differential scanning calorimetry. Illustratively, Tg and Tm values of décor products and surface substrates may be determined using a Model Q100 Differential Scanning Calorimeter (TA Instruments, Inc.) at a heating rate of 20° C./min.

In still another embodiment, the décor product composition has an Imperial Chemical Industries (ICI) cone and plate viscosity of equal to or less than about 2,000 centipoises, or about 5 centipoises to about 100 centipoises, or about 15 centipoises to about 50 centipoises, or about 25 centipoises, or about 35 centipoises at about 150° C. to about 200° C. The viscosity of a composition may by measured by methods known to those skilled in the art, including for example, using a Wells-Brookfield Cone/Plate viscometer distributed by Can-Am Instruments LTD and following methods as set forth in D4287-00(2005) "Standard Test Method for High-Shear Viscosity Using a Cone/Plate Viscometer," ASTM International. Further, a Brookfield CAP 2000H Cone and Plate Viscometer (available from Brookfield Engineering Laboratories, Inc.) set at 750 rpm for 25 seconds using a size six spindle may be used to measure the ICI Cone and Plate viscosity of the décor product composition.

Application of the décor product contemplated in the present disclosure may occur by any appropriate way that is compatible with the décor product formulation utilized. Illustrative ways to apply the décor product to a surface include the use of an ink jet printer, a jet dye process, silk screening, and/or rotary printing. Further, the décor product may be applied and/or dispensed with and/or by a spray gun, a sheet, a film, a matrix, a roller, a brush, a marker, a pen, a stamp such as a self-inking stamp, a pump sprayer, a trigger sprayer, a pressurized spraying device, a sponge, a squeegee, an airbrush, a fiber separator, a dye applicator, a roller, piezoelectric or heat driven delivery, a manual or electronic sifter, a powder "puff", a felted/flocked brush, and/or a powder paint dispenser. The décor product may be applied in a wet form, such as, for example, as a suspension or emulsion including, for example, a liquid-based solvent, a foam, a spray, a wet aerosol, or in a dry form, such as, for example, as a powder, a dry aerosol, and/or a powder with a gentle mist.

By way of example, one possible method of applying a décor product to a selected surface is generally depicted in FIG. 1. Here, a finger pump sprayer 12 including a reservoir 14 for holding the décor product and finger pump 16 is used to apply a generally cone-shaped dispersion 18 of décor product to a surface 20 such as a carpet. In this embodiment, by varying the distance of the finger pump sprayer 12 from the surface 20 and angle of the finger pump sprayer relative to the surface, the size and shape of the pattern 22 imparted to the surface may be varied. In this way, a preselected pattern may be imparted to a surface using a "free-hand" technique without a design device.

Additional examples of applicators and/or dispensers of the décor product of the present disclosure include, for example, an intermittent pressurized sprayer (such as PULL 'N SPRAY® liquid applicator marketed by The Scotts and Miracle-Gro Company), an actuator spray bottle, a trigger sprayer, a mechanical spray bottle, a pump and/or pump system, a liquid refill containing the décor product for a pressurized air chamber, an aerosol barrier pack containing the décor product with a driving chamber (with a propellant, for example, carbon dioxide or a hydrocarbon), and a liquid or gel chamber for containing the décor product where use would allow pressurized spraying with reduced propellant release to the atmosphere or room being decorated by the user. Other useful sprayers include those disclosed in, for example, U.S. Pat. No. 6,872,444.

Still further other ways to distribute the décor product include, for example, a décor product impregnated sheet that contains entrapped dry or wet décor product particles that when wetted or otherwise activated, releases the décor product onto the surface. Another example includes a décor product impregnated sheet containing entrapped liquid that releases the décor product onto the surface upon pressure application or controlled puncture. A further example includes a décor product impregnated sheet with liquid rolled or stamped thereon that promotes even distribution of the décor product. Still another example includes an apertured or perforated décor product impregnated film that collects and/or directs a releasing substance that once applied to the film releases the décor product onto a surface. Yet another example includes a décor product impregnated matrix containing therein and/or thereon entrapped décor product formulation that releases the décor product onto a surface upon pressure, vibration, liquid transfer, heat application, and/or chemical means and/or by an electrostatic deposition device that meters an amount of décor product to be applied to a surface and precisely lays the décor product on the surface.

Still further ways for application of the décor product include a multiple chamber system that mixes the décor product upon dispensing to give the desired décor product color or other characteristic, such as are exemplified in part by trigger release systems (for example, DLS100, DLS 200, or Versitech systems manufactured by Take 5, Anaheim, Calif. (www.take5net.com)), pump systems (for example, VERSA-DIAL® manufactured by Versadial, New York, N.Y., a company under the Sea Change Group) (www.versadialworld-.com)), or a multichamber mixer/dispenser that is combined with a décor product applicator (for example, a brush, a spray bottle, or other applicator). Further, premixed ready-to-use bottles and/or spray cans may be used to distribute and apply the décor product.

Additional technologies contemplated for application and/or dispersion of the décor product include multifunctional devices, such as, for example, a device that combines packaging, design positioning, décor product application, and/or removal of a design device from a surface. For example, in one embodiment, a design device, for example, a stencil contains the décor product, which can be released onto a surface by applying a releasing agent, such as water, to the stencil. As an example, the use of a dry décor product may be reversibly attached to a stencil by means of a water-soluble adhesive or the décor product may be attached to a sticky side of a water-soluble transparent film. Further technologies contemplated include sprayers that impart charges to colorant droplets and/or stencils (similar to powder painting), sponging, and felt tip pens and liners.

The décor product in one embodiment may be applied using heat transfer technology including, for example, that used by color copying machines such as a Xerox DOCU-COLOR™ 12 printing onto Xerox 3R5811 or another similar transfer paper and/or similar combinations of materials provided by Hewlett Packard, Canon, Geo Knight & Co, Avery Dennison, and 3M.

Differing application factors are contemplated for encapsulated décor product particles including control release, temperature release, concentration release, and any other release mechanism known to those skilled in the art. For example, release of the contents of a microencapsulated décor product particle contents may be triggered by changes in pH, such as by applying a common solvent such as, for example, an ammonia-containing solution. Examples of a temperature release mechanism include exposure of the microencapsulated décor product particles to a temperature above a release threshold, where the release of the microencapsulated décor product particle contents only occurs above the predetermined threshold temperature. A concentration release application may apply a portion of a colorant to the surface over an extended period of time to render a more evenly distributed and/or more thoroughly distributed appearance of the colorant to a surface. Illustratively, a microencapsulated décor product particle with a polymer resin particle shell and containing trapped colorant particles and/or other compounds disclosed herein may be activated by thermal activation and/or specific chemistry-related activation (including, for example pH modulation using, for example, ammonia). As such, the outer polymer shell would melt and/or dissolve, and the colorant particles and/or other microparticle contents may be allowed to flow and thus be applied to the surface. Non-exclusive examples of release mechanisms useful in the present disclosure include those found in U.S. Pat. No. 6,893,662. Additional release mechanisms contemplated for treating of the microencapsulated décor particle result in at least one of breaking, heating, weakening, and/or dissolving one or more shells of a décor particle.

Figure 2:
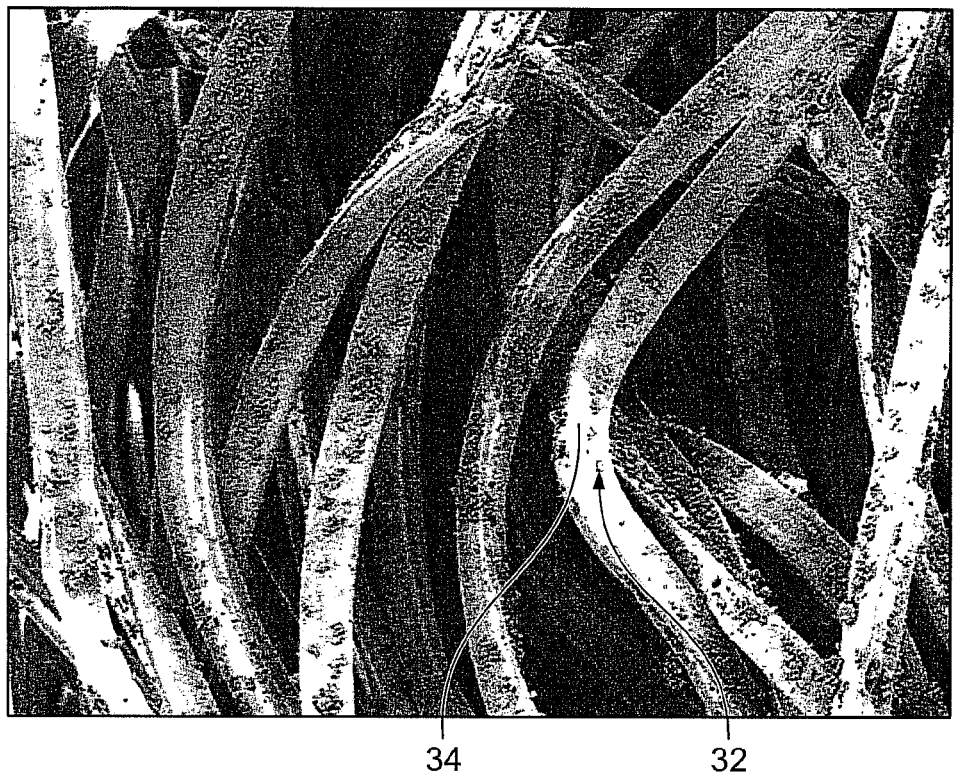
FIG. 2 is a photomicrograph of applied décor particles on a surface.

A décor product once applied and/or affixed to the surface may be temporary, permanent, and/or semi-permanent. An example of a semi-permanent décor product includes a décor product with a temporary adhesive that adheres and/or attaches a décor particle to the surface. Such a formulation may provide short term durability, for example, hours to weeks, of the décor product on a surface by substantially adhering and/or attaching the décor product thereon. In one embodiment, short term durability allows the décor product to be applied to a surface for an occasion, special event, and/or holiday without the décor product needing to be affixed to the surface and at the same time being easily removable therefrom. An example of décor product attachment to a surface is seen in FIG. 2, which is a scanning electron micrograph showing dry décor particles 32 attached to an individual nylon carpet fiber 34.

Removal of the décor product from the surface may be either through dry removal methods or wet removal methods such as through using various devices and methods including, for example, a vacuum, a vacuum combined with mechanical action such as agitation, wet extraction, steam cleaning, chemical application (for example, applying an organic or inorganic solvent), using an ultrasound process, using detergents, using dilute ammonia solutions, and/or using an abrasive eraser. Some or all of the aforementioned processes may be employed to remove the décor product prior to and/or after setting, affixing, and/or curing of the décor product on or to the surface.

Examples of solvents useful in the present disclosure include polar and/or nonpolar solvents, including those disclosed in the Handbook of Organic Solvent Properties, Smallwood, I.M. 1996, Elsevier. Such solvents include, for example, water, hydrocarbons, aromatic hydrocarbons, aliphatic hydrocarbon solvents such as aliphatic alcohols, other alcohols, glycol ethers, nitrated and chlorinated solvents such as chlorinated hydrocarbons, ketones, ethers, and/or esters. Other useful solvents include acetone, amines, benzyl acetate, phenols, polyvinyl alcohol, and/or the organic sulfone or sulfoxide families including dimethyl sulfoxide. Detergents and soaps may also be used to remove a décor product from the surface. Combinations of the above may also be used.

By way of example, reversibility of a décor product applied to a surface may be determined in the following manner. Initially, a test surface, such as, for example, a two-foot by two-foot square piece of nylon and/or polyester carpet is thoroughly cleaned using an upright vacuum cleaner (for example, a Bissell CLEANVIEW® II vacuum cleaner, manufactured by Bissell Homecare, Inc.) to remove loose fibers and/or dirt. The baseline color of each of three spots over which the décor product is applied is determined using a calorimeter such as a Minolta data processor model DP-301 combined with a Minolta model CR-310 chroma meter (both manufactured by Konica Minolta Sensing Americas, Inc.) set to the "L-a-b" setting to allow determination of $\Delta E$ (color change) and calibrated according to the manufacturer's instructions.

The décor product is applied using, for example, a finger pump (output 60 micron particle size) onto the surface of the three spots until the test area is completely saturated. The décor product is allowed to substantially dry to the touch, which is typically overnight to assure complete drying, though shorter or longer periods may be used depending on, for example, the relative humidity and/or temperature of the ambient environment. After the décor product is dry, the color of each of the three spots is determined using the colorimeter as mentioned above. Subsequently, the three spots are vacuumed using a wet/dry vacuum with a hose attachment and brushless triangular tool, such as, for example, a Shop-Vac® 1×1 portable wet/dry vacuum 12V 60Hz, 5.5A, model 2101A (manufactured by Shop-Vac, Inc.). The three spots are vacuumed in one direction several times and repeated in the other direction for a period of to ensure adequate removal. After vacuuming, a colorimeter measurement is taken to determine the change in color. Change in color ($\Delta E$) was determined using the following formula:

$$\Delta E = \sqrt{((L_1-L_2)^2+(a_1-a_2)^2+(b_1-b_2)^2)}$$

where "L" refers to "lightness" with values of 0=black to 100=white; increasing "a" values indicate more red color and decreasing "a" values indicate more green color; and increasing "b" values indicate more yellow color and decreasing "b" values indicate more blue color.

Illustratively, a substantially removable décor product has a $\Delta E$ value as compared to the initial reading of an untreated carpet of less than about 20, or less than about 10, or less than about 7.5, or in the range of about 0 to about 15.

Factors that may affect reversibility of the décor product from a surface may include, for example, décor product specific factors, application specific factors, and/or surface specific factors. Examples of décor product specific factors may include the type and/or concentration of emulsifier included in the décor product formulation, which may affect adherent interactions between the décor product and the surface to which the décor product is applied thereto. Further, when the décor product composition includes a particulate component, for example, a décor particle, the reversibility of the décor product may be affected by the size of the particle. Although not wishing to be bound by theory, it is believed that smaller particle size may affect reversibility due to possible greater penetration of the particles into recesses and interstices of a non-smooth surface such as carpet, thus reducing access to the smaller particles for the subsequent removal process.

Application specific factors that may affect reversibility include the extent of surface saturation when applying the décor product to the surface and the method and/or device used to apply the décor product to the surface. Surface saturation includes, for example, the density of applied décor product on the surface. Greater surface saturation may lead to an increased likelihood of residual décor product remaining after removing the major portion of décor product applied to the surface, and/or greater penetration of the décor product into the recesses and interstices of the surface thereby reducing accessibility of the removal process to the décor products. Further, the method and/or application device used to apply the décor product may affect reversibility. Illustratively, the décor product may be applied to a surface in a fashion to coat the surface with little to no surface penetration. For example, an applicator that applies the décor product in a mist, such as by a finger pump with a 60 micron or less spray nozzle, may be used to coat the surface with little or no penetration of the interstices of the surface. In this example, décor product reversibility may be improved owing to the minimal surface penetration of the décor product. However, if it is desired to apply the décor product with an aerosol spray container, or other such applicator that expels the décor product from the container with a greater velocity than, for example, a hand pump, deeper penetration of the surface may result, which may affect removal of the décor product from the surface by, for example, limiting or inhibiting access of the removal process to the décor product.

Surface specific factors that may influence décor product reversibility include, for example, surface structure and/or texture, the electrostatic charge held by the surface, and/or surface pretreatments affecting, for example, surface tension. Surface structure factors such as fiber density, in the case of carpets and the like, may influence décor product reversibility. For example, dense carpet structures may be more likely to minimize particle penetration as opposed to open structures such as, for example, nylon shag carpets and older carpets with damaged braids. Thus, less dense surfaces may influence décor product reversibility by, for example, reducing the access of the décor product to the removal process as compared to more dense surfaces.

Further, surface electrostatic charge and/or surface tension may influence reversibility. Illustratively, a surface treatment may be used to lower the electrostatic charge and/or surface tension to improve the reversibility characteristics of the décor products. Examples of surface treatments that may be used include 3M SCOTCHGUARD™ Carpet and Upholstery Protector (manufactured by 3M) and/or Advanced TEFLON® Carpet protector (manufactured by E. I. du Pont de Nemours and Company). Further, such pretreatments may promote décor product coverage and/or dispersion on the surface with smaller volumes of the décor product thus indirectly promoting décor product reversibility through minimizing the risk of oversaturation.

In some instances, the décor product may be formulated to have a larger particle size to improve or enhance reversibility by reducing the amount of particles based on size that can penetrate the smaller interstices of the surface. Further, and not wishing to be bound by theory, it is believed that smaller sized particles, for example, particles less than about 5 to about 10 microns in size, may be held relatively more tightly to the surface by an electrostatic charge and/or surface tension as compared to larger particles, for example, particles greater than about 20 microns in size, making the smaller sized particles relatively more difficult to remove from the surface as compared to larger sized particles. Thus, in some embodiments, surface pretreatment, additional effort and/or additional methods may be needed to achieve the same reversibility characteristics for décor products formulated with smaller particles as compared to décor products formulated with larger particles.

Once a décor product of the present disclosure has been applied to a surface and the user has decided to keep the décor product on the surface, the décor product may be cured and/or affixed by chemical curing and/or mechanical bonding to the surface temporarily, permanently, and/or semi-permanently according to the formulation of the décor product. Any curing or affixing technique compatible with the décor product and the surface is contemplated in the methods disclosed herein including, for example, the application of energy and/or a chemical to the décor product. Examples of curing or affixing techniques include, for example, heat curing, steam curing, pressure curing, exposure to an electromagnetic field, including for example, ultraviolet radiation, radio frequency curing, a magnetic field, and the like, ultrasound curing, induction heat curing, solar heat curing, exothermic reaction heat curing, convective heat curing, and/or radiant heat curing. Further, curing or affixation of the décor product may be accomplished by exposure of the décor product to the ambient environment.

The décor product in one embodiment may be affixed to a surface using heat in a range from about −7° C. to about 650° C., or about 4° C. to about 400° C., or at a temperature less than about 260° C., or about 20° C. to about 180° C., or about 65° C. to about 120° C., or higher and lower temperatures depending on the surface in which the décor product is applied. Further, the duration of the curing or affixing step is generally décor product- and/or surface-specific, and illustratively, ranges from less than 1 second to about 15 minutes, or from about 15 minutes to about 1 hour, or from about 1 hour to about 4 hours, or from about 5 hours to about 8 hours, or from about 8 to about 12 hours, or longer for curing of the décor product.

Tools that may be used to cure and/or affix the décor product to a surface include, for example, a hot iron, an enclosure or frame containing a CALROD™ heating element suspended over the surface being heated, an enclosure or frame with one or more incandescent light bulbs, a heat gun, an enclosure or frame with a heater and a blower to infuse hot air onto the substrate, an enclosure or frame with an infrared heating element, an enclosure or frame with an ultraviolet light source, a steam-making device, a heated tool (for example, a household iron, an electric griddle, or a hair dryer or objects similar in function but specifically designed for the application), or a microwave emitting device or a radio frequency emitting device. The devices contemplated herein to be used for décor product affixation may incorporate heat sensors and timers to facilitate the affixation process and further protect the surface to which the décor product is being applied from damage from overheating.

Additional ways to affix the décor product to a surface include inductive heating of a décor product containing metal nano- or microparticles, moisture curing systems, adding magnetic enhancements to a deposited décor product, and treatment of additives within the décor product to induce affixation. Further ways to affix the décor product to a surface include those disclosed in the U.S. Patent and published patent application provided in Table No. 1 above.

Figure 4:
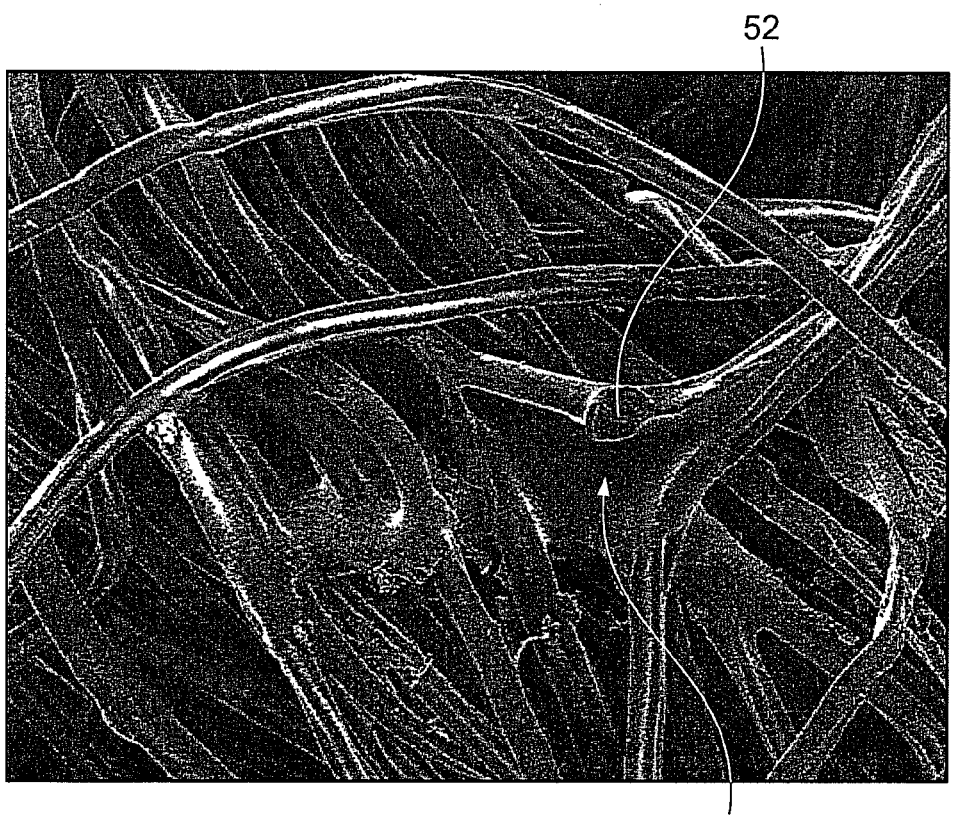
FIG. 4 is a photomicrograph of a décor product affixed to a surface.
Figure 3:
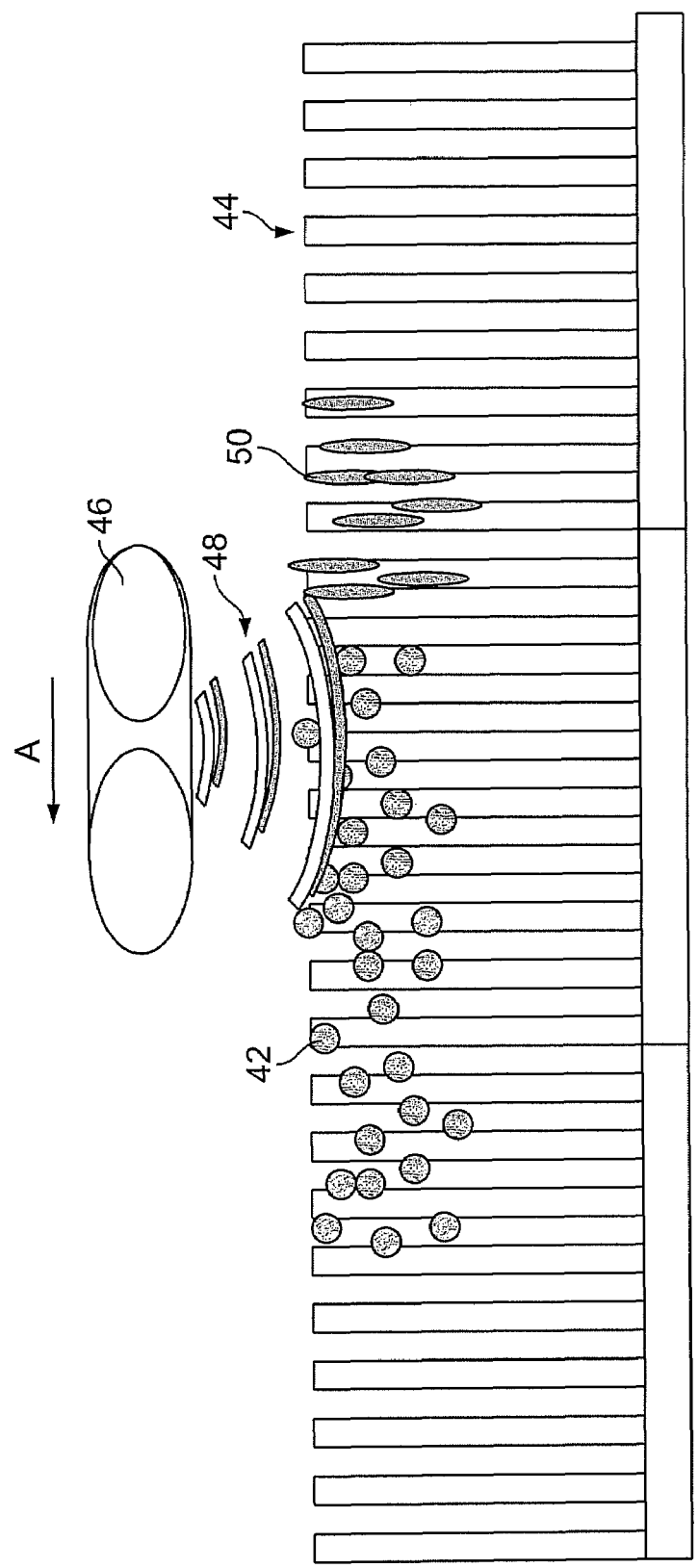
FIG. 3 is an illustration of one possible method of affixing a décor product to a surface.

An illustration of affixation is shown in FIG. 3. Here, the décor product has been applied to a surface 44, such as a nylon carpet described herein and has substantially dried to the surface to form substantially dry décor particles 42 attached thereto. An affixation device 46 emitting energy 48, for example, an electromagnetic field, is being passed over the applied décor particles 42 in a direction A. Upon contact of the emitted energy 48, the décor particles begin to melt and flow and upon removal of the emitted energy begin to cool and bond to the surface 44 to become substantially affixed to the surface. A further example of fixation is seen in FIG. 4, which is a scanning electron micrograph showing a resultant decor particle film formed on individual fibers of a carpet.

Protective coverings may also be applied to a deposited décor product for the purpose of affixing the décor product and/or to add to the resiliency of the décor product to wear. Useful protective coverings include, for example, nanoparticle coating compositions disclosed in, for example, U.S. Pat. No. 6,872,444. Further, fixatives useful in the present disclosure include those used in artistry to fix and/or seal, for example, pastels, pencil, charcoal, crayon, ink, gouache, or watercolor. Such fixatives include those available under the trade names Blue Label Reworkable FIXATIF® (Martin F. Webber Co.), GOLDEN® Archival Spray Varnish (Golden Artist Colors Inc.), KRYLON® Workable Fixative (Krylon Products Group, The Sherwin-Williams Company), and LASCAUX® Fine Art Fixative (Lascaux Colours & Restauro, Switzerland).

It is further contemplated that the surface to which a décor product is to be applied and/or affixed thereto may be conditioned prior to the application of the décor product. Examples of such conditioning include, but are not limited to cleaning, vacuuming, steam cleaning, bleaching, pH balancing, reducing the pH, increasing the pH, sweeping, painting, scrubbing, wetting, texturing, leveling, tilting, drying, heating, cooling, sanding, buffing, coating, removing coatings therefrom, reducing the electrostatic charge of the surface, and/or applying a surface treatment, such as an upholstery and carpet protector including, for example, 3M SCOTCHGAURD™ Carpet and Upholstery Protector (manufactured by 3M) and/or Advanced TEFLON® Carpet protector (manufactured by E. I. du Pont de Nemours and Company).

Illustratively, the durability of a substantially affixed décor product can be expressed in terms of a ΔE value by determining the ratio of the ΔE measured between an untreated surface and a décor product affixed on the surface and the ΔE measured between the untreated surface and the décor product affixed and subsequently vacuumed as described herein and subtracting this ratio from 100. Illustratively, the percentage change in ΔE for a substantially affixed décor product has a range of about 0% to about 20% change in ΔE.

A further embodiment of the present disclosure includes the use of a design device that a user may use to control the application of the décor product to a surface for the purpose of creating, for example, a pattern on the surface to enhance the aesthetic effect of the décor product. Possible décor product patterns on surfaces contemplated in the present disclosure include any and all images, patterns, shapes, and/or designs. Preselected or random patterns may also be imparted to a surface using an inherent dispersal pattern from a décor product applicator with or without movement of the applicator over a selected surface during application of the décor product. For example, by using a spray applicator with a cone-shaped dispersal pattern, a user may choose to apply discrete spots and/or circles having diameters that are varied by varying the distance from which the applicator is held from the surface during application of the décor product. Further, a user may move the applicator during application of the décor product over the surface in a predetermined or random pattern to achieve a predetermined or random pattern on the surface. As such, preselected patterns and/or random patterns may be imparted to a surface with or without a design device.

Design devices contemplated in the present disclosure may limit, direct, focus, concentrate, guide, dilute, and/or disperse an amount of décor product applied to certain predetermined areas of a selected surface. The design device may include, for example, a stencil, a template, an array, a guide, a frame, a pattern imparting device, a device imparting graphics in a random manner, a manual device, an automatic device, a computer guided device, a programmed device, and/or any combination thereof. The design device contemplated for use herein including, for example, a stencil, may be constructed totally or in part with a material such as, for example, paper, wood, stone, plastic, cardboard, metal, and/or any combination thereof.

Stencils or other design devices contemplated for use in the present disclosure may be designed, constructed, shaped, and/or reshaped, in a predetermined, ordered, disorganized, and/or random manner by means of laser, knife, die cutting, and/or any other appropriate means as determined by the nature of the stencil material (for example, hardness or softness of the stencil materials) to render a predetermined, ordered, disorganized, and/or random shape that allows a predetermined, ordered, disorganized, and/or random deposition of at least a visual design by introducing a décor product on a surface. The stencils may further be laminated and have additional layers applied thereto post-construction and/or post-designing.

Figure 5:
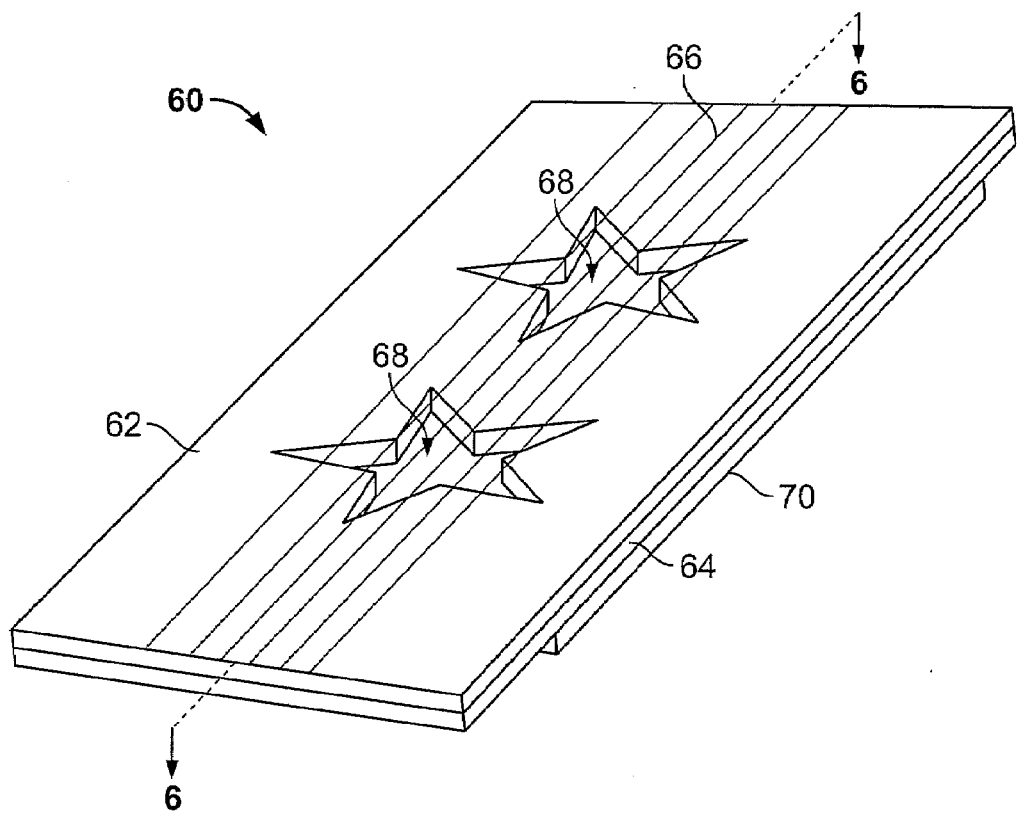
FIG. 5 is a trimetric view of a design device incorporating multiple layers including support layers according to one embodiment.

An exemplary stencil 60 useful in the present disclosure is shown in FIG. 5 and includes a material containment layer 62 (for example, for the absorption of liquids and/or entrapping of dry materials and/or solids) that includes a paper tissue, a synthetic woven or non-woven material that may or may not be coated with an absorbent hydrophilic material, and/or a solid and/or liquid entrapping substance. The material containment layer may have a thickness of about 0.01 mil to about 1000 mils, or about 0.1 mil to about 500 mils, or about 0.5 mil to about 150 mils, or about 1.25 mils to about 50 mils, or about 2 mils to about 15 mils, or a lesser or greater thicknesses depending on the application. The stencil may also incorporate a liquid barrier layer 64 to protect a selected surface from unintended colorant exposure that may comprise a liquid barrier made of any hydrophobic material, including a polyolefin such as polyethylene. The liquid barrier layer 64 may also be comprised of a coating applied to one surface of the absorbent material to hinder liquid transport through the absorbent material. Such a coating may be polymeric in composition such as an acrylic polymer. The liquid barrier may have a thickness in the range of about 0.01 to about 1000 mils, or about 0.1 mil to about 500 mils, or about 0.5 mil to about 150 mils, or about 1.25 mils to about 50 mils, or about 2 mils to about 15 mils, or lesser or greater thicknesses depending on the application. An example of a material containment layer and barrier layer combined together useful in the present disclosure, includes the commercially available GOTCHA COVERED® drop cloth by Kimberly-Clark Corp. The stencil 60 further includes a first support layer 66 that helps to secure the edges of one or more cutout portions 68 that provides a passage through at least the material containment layer 62 and the liquid barrier layer 64 of the stencil 60. In this embodiment, the first support layer 66 comprises threads, but other materials may be used, in addition to or in place of threads as described below. Further, the stencil 60 includes a second support layer 70 that helps to secure the stencil 60 to a surface (not shown), such as a carpet. The second support layer 70 may consist of adherent materials including, for example, adherent mesh-like materials as described below.

Figure 6:
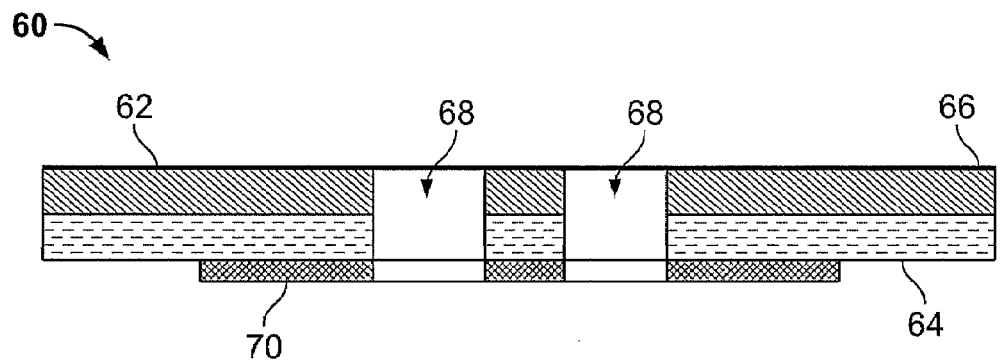
FIG. 6 is a cross-sectional view taken generally along the lines 6-6 of FIG. 5 depicting the design device.
Figure 11:
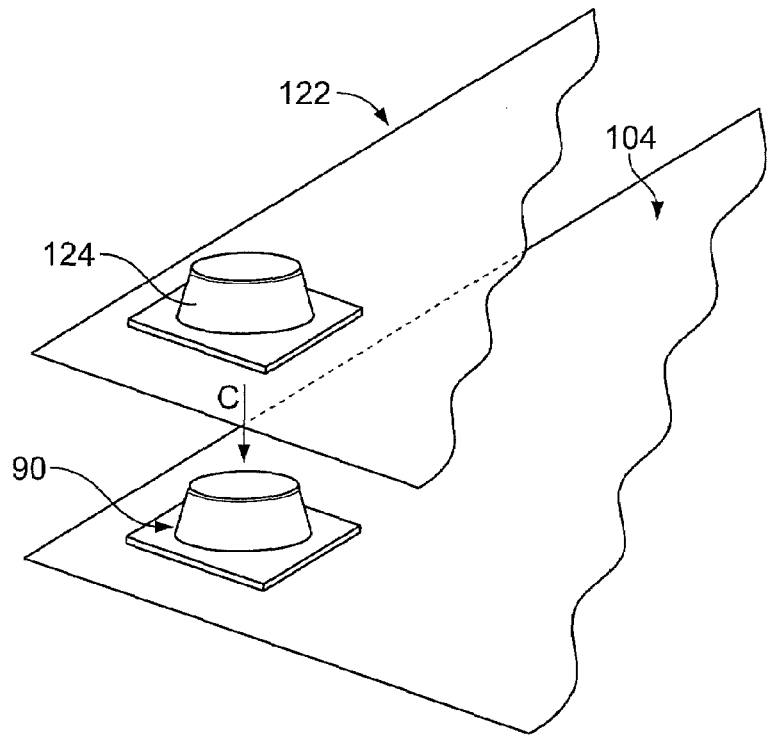
FIG. 11 is a partial cutaway trimetric view a stencil-mounted peg interfacing with a second peg arrayed on a surface according to one embodiment.

A cross-sectional view of the stencil 60 is shown in FIG. 6. Here, the cutout portions 68 are shown through the material containment layer 62, the liquid barrier layer 64, and the second support layer 70. However, the second support layer 70 need not have the cutout portion 68 pass therethrough to allow a décor product to be deposited on a surface due to its mesh-like structure.

In another embodiment, the material containment layer and the barrier layer may be made of the same material. For example, a dual purpose material (for example, a paper material) that has densities that differ by layers. In this example, the top layer of the dual purpose material corresponds to the material containment layer and has a density that absorbs liquids and/or entraps dry material and/or solids and the bottom layer corresponds to the barrier layer and has a density that prevents passage of liquids therethrough. Further, varying thicknesses may contribute to the functionality of the dual purpose material previously described in addition to or in lieu of varying material densities. Such a dual purpose material may be advantageous over using multiple materials to create a stencil envisioned in the current disclosure by facilitating manufacture of the stencil.

Another stencil that may be used in the present disclosure may also include a fibrous support layer that has securement and/or attachment properties, such as tulle, scrim, VEL-CRO®, VERSA HOOK from Avery Dennison, and the like. Illustratively, when the support layer is laid upon a surface, the support layer comes in contact with the surface to which the stencil is to be releasably secured in such a way as to adequately secure the stencil to the surface to allow deposition of the décor product upon the surface and render the intended result. The support layer may also comprise other adherent mechanisms, properties, and/or devices such as, adhesive strips, pressure-sensitive adhesive, and/or any standard bonding mechanism known to those skilled in the art. An additional support layer including, for example, a loose grid, web, or mesh-like material including, for example, thread, is envisioned that may be placed adjacent the barrier layer of the stencil. In this embodiment, the cutout portion may extend through the material containment layer, the barrier layer, and the support layer. An exemplary stencil useful in the present disclosure in which the support layer is a pressure-sensitive adhesive includes that disclosed in, for example, U.S. Pat. No. 6,779,443. The support layer may be of sufficient area to minimize unintended exposure of a surface, as well as function to maintain the structural integrity of the stencil.

Stencils that may be used in this application may be substantially resilient to décor product removing means and/or affixation means. The stencil may be used to protect underlying surfaces from the décor product removing means disclosed herein. Further, stencils contemplated within the context of the present disclosure when disposed upon a surface may protect portions of the selected surface from at least one of application, removal, or affixation of the décor product by means of at least one of the material containment layer or the barrier layer. Further, a design device may protect an area adjacent to the preselected pattern from receipt of the décor product.

Stencils contemplated in the present disclosure may have cutout portions and/or peripheral edges substantially shaped into a desired pattern, shape, and/or design. Illustratively, as seen in FIG. 7, a stencil 80 has star-shaped peripheral edge 82 and an internal cutout 84 having a similar shape as the peripheral edge. This exemplary stencil may be used, for example, when a décor product is being applied to a large area of a surface such that the stencil base 86 between the peripheral edge 82 and the internal cutout 84 blocks application of the décor product to the surface to leave a décor product-free pattern on the surface.

The stencil may also have one or more cut-out portions and/or pre-cut punch-out portions that may be selectively removed by a user. Reverse image stencils contemplated in one embodiment may be used to impart a reverse visual image upon a surface by first being placed upon the surface to which a décor product is intended to be applied. In this embodiment, the peripheral edge of the stencil is cut and/or constructed to impart a pattern, shape, and/or design to a surface when a décor product is applied to the stencil and underlying surface.

It is envisioned, that the reverse image stencil may or may not have a cutout portion therethrough. After the placing of the stencil or stencils, the décor product is applied to both the surface and the stencils. The stencil or stencils function to protect the underlying surface in the shape of the desired image resulting in a décor product-free area in the shape of the desired image surrounded by a décor product covered area outlining the desired shape. Further, conventional stencils contemplated in the present disclosure may be used to impart a visual image upon an intended surface by first being placed upon the surface to which a décor product is intended to be applied, after the placing of the stencil or stencils the décor product is applied to both the surface and the stencils, and the stencil or stencils function to protect the surface surrounding the shape of the desired image resulting in a décor product covered area in the shape of the desired image surrounded by a décor product-free area outlining the desired shape.

Another illustrative stencil imparts an image to a surface when used in conjunction with the décor product removal means, such as, for example, a vacuum, after the décor product has been applied to the surface. In this example, the décor product is first applied to the surface and the stencil is placed on the surface where the décor product had been applied. After the stencil has been applied to the treated area, a user may apply a second décor product to the treated area and stencil to impart multiple patterns of different décor products a surface. This process may be repeated until a desired affect is achieved. Alternatively, after applying the stencil to the treated area, the décor product that remains exposed within cutout portions of the stencil and/or in areas surrounding the peripheral edges of the stencil may be removed by décor product removing means disclosed herein. The removal of the décor product results in images similar to those with the reverse image stencils and/or the conventional stencils disclosed above.

One or more stencils may be used simultaneously to apply a visual design to a surface. When desired, one or more stencils may be used in combination with any number of other stencils contemplated in the present disclosure and/or auxiliary devices that aid in design formation and/or stencil communication. A multiplicity of stencils intended to be used together to impart a design or other graphic representation on a selected surface may be coordinated with relation to one another and the room or volume of choice by coordinating, aligning, interfacing, connecting, and/or guiding systems that secure the stencils either together or apart from each other or from predetermined or random positions within a room or other volume either on the surface on which the décor is intended to be applied or any other point in the room or other volume. Examples of coordinating, aligning, interfacing, connecting, and/or guiding means useful herein include reusable or disposable pegs that anchor stencils and/or additional auxiliary devices that aid in design formation and/or stencil communication together via peg securement locations, color strips disposed along a surface of the stencils, letters, symbols, notches, and/or other indicia that guide assembly of the stencil organization. An example of a stencil coordinating mechanism is illustrated in FIGS. 8-11.

FIG. 8 depicts a disposable and/or reusable peg 90 that can be affixed to a surface to form an anchor point on the surface for coordinating stencil placement on the surface. In this example, the peg 90 has multiple layers of adhesive strips 92 to adhere the peg to the surface, however, a single strip may be included or some other adherent mechanism such as VEL-CRO® dots and/or other adhesive agents known to those skilled in the art.

FIG. 9 shows a transparent layout tool 102 that may be placed on a surface 104 to be decorated. The layout tool 102 includes one or more spacing portions 106, for example, an array, sized to permit one or more pegs 90 to be inserted (as shown by arrow B) into the spacing portion and attached to the surface 104. The layout tool may also include a colored pattern that may serve as a preview for a selected décor design that may be achieved using a corresponding set of stencils. To determine placement of the layout tool 102 on the surface 104 in order to, for example, center the layout tool on the surface, the user may measure a distance from a feature on the surface, for example, a floor vent, or may measure a distance from a wall or other room feature to determine desired placement of the layout tool.

By using of a plurality of pegs 90 along with the layout tool 102, a user may construct an array 112 of pegs attached to the surface 104 as is seen in FIG. 10. To coordinate one or more stencils on the surface 104 using the coordinating mechanism of the current embodiment, the user may place a stencil 122 or a layout tool having a hollow peg 124 centered over a hole in the stencil (not shown) on top of one of the pegs 90 adhered to the surface 104 (as shown by arrow C) to anchor the stencil on the surface. Alternatively, the hole in the stencil 122 may serve to receive the peg 90 and orient the stencil on the surface. It is also envisioned that a stencil 122 may include more than one hole and/or hollow peg 124, for example, a hollow peg at each corner of a square stencil, to securely position the stencil on the surface. Further, in a similar fashion, additional layout tools 102 that include holes and/or hollow pegs 124 may be positioned on the surface 104 in a predictable and symmetrical manner by starting with a minimal number of measurements for the first layout tool position. In this way, an array of pegs 90 may be placed on a large surface using one layout tool 102 to allow a large number of stencils to be placed on the surface 104 to permit an entire surface to be decorated with at one time.

Use of coordinating, interfacing, and/or guiding means may allow the consumer to impart a décor product in predetermined or random patterns, designs, images, lines, geometric shapes, discrete images, and/or repetitive images and the like, in a visually perceived organized manner or a visually perceived disorganized and/or random manner.

Any and all images, patterns, shapes, and/or designs may be imparted on a surface using the design devices of the present disclosure. For example, images, patterns, shapes, and/or designs contemplated in the present disclosure may be regular or non-regular, linear or non-linear, and repeatable or non-repeatable patterns, including, for example, ornamental, tracery, or geometric forms, simplified primitive and symbolic images and patterns, compositional multi-object landscapes, images depicting real or imaginary stories or plots, images with text, art images, standard and/or reproducible images, real or imaginary letters, real or imaginary numbers, cartoons, real or imaginary typographical symbols, illustrations, patterns, designs, indicia, and/or shapes, and combinations thereof.

Further, images, patterns, shapes, and/or designs useful in the present disclosure may be varied by palette, combination of standard or random images, size, positioning on a surface and/or customized by combination of multiple parameters, for example, pictures, patterns, palette, size, positioning, among others. The images, patterns, shapes, and/or designs useful in the present disclosure may also be varied by coloring with reflective and/or refractive elements, optical effects provided by an overcoat, the use of optical properties of static or dynamic flat images, and/or use of tactile properties imparted to a surface by additives and/or by affixation of the décor product.

It is further contemplated that images, patterns, shapes, and/or designs useful in the present disclosure may also be chosen by the consumer based on like or dislike, visual evaluation by comparing an image with a standard set of images, colors, and/or templates. The images, patterns, shapes, and/or designs useful in the present disclosure may also be chosen based on an interactive digital library with changeable parameters for adjustment to specific room or other volume environments, and may also be based on computer modeling for a specific room or other volume.

Further still, the images, patterns, shapes, and/or designs contemplated may be, for example, the result of freestyle design, the creation of single color images using varied forms of stencils, the creation of multiple color images using several stencils, the creation of multiple color images using compound stencils where with a sequential and possibly repeated manner one color is applied to a surface and stencil, then a layer of stencil removed and a protective layer added to protect the first color and/or a second color is immediately applied creating a color mixture on the dual exposed areas and a single color area on the single exposure areas, transfer of prefabricated images from a carrier, and/or sequential image fabrication from standard elements such as lines, dots, and/or pixels.

Additional images, patterns, shapes, and/or designs contemplated may be unique art work, single independent images, one or more systems of connected, potentially interrelated images coordinated with the immediate environment (with a room or objects within or characteristic of a room), and/or a two way coordination of decorative images on one or more surfaces and immediate surroundings. Further, images, patterns, shapes, and/or designs contemplated may serve purposes beyond visual ornamentation, such as teaching, directing, and/or instructing, including prompts, reminders, messages, alphabets, maps, equations, phrases, poems, warnings, language tools, or indexing means (for example, bar codes).

It is also contemplated that combining one or more décor products with at least one stencil allows a user to create images that may be monochromatic with constant or varied intensity and with or without shadow effects. Further, images possible using the present disclosure may also be polychromatic with constant or varied intensity and with or without shadow effects, or may be two or more color contrast images achieved via multiple patches of colors and shapes. Polychromatic images may have mixed or intermediate colors and may or may not provide complete and natural palette. Any number of variations to the appearance of a treated surface may be achieved using the compositions of the décor product envisioned in this disclosure along with or more design devices.

Figure 12:
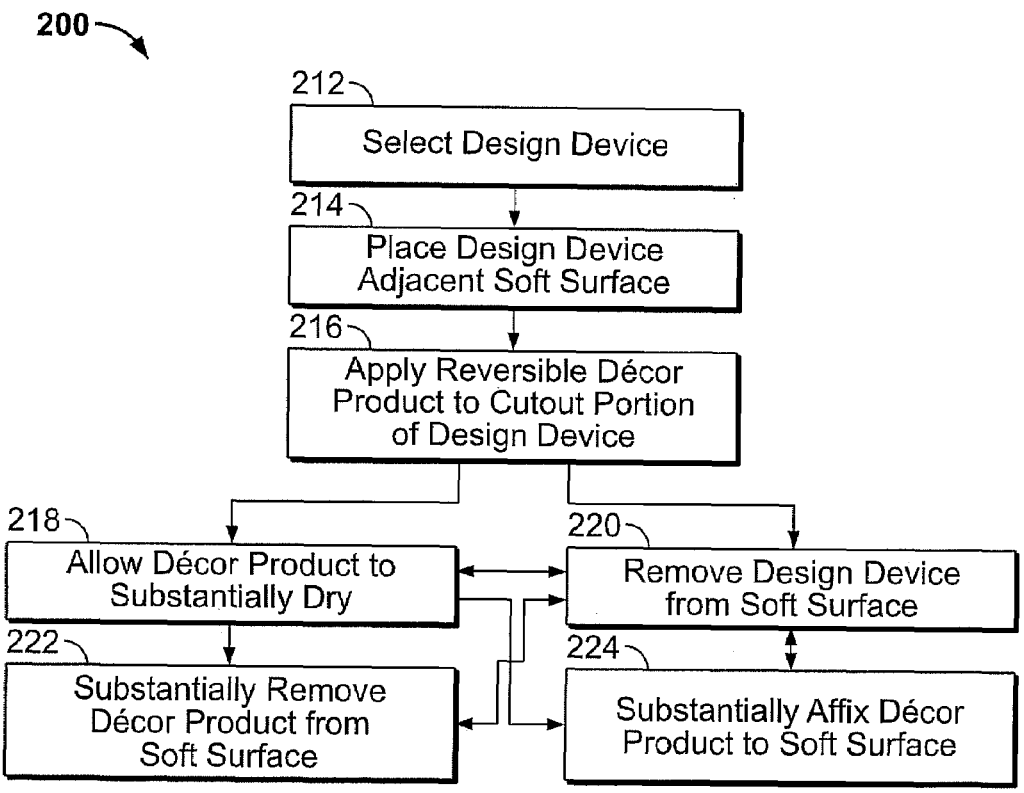
FIG. 12 is a flow diagram illustrating a method of applying a design to a carpet.

An example of using the décor product with a design device is described hereafter. As seen in FIG. 12, a method of applying a design to a soft surface such as a carpet is shown generally at 200. In one embodiment, the carpet is already been installed in a room and may be substantially dry, although the method may be undertaken on a wet or humid surface as well. To apply the design to the carpet, according to one method of the present disclosure, a user first selects one or more design devices at step 212.

In addition to selecting one or more design devices, a user may select one or more décor products to be incorporated into the design that may differ, for example, by color. One or more consumer aids may be used to assist the user in making these selections. The design mechanisms may include, for example, a user making a simple decorating decision, such as determining an arrangement of design devices and colors to sophisticated computer design aids, such as CD-ROM training programs that teach color application or provide creative suggestions. Additional consumer aid design mechanisms include color analysis, matching, and blending, and may include the use of calorimeters, color scanners, and/or software algorithms. Further examples of consumer aids, are disclosed herein.

Once the user has selected one or more design devices, the user then places the design device adjacent the carpet (step 214). The one or more design devices may be placed in any arrangement on the carpet and may cover a small portion of the surface, such as a center, edge, or corner, or substantially the entire carpet, or any amount therebetween.

After the one or more design devices have been placed in a desired arrangement on the carpet, the user applies a décor product to a cutout portion of the design device at step 216. Alternatively, or in addition to, the décor product may be placed on portions of the design device that directly contact (for example, a non-cutout portion of the design device) the soft surface. Upon contacting the surface, the user may allow the décor product to substantially dry on the surface at step 218. After application of the décor product the design device may be left in place while the décor product dries or may be removed from the surface immediately after application at step 220. If the used decides not to keep the design on the surface, the user may substantially remove the décor product from the surface as described herein at step 222. Otherwise, if the user decides to keep the design, the user may substantially affix the décor product to the surface as described herein at step 224. Further, the design device may be removed from the surface before or after the décor product is removed from or affixed to the surface.

Figure 13:
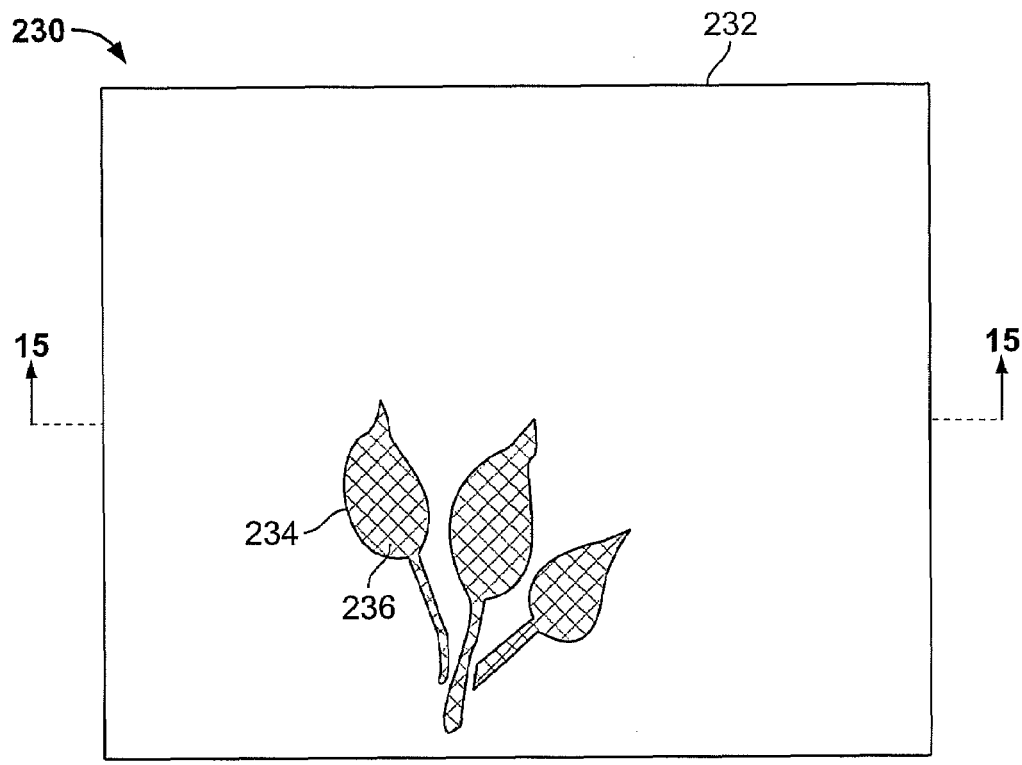
FIG. 13 is plan view of a design device for use with the method of FIG. 12.

An example of a stencil 230 useful in the present disclosure is shown in FIG. 13. The stencil 230 consists of a stencil base 232 and a cutout portion 234. The stencil base 232, including the material containment layer (not shown), barrier layer (not shown), and a support layer 236, is made out of any appropriate material including, for example, paper, plastic, cardboard, cloth, synthetic fabric, natural fabric, cellulose, and/or metal, or any other desired material. The cutout portion 234 consists of any pattern, shape, or design desired. A support layer 236, as is visible through the cutout portion 234, is provided adjacent a bottom surface of the stencil base 232. The stencil 230 is used to create an image on a surface by applying the décor product to the cutout portion 234 of the stencil, wherein upon removal of the stencil, the design is left on the surface of the carpet. The décor product can then be removed or affixed.

Figure 13A:
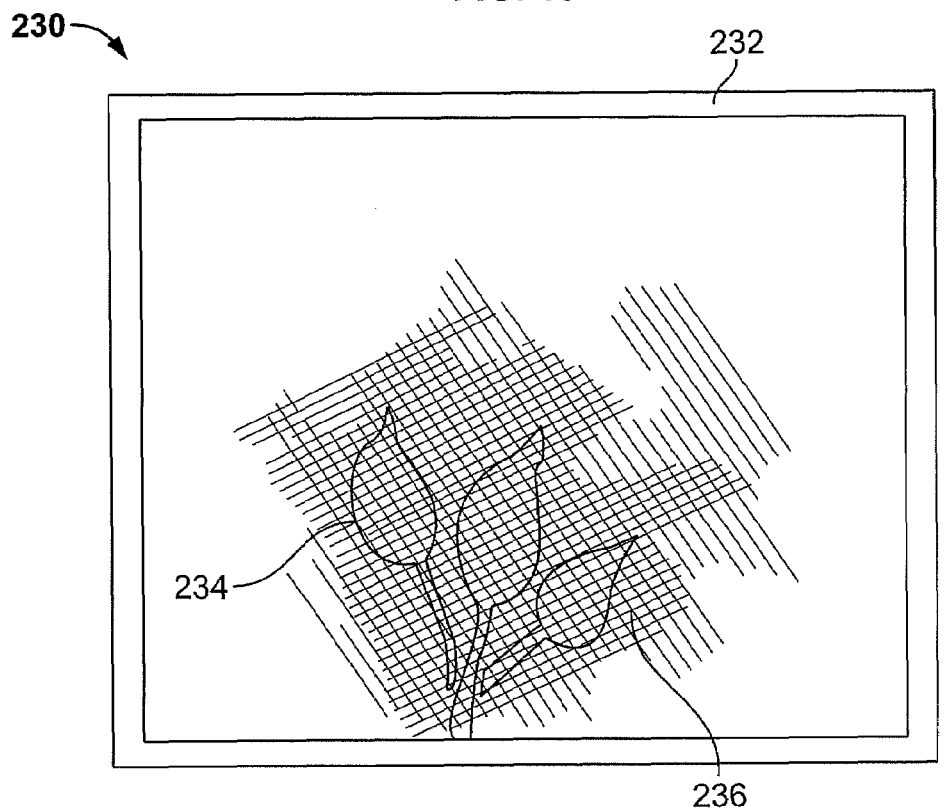
FIG. 13A is a bottom plan view of the design device of FIG. 13.

A bottom view of the stencil 230 is shown in FIG. 13A, further depicting the support layer 236. The support layer 236 extends across a small portion of a bottom surface of the stencil base 232, but may extend to and/or beyond edges of the stencil base. The support layer 236 assists in securing the stencil 230 to a soft surface, securing the edges of the stencil, keeping the stencil flat, and securing and/or facilitating the transfer of a décor product.

Figure 14:
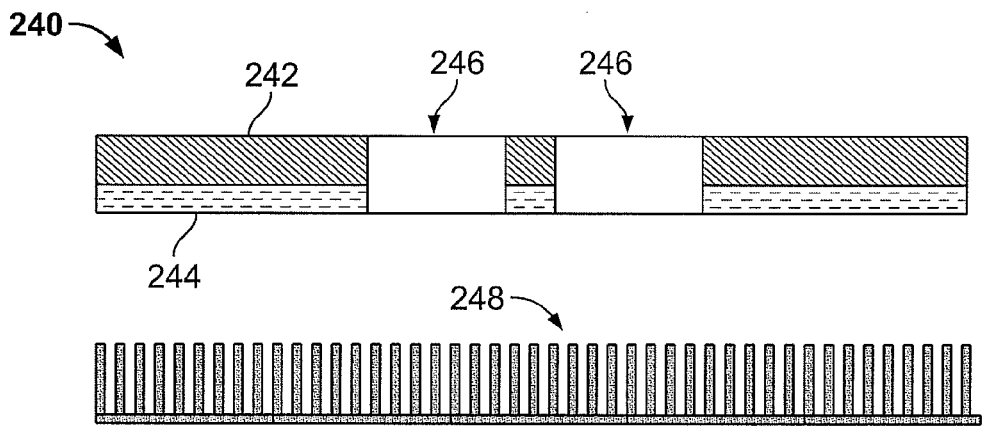
FIG. 14 is a cross-sectional view depicting an alternate embodiment of the design device.

A cross section of a stencil useful in the present disclosure and similar to the stencil 230 of FIGS. 13 and 13A is shown at 240 in FIG. 14. The stencil 240 includes an absorbent top layer 242, a liquid barrier layer 244, and cutout portions 246 representing a cutout portion of a design, such as the cutout portion 234 (FIGS. 13 and 13A). In addition, the stencil 240 may be disposed adjacent a carpet 248. The absorbent top layer 242 inhibits or prevents dripping and/or bleeding of a décor product while on the carpet 248, as well as when the stencil 240 is removed from the carpet, and may consist of, for example, paper tissue and/or a synthetic non-woven material coated with an absorbent, hydrophilic material. The liquid barrier layer 244 is disposed adjacent the absorbent top layer 242 and inhibits or prevents the décor product from seeping through to the carpet 248 and may consist of any hydrophobic material, including, for example, a polyolefin such as polyethylene.

Figure 15:
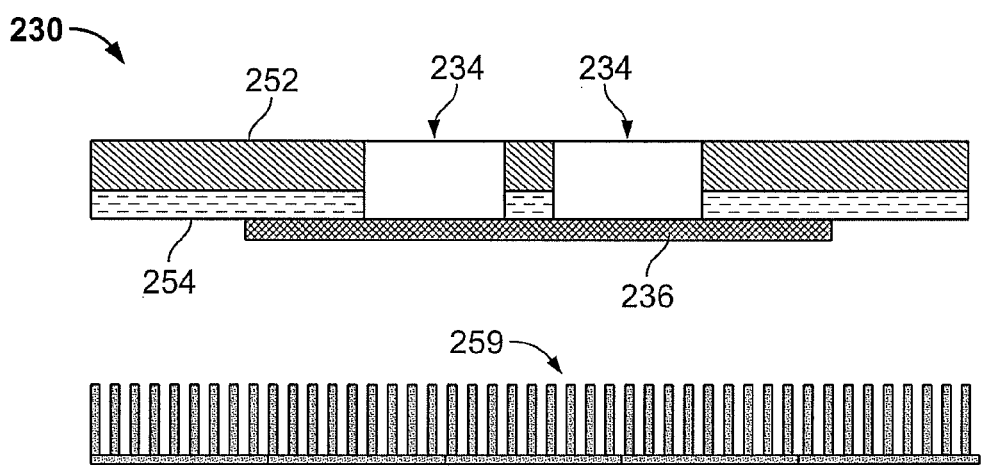
FIG. 15 is a cross-sectional view taken generally along the lines 15-15 of FIG. 13 depicting an alternative embodiment of the design device.

A cross sectional view of the stencil 230 is shown in FIG. 15. The stencil 230 includes an absorbent top layer 252, a liquid barrier layer 254, and cutout portions 234, and may be disposed adjacent a carpet 259. The stencil 250 further includes a support layer 236 that may consist of a woven and/or non-woven mesh material, such as, for example, tulle, scrim, and/or cheesecloth spanning the cutout portion and that allows the décor product to substantially pass therethrough.

Figure 16:
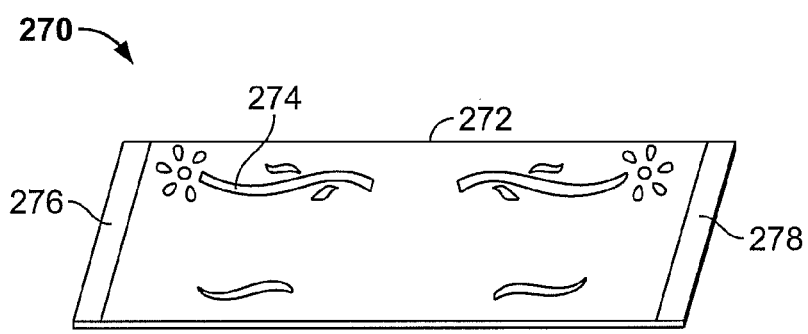
FIG. 16 is an isometric view of a border design device, having a color-coding strip thereon, for use with the method of FIG. 12.

FIG. 16 illustrates an additional stencil that may be provided, for example, in a kit, shown generally at 270. The stencil 270 may be used at a border of a carpet and includes a stencil base 272 and a cutout portion 274. The stencil 270 also includes color strips 276 and 278 having a specific color thereon, for the purpose of aligning the stencil 270 with one or more additional stencils having corresponding and/or complementary color strips.

Figure 17:
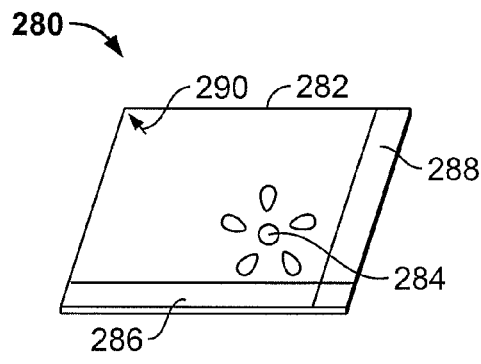
FIG. 17 is an isometric view of a corner design device, having a color-coding strip thereon, for use with the method of FIG. 12.

A stencil 280 that may be used at a corner of a carpet is shown in FIG. 17. The stencil 280 includes a stencil base 282 and a cutout portion 284. The stencil 280 further includes color strips 286 and 288 and an arrow 290 used for aligning the stencil 280 with internal surfaces of a corner of the carpet.

Figure 18:
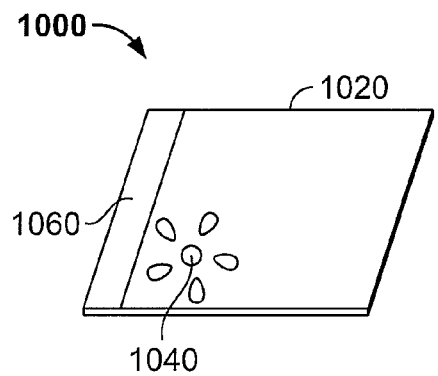
FIG. 18 is an isometric view of a first end design device, having a color-coding strip thereon, for use with the method of FIG. 12.
Figure 19:
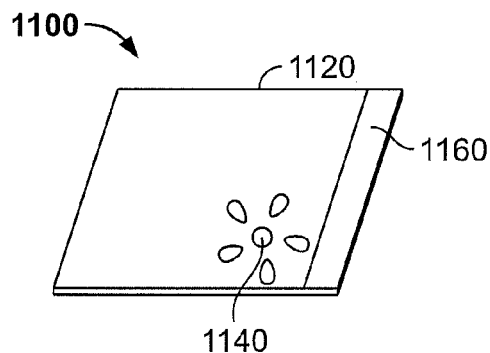
FIG. 19 is an isometric view of a second end design device, having a color-coding strip thereon, for use with the method of FIG. 12.

Two additional stencils are shown in FIG. 18 and FIG. 19. A stencil 1000 of FIG. 18 may be used at a first end of a carpet and includes a stencil base 1020, a cutout portion 1040, and a color strip 1060. A stencil 1100 of FIG. 19 may be used at a second end of a carpet and includes a stencil base 1120, a cutout portion 1140, and a color strip 1160.

Figure 20:
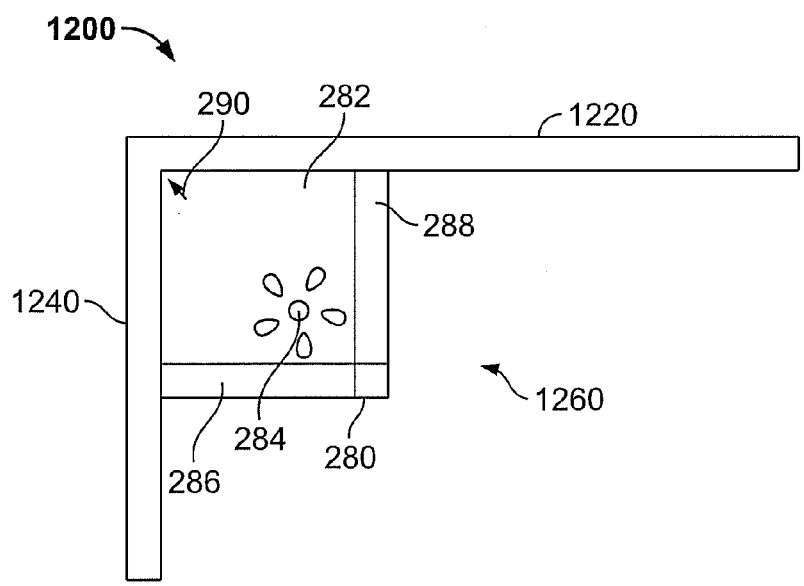
FIG. 20 is a plan view of a placement of the corner design device of FIG. 17, according to a set of instructions.
Figure 21:
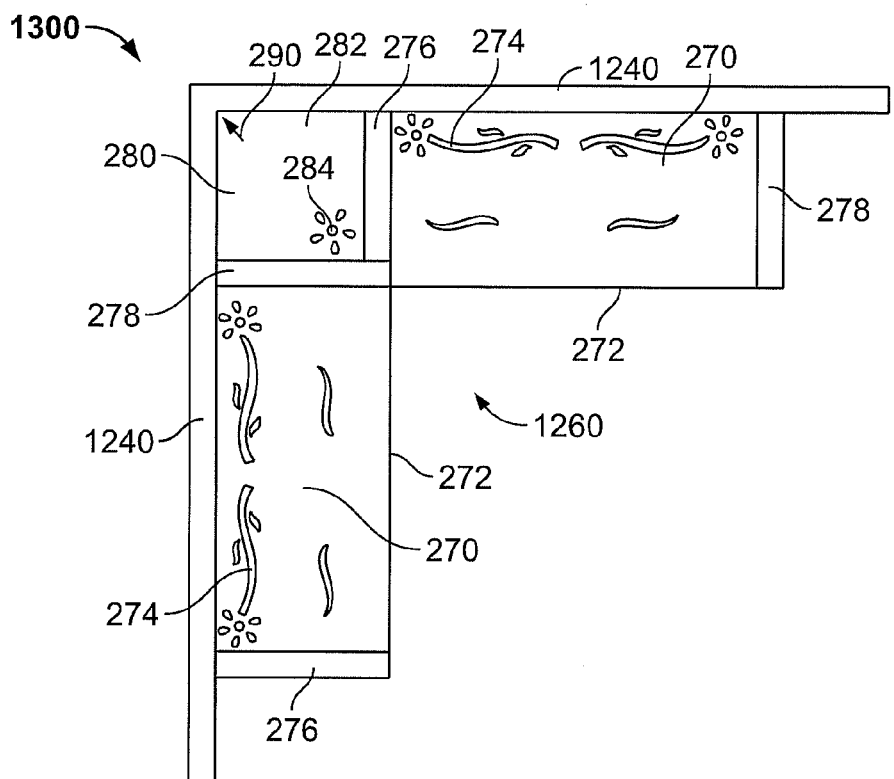
FIG. 21 is a plan view of a placement of first and second border design devices of FIG. 16 according to a set of instructions.
Figure 22:
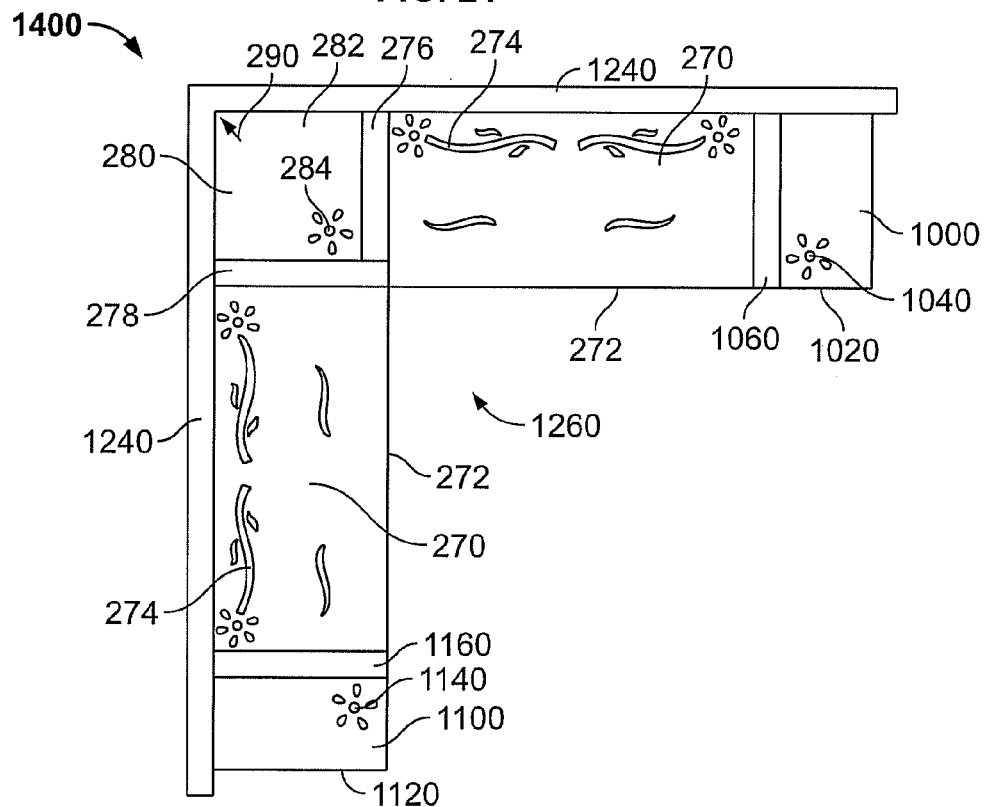
FIG. 22 is a plan view of a placement of the first and second end design devices of FIGS. 18 and 19, respectively, according to a set of instructions.

FIGS. 20-22 illustrate an exemplary application of the respective stencils 270, 280, 1000, 1100 of FIGS. 16-19 to a carpet 1260 according to a sample set of instructions that may be provided in a kit along with the stencils. As shown in FIG. 20, a room 1200 is provided for illustrative purposes. The room 1200 includes a first wall 1220, a second wall 1240, and the carpet 1260. Following the instructions provided, the user is instructed to place the corner stencil 280 of FIG. 17 into a corner formed by walls 1220 and 1240, wherein the arrow 290 is pointing to the corner.

The user is further instructed to place first and second border stencils 270 of FIG. 16, adjacent the corner stencil 280 of FIG. 17, as shown in FIG. 21. The color strip 276 of the first border stencil 270 is placed on top of or adjacent the color strip (not shown) of the corner stencil 280 having the same color thereon. Likewise, the color strip 278 of the second border stencil 270 is placed on top of or adjacent the color strip (not shown) of the corner stencil 280 having the same color thereon.

Further, and as shown in FIG. 22, the user is instructed to place the first and second end stencils 1000 and 1100 of FIGS. 18 and 19, respectively, adjacent the first and second border stencils 270. The color strip 1060 of the first end stencil 1000 is placed on top of the color strip (not shown) of the first border stencil 270 having the same color thereon. Likewise, the color strip 1160 of the second end stencil 1100 is placed on top of the color strip (not shown) of the second border stencil 270 having the same color thereon.

Figure 23:
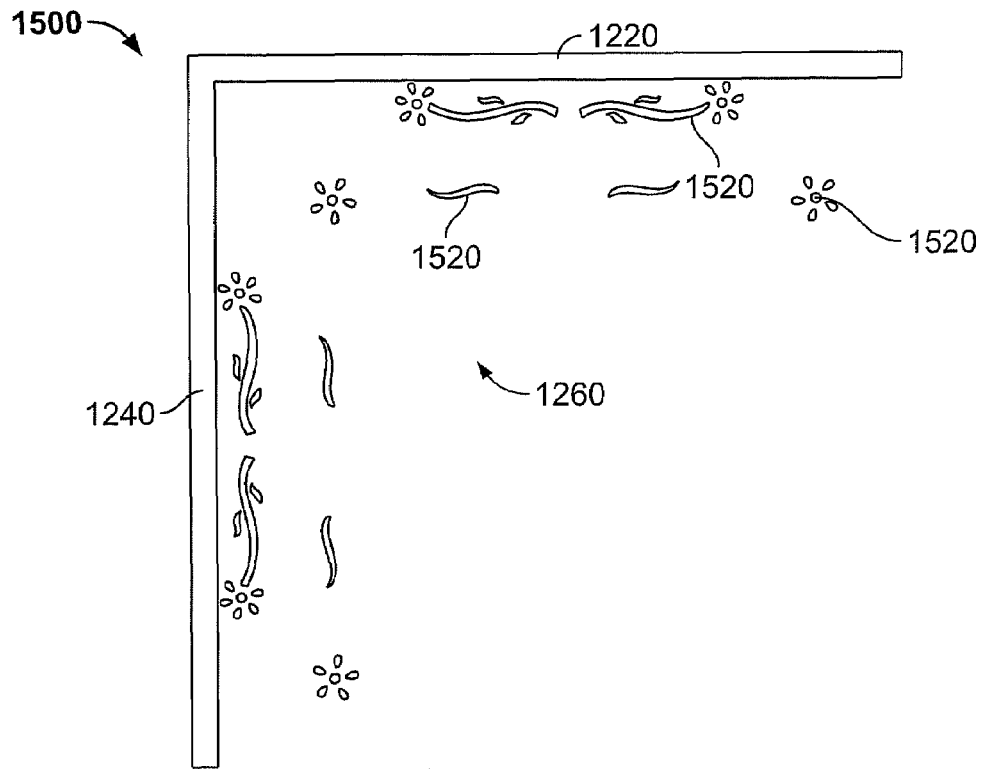
FIG. 23 is a plan view of a décor product affixed to a carpet according to the placement of the design devices as disclosed in FIGS. 20-22.

The user may then apply (for example, by spraying) the décor product on the cutout portions of the stencils 270, 280, 1000, 1100. After applying the décor product, the user may remove the stencils to view the design produced on the carpet by the remaining décor product 1520. A sample design created by the remaining décor product 1520 is shown generally at 1500 in FIG. 23.

Figure 24:
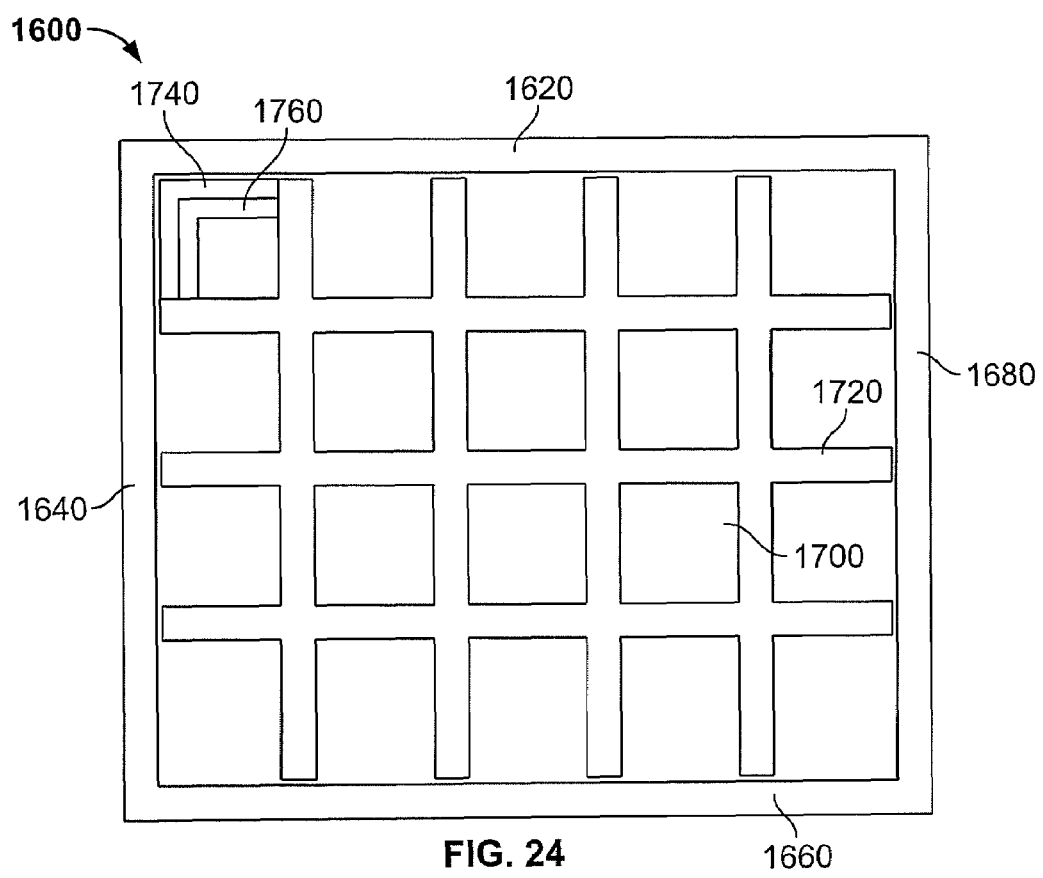
FIG. 24 is a grid pattern for use with one or more design devices according to the method of FIG. 12.

In yet an alternative embodiment, a room 1600 is shown in FIG. 24. Four walls 1620, 1640, 1660, and 1680 define outer portions of a carpet 1700. A design device, such as a grid pattern 1720, may be used in conjunction with one or more design devices, such as a stencil 1740. The grid pattern 1720 may be designed to cover all or a portion of the carpet 1700. Once the grid pattern 1720 is placed adjacent the carpet 1700, one or more stencils, such as the stencil 1740 having a cutout portion 1760 therethrough, may be used to create a design. The stencil 1740 and the grid pattern 1720 may include color strips, such as the color strips illustrated in FIGS. 16-19 to assist the user in arranging the design devices. Alternatively, letters, symbols, notches, indicia and/or other unique identifiers may be used to assist in arrangement of the stencil 1740 with the grid pattern 1720.

In addition to creating discrete images and the like as disclosed above, the present disclosure may be used as a resource for large area interior design in a commercial and/or non-commercial setting. In this capacity, the present disclosure may be used, for example, to create a border on a surface that would be monochromatic (solid, discrete design, random design) or polychromatic (solid, discrete design, random design) or to create a whole room change such as discrete shapes, images, design, random shapes by applying a monochromatic solid or non-solid or a polychromatic solid or non-solid décor product (full coverage) from wall to wall or that would account for complex room peripheries, such as fireplace stoops, door/entryways, jogs in walls, carpet to non-carpet thresholds, sunken or raised portions in rooms, floor vents, outlets, other built in items disruptive of surfaces in general.

Still further, the present disclosure may be used for creating a discrete image in a selected area of interest as determined by the user such as, for example, a wall, a ceiling, a doorway, an entryway, a walkway, a hallway, a stair, or a flight of stairs, or at the top of a flight of stairs, or in front of or over a hearth or fireplace.

The present disclosure also provides kits that contain one or more components herein described, including, for example, a design device and/or a décor product that may be substantially removed from a surface prior to being affixed thereon. A set of instructions may also be included in the kit instructing the user how to apply the design to a soft surface such as a carpet. The kit may further comprise one or more application devices for transferring the décor product to the carpet and/or one or more fixative devices for affixing the décor product to the surface. In addition, the kit may include a protective covering for protecting the décor product after it has been applied to the carpet, especially while it is drying. The kit may further include an iron screen that is used to provide a user with an indication of what areas of the décor product have already been ironed or affixed.

As an example, the kit may be provided having one or more stencils, for example, five stencils, a décor product, an application device such as a sprayer, an affixing device such as a heating device (for example, an iron or a radio frequency emitting device), and/or a set of instructions. The kit may also include a system to identify, choose, make, modify, and/or prepare the surface on which the décor product is to be applied.

Numerous options for customization of the present disclosure may be utilized with the assistance of one or more consumer aids. Consumer aids contemplated in the present disclosure, which may be provided in a kit, individually and/or in any suitable fashion, include any and all design mechanisms and/or aids and devices that enable the consumer to use the present disclosure including instructions, color predicting aids, design templates showing the look prior to and/or after decorating possibly using a software algorithm to present a retrospective view of a surface treated with the décor product, instructional videos, CD-ROMs, internet web pages to select and predict designs, colors, and overall looks, interactive computers terminals, in store displays, customer service, advertising, training courses, recorded messages, text messages, mailings, books, literature, lectures, training courses, correspondence courses, and any combination thereof, as well as, other communicating means. Through the aforementioned communicating means, a user may be taught, for example, how to use a kit including the present disclosure. Further, the user may be instructed how to employ the disclosure for commercial applications such as, for example, interior design applications.

Additional consumer aids include devices to be employed by persons such as a user, an agent of the user, a trainer, a displayer, a salesman, a teacher, or a technician to enable the user to use the present disclosure such as color carpet chips, for example, pieces of carpet with differing décor product formulations of differing coverage affixed thereon to demonstrate how different décor product formulations appear on different types and/or colors of carpet. Further consumer aids include color templates, for example, sheets of opaque or clear material of different colors with different colors of décor product affixed thereon with instructional ratios of the base colorants used to make each décor product color to allow the user to make each décor product color from the separate base colorants and other additives.

Figure 25:
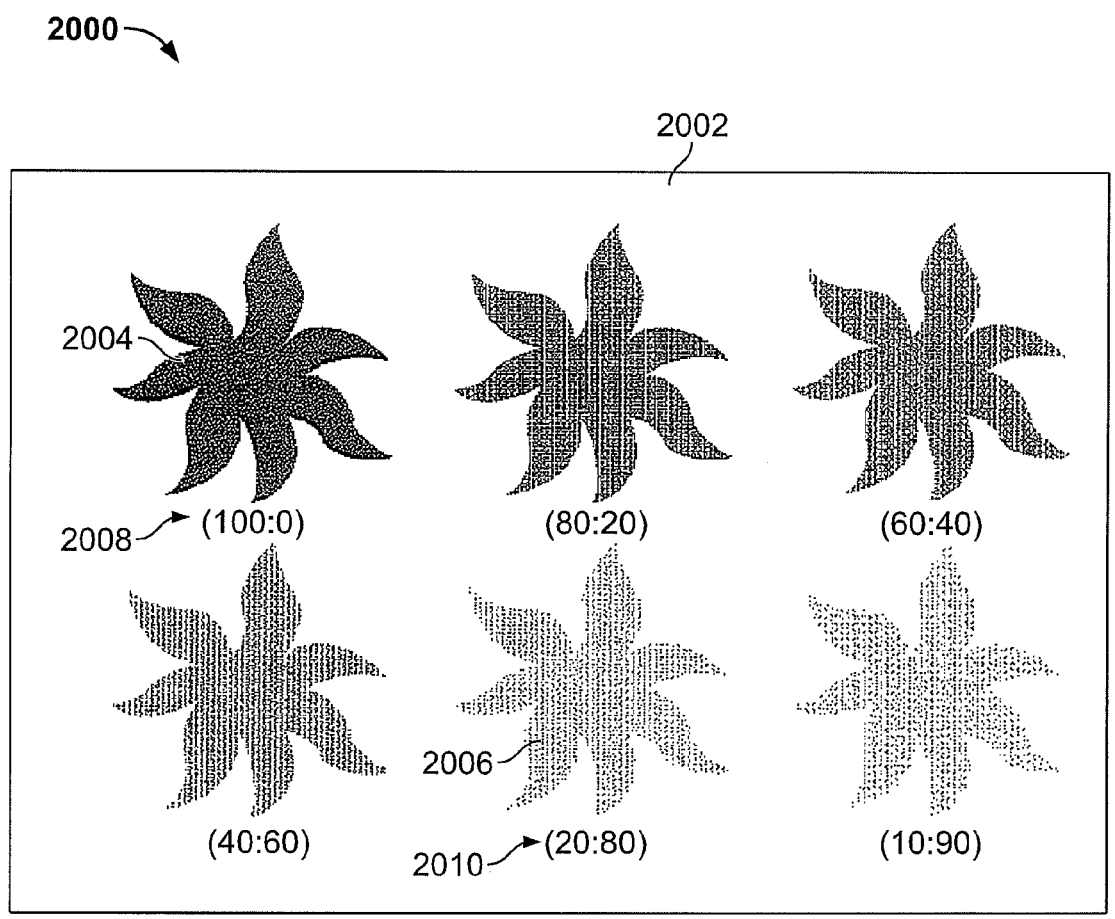
FIG. 25 is an illustration of a consumer aid according to one embodiment.

Illustratively, in FIG. 25 an exemplary consumer aid 2000 is shown that enables a user to preview how a pattern will appear in a certain color (or shade or tint or texture any other variation) on a surface when the consumer aid is placed on the surface. The consumer aid 2000 may enable the user to make or mix the décor product and/or assist the user in selecting the color of the décor product that would be an appropriate and/or aesthetically pleasing color and/or contrast when compared to the base color of the surface. The consumer aid 2000, in this case, is included in a kit having two décor products of differing colors, such as dark gray and white. Further, the consumer aid 2000 includes instructions on how to achieve each variation in pattern displayed on the consumer aid, in this case varying shades of gray. The consumer aid 2000 of the current embodiment includes a transparent sheet 2002 upon which is disposed a pattern 2004 that is repeated a number of times, such as six times. Each repeat has a different shade of gray becoming more white progressing from upper left to lower right, as is seen by comparing, for example, pattern 2004 and pattern 2006. Beneath each pattern repeat is a ratio printed on the transparent sheet 2002 that indicates a mixture percentage, such as is seen at 2008 where a mixture of 100 percent dark gray and 0 percent white is indicated or as is seen at 2010 where a mixture of 20 percent dark gray and 80 percent white is indicated. In this way, a user may achieve each of the shades of gray associated with each pattern repeat by mixing the dark gray and white décor products included in the kit at the percentages indicated. Further, any color may be created in this manner by mixing appropriate amounts of differing colored décor products. Further, any sort of instructions is contemplated to instruct a user to achieve a given color and/or pattern appearance. Further, the kit may also include a combined mixing and application device that contains the décor product(s) and corresponds with the consumer aid, such that the percentages given the example above for mixing dark gray and white décor products may indicate how to adjust the settings on the mixing and application device to achieve the indicated color or shade or texture shown on the consumer aid 2000.

Additional consumer aids include carpet templates, stencil templates, for example, templates illustrative of different images and image characteristics that are possible or desirable to a user, as well as how different stencils can be used together, positional templates, for example, templates that indicate to a user how a décor product image can be incorporated on a surface in a given space, tester samples (similar to the tester samples supplied by Benjamin Moore & Co.), trial periods, color matching sheets, for example, similar to color matching sheets used in make-up matching to skin tones, used to match colors, or to predict color look and contrast, color blending sheets, for example, similar to color matching sheets that further allow a user to preview combined colors on a surface, color charts, color graphs, color analysis devices, colorimeters, color scanners, software algorithms for color assessment and formulating colors, and other means for determining proportions and types of décor product to be used for a specified or unspecified surface in a room, hallway, house, building, or other area.

In addition, by mixing differently colored décor products, any number of additional colors may be formed. As an example, a user may purchase one or more pre-formulated décor products including colored toners and/or other décor particles or may mix various colored toners to achieve any desired color. Design mechanisms such as color charts, color analysis devices, or other ways for determining the proportion and type of colored toner to achieve a particular color can also be provided to a user. Additionally, a user may directly apply the toners to the surface or the toners may be incorporated into the décor product such as by mixing the toner with water or another solvent, or a predetermined formulation of more than one part to make a liquid suspension or emulsion, for example, and then applied to the surface.

Additional consumer aids include devices to be employed by the user to help the user identify, (for example, tools and/or kits used to identify the type or composition of carpet fibers to help direct the user toward a particular décor product formulation), choose, make, modify (for example, kits or compounds that can be included in kits to alter the physical appearance of a surface, such as an embossing compound), combine, and prepare surfaces on which a décor product may be applied and/or affixed. These consumer aids enable the user to choose the correct décor product formulation for a given surface to have a given intended effect, for example, a textured look on a soft surface or a smooth look on a hard surface, or any combination thereof.

Further, the consumer aids will help users in choosing, making, modifying, combining and/or preparing design devices, such as a stencil, to render images, patterns, shapes, and/or designs to be imparted to the surface when applying the stencil and/or a décor product to the intended surface. Still further, the consumer aids contemplated help or assist the user in choosing, using, making, modifying, and/or preparing décor product formulations that may be ready-to-use or require preparation prior to application to a surface.

In addition to selecting one or more design devices, a user may select one or more colors to incorporate into the design. One or more design mechanisms may be used to assist the user in making these selections. The design mechanisms may include, for example, a user making a simple decorating decision, such as determining an arrangement of design devices and colors to sophisticated computer design aids, such as CD-ROM training programs that teach color application or provide creative suggestions. Additional design mechanisms include color analysis, matching, and blending, and may include the use of colorimeters, color scanners, and/or software algorithms.

Additional consumer aids may take the form of store displays and/or presentations of the disclosure, including, for example, the décor product packaged in liquid form or powder form to be suspended in liquid immediately before use, and/or one or multiple décor product colors and décor product additives to be mixed before use, and/or a kit comprising elements of the present disclosure such as multiple or single colors, one or more designs, instructions, an application device, a fixative device, a protective covering, and/or an iron screen or other indicator, such as, for example, a color changing additive, to differentiate between fixed and unfixed areas of the applied décor product.

Illustrative chemistries useful in a décor product composition includes a low temperature cure epoxy décor particle, a low temperature cure epoxy-polyester hybrid décor particle, and/or a low temperature cure polyester-triglycidyl isocyanurate (TGIC) décor particle. Typical ranges of constituents of the aforementioned décor particles contemplated in the present disclosure include an amount of binder, which includes at least a polymer or resin and one or more curatives, based on weight percentages of about 50% or greater of the total weight of the décor particle. Further, other components of the décor particle, including, for example, additives, fillers, pigments, degassing agents, flow additives, and the like, may be included in amounts ranging from about 50% or less of the total weight of the décor particle. Such ranges may be adjusted to attain the desired characteristics of the décor particle as appropriate as is known to those skilled in the art. Further, to assure full stoichiometry of reactions between polymers and/or resins and curatives, amounts of polymers and/or resins and curatives used may range from about 50% to about 150% based on relative equivalent weights of the compounds and/or as recommended by the manufacturer.

A low temperature cure epoxy décor particle may include a binder system that has an epoxy resin and a curative. An example of an epoxy resin is a bisphenol A resin having the following general chemical structure of Formula I:

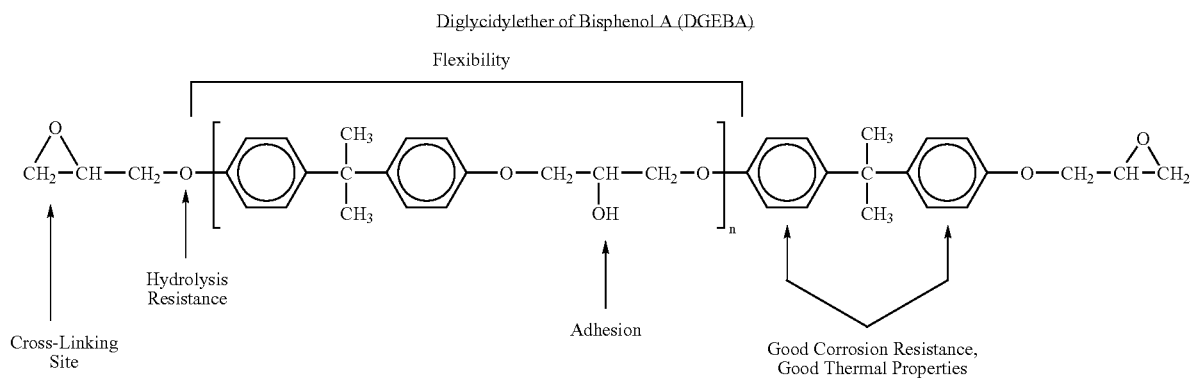

wherein n is an integer from 2 to 20.

Bisphenol A epoxy resins useful in a décor particle include those resins having an epoxy equivalent weight of about 650 to about 900, or about 700 to about 750; a Tg of about 45° C. to about 75° C., or about 55° C.; and/or an ICI cone and plate viscosity of about 5 poise to about 100 poise, or about 35 poise at 150° C.

Another example of an epoxy resin useful in a décor product formulation is a novolac epoxy resin. Examples of novolac epoxy resins include the following general chemical structures of Formulas II and III:

Epoxy Phenol Novolac

Formula II:

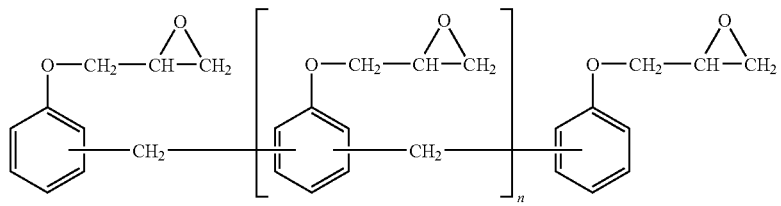

Epoxy Cresol Novolac

Formula III:

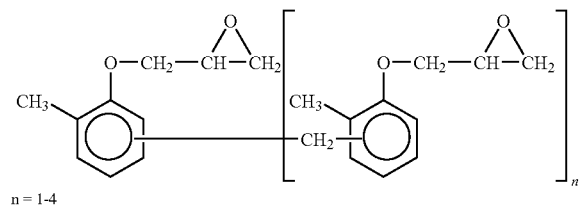

n = 1-4 wherein n is an integer from 1 to 4.

The glass transition temperatures and viscosities of the novolac epoxy resins are similar to those provided above for the bisphenol A epoxy resins. A curative agent useful in a binder system that has an epoxy resin includes, for example, a phenolic curative. An example of a phenolic curative agent is Huntsman Hardener XB 3086 supplied by Huntsman Advanced Materials (Switzerland) GmbH, which is compatible with bisphenol-A-based epoxy resins and novolac-epoxy-based resins. The Huntsman Hardener XB 3086 contains phenol, 4,4'-(1-methylethylidene)bis-, polymer with 2,2'-[(1-methylethylidene)bis(4,1-phenyleneoxymethylene)]-bis [oxirane] (commonly described as a polymer of epoxy resin and bisphenol A), a Huntsman Advanced Materials confidential accelerator, and Phenol, 4,4'-(1-methylethylidene)bis-(commonly known as Bisphenol A). The Huntsman Hardener XB 3086 has the following properties: amine value of 0.83-0.93 eq/kg, recommended combining weight of about 135, and a softening point of 84° C. to 94° C.

Stoichiometric ratios of the epoxy resin and the curative are calculated based on the combining weights, or equivalent values, of resins and curatives. Values of the combining weights may be determined by chemical structure (for example, average molecular weight divided by the number of reactive groups, amine values, acid or hydroxyl numbers, etc.) or empirically based on laboratory experiments. For example, using a lower molecular type 3 bisphenol A epoxy resin with an epoxy equivalent weight (EEW) of 700 and Huntsman Hardener XB 3086 with a manufacturer recommended equivalent weight of 135, the calculation for a full (100%) stoichiometry is shown below in Table No. 2.

TABLE NO. 2

Full Stoichiometry of an Epoxy Resin and Curative Agent Décor Particle.

| Constituent | Epoxy Equivalent Weight | Approx. Percent |
|---|---|---|
| Type 3 Bisphenol A Epoxy Resin | 700 | 84.2% |
| Huntsman Hardener XB 3086 | 135 | 15.2% |
| Total | 835 | 100.0% |

In other embodiments, the epoxy resin and curative agent ratio may range from, for example, about 84% to about 85% epoxy resin to about 16% to about 15% curative agent. To lower the cure temperature of an epoxy décor particle, accelerants and/or catalysts such as, for example, a phenolic curative may be incorporated into the composition. An illustrative phenolic curative has a combining weight of about 100 to about 500. Other accelerants and/or catalysts compatible with epoxy resins known to those skilled in the art may also be used. An illustrative cure condition for an epoxy-polyester hybrid décor particle includes a bake time of about 15 minutes at about 150° C., or less.

The low temperature cure epoxy décor particle composition may include any desired colorant and/or additive. Illustratively, a low temperature cure epoxy décor particle composition may include the following constituents as shown below in Table No. 3.

TABLE NO. 3

Low Temperature Cure Epoxy Décor Particle Compositions.

| Constituent | Approx. Weight % |
|---|---|
| Bisphenol A Epoxy | 48-58 |
| Bisphenol A Curative | 9-11 |

TABLE NO. 3-continued

Low Temperature Cure Epoxy Décor Particle Compositions.

| Constituent | Approx. Weight % |
|---|---|
| Flow Additive | 0.2-3 |
| Degassing Agent | 0.2-5 |
| Colorant | 0.3-40 |
| Filler | 10-30 |

Another illustrative chemistry useful in a décor product is a low temperature cure epoxy-polyester hybrid décor particle that has a binder system having a low temperature cure epoxy and a polyester resin. Illustrative epoxy resins include the bisphenol A epoxy resins or Novolac epoxy resins described above. An illustrative polyester resin includes an acid terminated saturated polyester resin. The polyester resin may have an acid number of between about 75 and about 85. Example includes acid terminated saturated polyesters used as a co-reactant in epoxy-polyester hybrid coating powder formulations. The polyester may be synthesized from neopentyl glycol, terephthalic acid, trimellitic anhydride, and other types of glycols and dibasic organic acids. The branched polyesters may have resin functionalities of about 2 to about 4, or of about 2.5 to about 3.5 (indicating, that about 2.5 to about 3.5 carboxyl groups per polyester molecule). Resin acid numbers may range from about 35 to about 90 with hydroxyl numbers of about 5 to about 10 (residual hydroxyl). Acid terminated, saturated polyester resins suitable for combination with epoxy resins may have an acid number of about 70 to about 90, or about 80; a calculated combining weight (combining weight equals 56,100/acid number) of about 625 to about 800, or about 700; a glass transition temperature about 45° C. to about 60° C., or about 55° C.; and/or an ICI cone and plate viscosity of about 15 poise to about 50 poise, or about 25 poise, at about 200° C.

To lower the cure temperature of an epoxy-polyester hybrid décor particle, an accelerant and/or catalyst such as, for example, a stannous-organic and/or imidazole-type compound may be incorporated into the composition. Other accelerants and/or catalysts known to those skilled in the art may also be used. An illustrative cure condition for an epoxy-polyester hybrid décor particle includes a bake time of about 15 minutes at about 150° C., or less.

Stoichiometric ratios for an epoxy-polyester hybrid décor particle may be calculated based on the combining weights of resins and curatives. However, as known in the art, molecular structure and chemical functionalities may differ and fluctuate for organic polymer products, making the depiction and calculation of chemical reactions more difficult and ambiguous than for inorganic chemical reactions. Illustratively, stoichiometric ratios may be calculated based on combining weights (also referred to as equivalent values) of epoxy and acid-terminated polyester resins. The values of the combining weights may be determined by chemical structure (for example, average molecular weight divided by the number of reactive groups, amine values, acid numbers, etc.). For example, a lower molecular weight type 3 bisphenol A epoxy resin with an epoxy equivalent weight of 700 and an acid terminated saturated polyester resin with an average number of 80 (combining weight of polyester equals 56,100 divided by 80, which equals approximately 700), provides a full (100%) stoichiometric calculation as shown below in Table No. 4.

TABLE NO. 4

Full Stoichiometry of an Epoxy-Polyester Hybrid Décor Particle.

| Constituent | Epoxy Equivalent Weight | Approx. Percent |
|---|---|---|
| Type 3 Bisphenol A Epoxy Resin | 700 | 50% |
| Acid Terminated Polyester | 700 | 50% |
| Total | 1400 | 100.0% |

The low temperature epoxy-polyester hybrid décor particle composition may include any desired colorant and/or additive. Illustratively, a low temperature cure epoxy-polyester hybrid décor particle composition may include the following constituents as shown below in Table No. 5.

TABLE NO. 5

Low Temperature Cure Epoxy-Polyester Hybrid Décor Particle Compositions.

| Constituent | Approx. Weight % |
|---|---|
| Bisphenol A Epoxy | 29-34 |
| SP3320 Hybrid Polyester | 29-34 |
| Flow Additive | 0.2-3 |
| 2-PI (Catalyst) | 0.2-0.8 |
| Degassing Agent | 0.2-5 |
| Colorant | 0.3-40 |
| Filler | 10-30 |

Another illustrative chemistry useful in a décor product is a low temperature cure polyester-triglycidyl isocyanurate (TGIC) décor particle. Illustratively, a polyester includes an acid terminated saturated polyesters synthesized using, for example, a monomer such as trimethylolpropane, terephthalic acid, neopentyl glycol, adipic acid, hexanediol, 1,4-cyclohexyldimethanol, and isophthalic acid, and pentanediol. The polyesters in one embodiment have resin functionalities of about 2.05 to about 2.2 (that is, about 2.05 to about 2.2 carboxyl groups per polyester molecule). The resin acid numbers may range from about 20 to about 60, or range on average from about 28 to about 38. The hydroxyl numbers may range from about 5 to about 10 (residual hydroxyl). TGIC is a trifunctional epoxide resin that is used as a hardener in polyester-based powder formulations. The combining weight of TGIC is 106. Illustratively, an acid terminated, saturated polyester resins suitable for combination with TGIC in a low temperature cure polyester-TGIC décor particle possess, for example, an acid number about 30 to about 40, or about 35; a calculated combining weight (combining weight equals 56,100 divided by acid number) of about 1,400 to about 1,870, or about 1,600; a glass transition temperature about 45° C. to about 70° C., or about 55° C.; and/or an ICI cone and plate viscosity of about 15 poise to about 50 poise, or about 25 poise, at 200° C.

To lower the cure temperature of a polyester-TGIC décor particle, an accelerant and/or catalyst such as, for example, triphenylethyl phosphonium bromide and/or imidazole-type compounds may be incorporated into the composition. Other accelerants and/or catalysts known to those skilled in the art may also be used. For example, a glycidyl curative chemistries such as aliphatic, cycloaliphatic, aromatic, and methacrylate based glycidyl compounds with equivalent weights of about 50 to about 1,000 and melt temperatures below about 125° C. may by utilized in the low temperature cure polyester- TGIC décor particle. An illustrative cure condition for a polyester-TGIC décor particle includes a bake time of about 15 minutes at about 135° C.

As mentioned above, molecular structures and chemical functionalities may differ and fluctuate for organic polymer products. Illustratively, stoichiometric ratios are calculated based on the combining weights of epoxy and acid terminated polyester resins. Values of the combining weights may be determined from the chemical structure of the respective compounds. For example, an acid terminated saturated polyester with an average acid number of 35 (combining weight of polyester equals 56,100 divided by 35, which equals approximately 1,600) combined with TGIC, provides a full (100%) stoichiometric calculation as shown below in Table No. 6.

TABLE NO. 6

Full Stoichiometry of a Polyester-TGIC Décor Particle.

| Constituent | Epoxy Equivalent Weight | Approx. Percent |
|---|---|---|
| Acid Terminated Polyester | 1600 | 93.8% |
| TGIC | 106 | 6.2% |
| Total | 1706 | 100.0% |

Due to the large molecular size of the polyester resin and the small molecular size and spherical shape of TGIC, a about 10% to about 15% stoichiometric surplus of TGIC may be utilized to achieve, for example, a polyester resin/TGIC ratio of 93/7.

The low temperature polyester-TGIC décor particle composition may include any desired colorant and/or additive. Illustratively, a low temperature polyester-TGIC décor particle composition may include the following constituents as shown below in Table No. 7.

TABLE NO. 7

Low Temperature Cure Polyester-TGIC Décor Particle Compositions.

| Constituents | Approx. Weight % |
|---|---|
| RUCOTE ® 921 Polyester | 54-63 |
| TGIC | 4-5 |
| Flow Additive | 0.2-3 |
| Degassing Agent | 0.2-5 |
| Colorant | 0.3-40 |
| Filler | 10-30 |

An alternative carboxyl polyester resin curative to TGIC includes, for example, PRIMID® (EMS-Primid, a unit of EMS-Chemie AG). PRIMID® is a beta-hydroxyl alkyl amide curative. However, PRIMID® may require longer cure times than a TGIC-based chemistry, as well as a PRIMID® based coating may appear slightly more orange than a TGIC-based coating. Pinholes and blistering may also be an issue with the use of a PRIMID® based décor particle where a coating thickness exceeds 4.0 mils.

As mentioned above, a décor product, which includes a décor particle, may include any desired colorant and/or additive. Illustratively, the décor particle composition may include, for example, a flow additive, a degassing agent, a surfactant or wetting agent, an antioxidant, a heat stabilizer, a ultraviolet light absorber, a wax, a silicone additive, a catalyst, a texturing agent, an electrical charge control agent, an electrical conductivity agent, a processing aid, a filler, and combinations thereof.

Flow additives may be utilized in formulating a décor particle composition to, for example, reduce or prevent cratering of a finished cured product and/or to improve flow and leveling. Illustratively, the flow additives may be low molecular acrylic polymers, either in liquid form (for example, a liquid containing about 100% active substance), or in solid form (for example, a solid with about 65% active substance). Examples of flow additives include Acronal 4F (about 100% active, BASF), Byk 363 P (about 65% active, BYK-Chemie), RESIFLOW® P-67 (manufactured by Estron Chemical), RESIFLOW® PF-67 (about 65% active, Estron Chemical), MODAFLOW™ 3 (about 65% active, Monsanto), and POWDERMATE™ 486 CFL (about 65% active, Troy Corp.). Illustratively, a flow additive may be added to a décor particle composition in a range of between about 0.3% to about 1% of 100% active flow additive per total formula weight of the décor particle.

A degassing agent may be added to a décor particle composition to, for example, aid in the evaporation of volatile products within the composition during the heating and/or curing cycle to reduce and/or prevent pinholing (volatile bubbles being trapped at the surface boundary between the finish and the air). Some degassing agents, such as Benzoin (Velsicol Chemical Corp.), may solvate the resin/curative mix during the liquid phase of the cure process. Other degassing agents are surfactant-like and other are wax-like and affect the surface tension of the film surface to promote degassing. Illustratively, a décor particle composition may contain from about 0.2% to about 2% of active degassing agent per total formula weight of the décor particle. For example, a décor particle that is curable between about 135° C. and about 149° C. (for example a polyester-PRIMID® chemistry), may contain a combination of about 1% to about 1.8% OXYMELT® A-2 or A-4 (Estron Chemical) and about 0.2% Benzoin per total formula weight of the décor particle.

A surfactant or wetting agent that may be used in a décor product or décor particle composition may, for example, promote colorant and/or filler wetting, and/or improve the flow and/or leveling of a finished cured product. In addition, a surfactant or wetting agent may promote substrate wet-out during the cure reaction, which may improve adhesion and/or corrosion resistance. The addition of surfactants may also increase gloss and distinctness of image of the cured film as well. Illustratively, surfactant levels can range from 0.1% to about 0.5% of active substance per total formula weight of the décor particle. Examples of surfactants or wetting agents include cationic, anionic functional organic compounds, silane, and polysiloxane, including, for example, NUOSPERSE™ 657 (manufactured by Elementis Specialties) and SURFYNOL™ 104 S (Air Products and Chemicals, Inc.).

An antioxidant or heat stabilizer may be used in a décor particle composition to, for example, inhibit or prevent heat induced yellowing during the curing and/or heating cycle. Illustratively, an antioxidant or heat stabilizer may be used in a white or relatively light colored décor particle composition in an amount from about 0.2% to about 0.5% of active substance per total formula weight of the décor particle. More or less antioxidant or heat stabilizer may be used with other colored décor particles. Examples of antioxidants include Irganox 1076 (Ciba Specialty Chemicals Corp.) and Irganox B-225 Ciba Specialty Chemicals Corp.). An example of a heat stabilizer is Sandostab P-EPQ (Clariant).

An ultraviolet light absorber can be added to a décor particle composition to, for example, improve ultraviolet resistance (for example, weatherability) of a cured finished product. Used in combination with antioxidants and/or heat stabilizers, the performance of ultraviolet absorbers can be further enhanced.

A wax may be added to a décor particle composition to, for example, control the gloss and/or flow of a cured décor product. A wax may also be used to add texturing to a cured décor product. Additionally, some wax additives may improve mar and scratch resistance of a cured décor product. Illustratively, a wax from a natural product, such as Carnauba wax, beeswax, hydrocarbon compounds, halogenated hydrocarbons, and PTFE comprise a large percentage of waxes and may be used in the décor product and/or décor particle composition. Examples of wax additives include DT3329-1 (Ciba Geigy), Castor Wax, Powder Tex 61 (Shamrock Technologies, Inc.), Lanco® TF-1778 (available from Noveon Inc.), and Lanco® PP-1362D (available from Noveon, Inc.).

A silicone additive may also be added to a décor particle composition to improve, for example, mar and scratch resistance of a cured décor product. Although not wishing to be held by theory, it is believed that the silicone additives reduce the coefficient of friction that may affect, for example, inter-coat adhesion in a two-coat system. Examples of silicone additives include polysiloxane and silicone oil.

Catalysts such as 2-Propyl imidazole may be added to a décor particle composition to, for example, accelerate cure speed, lower cure temperature, and/or improve physical and/or chemical properties of the cured product.

Texturing agents may be added to a décor particle composition to, for example, alter and/or manipulate the viscosity of the composition.

Electrical charge control additives may be added to a décor particle composition to, for example, control transfer efficiency. Examples include TINUVIN® 144 (Ciba Specialty Chemicals), barium titanate, and quaternary ammonium salts.

Electrical conductivity additives may be added to a décor particle composition to, for example, dissipate electrical charge in the composition and/or finished product. The electrical conductivity additives may be, for example, filler-like, pigment-like, or wax-like in nature.

Processing aids may be added to a décor particle composition to, for example, facilitate processing of the composition. Processing aids are well known to those skilled in the art.

Colorants may be added to a décor particle composition to, for example, obtain a desired color. Illustrative pigments include organic and inorganic pigments, including, for example, titanium dioxide, iron oxide red, iron oxide yellow, iron oxide black, heat stabilized iron oxide, calcinated mixed metal oxide, diarylide, condensated disazo, and phthalo blue. Illustrative colorants and amounts that may be used individually or in combination in the décor product and/or décor particle composition are provided below in Table No. 8.

TABLE NO. 8

| Pigments. | |
|---|---|
| Colorant | Approx. Weight % |
| Titanium Dioxide | 1-40 |
| Iron Oxide Yellow (C.I. Yellow 14) | 2-20 |
| HR-70 Yellow (Organic Pigment) | 1.5-2 |
| 274-0033 (Organic Pigment) | 0.3-2 |
| RT-172-D (Organic Pigment) | 0.5-5 |

TABLE NO. 8-continued

| Pigments. | |
|---|---|
| Colorant | Approx. Weight % |
| F5RK-A (Organic Pigment) | 0.5-3.0 |
| 15-1101 AR (Organic Pigment) | 0.5-5 |
| Iron Oxide Black (C.I. Black 11) | 0.5-2 |
| Iron Oxide Red (C.I. Red 101) | 1.5-20 |
| Ultra Marine Blue (C.I. Blue 29) | 15-25 |

Numerous other organic and inorganic colorants known to those skilled in the art may be utilized in the compositions herein described.

A filler may also be added to a décor particle composition. Two illustrative fillers include calcium carbonate and barium sulfate ($CaCO_3$ and $BaSO_4$, respectively, both manufactured by Fisher Chemicals). The calcium carbonate fillers added to the décor product and/or décor particle compositions may, for example, reduce gloss, as well as the flow of an applied finish at higher concentrations. Wollastonite-type fillers may also be utilized as fillers in the décor product and/or décor particle compositions. Talcum, clay, dolomite, and magnesium-aluminum-silicate in powder form, usually ground to 1-10 microns average particle size, or micron sized glass beads, may also be used as fillers to obtain specific properties, such as, for example, corrosion resistance, gloss control, and/or film texture.

Illustratively, a décor product is applied to a surface to achieve a film thickness of about 0.004 mils to about 2.2 mils (about 0.01 microns to about 56 microns) upon curing of the décor product.

A décor particle formulation such as those embracing low temperature cure epoxy chemistry, low temperature cure epoxy-polyester hybrid chemistry, low temperature cure polyester-TGIC chemistry may be prepared in accordance with the following general processing procedure.

Formulation constituents are dry mixed either through low-intensity tumble-mixing or through high-intensity dry-blending performed in a mixer containing a vertical or horizontal mixing shaft with blades rotating at 50-1,000 rpm. Formulations are low-intensity tumble-mixed for about 5 to about 20 minutes, for example, or high-intensity dry-mixed for about 1 to about 5 minutes, for example, depending on batch size. Mixing serves to homogenize the active chemical ingredients and to disperse inert ingredients for enhanced color consistency and to avoid protrusions in applied films. Batch sizes may range from quarts to kiloliters in size. After dry-blending, the temperature of the mixture is maintained at or below about 40° C. to prevent lumping or meltdown.

The mixtures are extruded within minutes to hours after dry-mixing. Single screw extruders with reciprocating screw shaft movements, also called co-kneaders, and twin screw extruders with co-rotating screw shafts are suitable extruders, as well as planetary extruders, counter-rotating twin screw extruders, or single screw extruders. Illustrative extruder size ranges from table-top laboratory models with 10-30 mm screw diameters and 1-5 kg per hour theoretical outputs to production models with 30 to over 300 mm screw diameters and 100 kg to over 2,000 kg per hour theoretical outputs.

The extruders for processing may be heated via water, oil, or electrical heat jacket located on the outside of the extruder barrels. Extruder barrel processing temperatures may range from about 70° C. to about 125° C., though temperatures outside this range may be used to achieve desired properties in some applications. Some extruder barrel heaters utilized in the powder processing may be segmented, in which case, the premix intake zone of the extruder may be run cold or at a minimal heat of about 40° C. to about 50° C. Depending on extruder and screw design, a barrel heat of about 100° C.±15° C. is adequate for processing highly-reactive, low temperature cure powder coating formulas. The screws may have a helical section in the premix intake area and "paddle" sections for dispersing and melt-mixing the extrudate. Residence time of the extrudate within the extruder typically does not exceed about 60 seconds. The production extruders used for processing the powder coatings are run between about 50 and about 750 rpm screw speed. Screw speeds and extruder barrel temperatures are selected to obtain between about 50% to about 90% torque. Extrudate temperatures range from about 100° C. to about 125° C. as a result of extruder barrel heat and frictional heat from the rotating screws. The extrudate is immediately cooled after exiting the extruder to solidify the material for further processing and to arrest chemical reactions. The extrudate is gravity-fed into counter-rotating chill rolls set about 1.5 to about 3 mm apart. The resulting extrudate sheet is transported on a cooling belt to a flaker or crusher unit where the sheet is broken into flakes under about 1 inch square in size. Cooling belt temperatures from about 5° C. to about 35° C. are maintained during processing. The resulting flakes are milled and characterized using air classifying mills (ACM), cyclones, and sieves, to determine particle size distributions and mean particle sizes. Illustratively, a particle size distribution for a décor particle ranges from about 90% by volume or more of the particles having a size less than about 100 microns, or less than about 25 microns, or less than about 10 microns, or from about 0.1 to about 50 microns, or from about 1 to about 20 microns, or from about 3 to about 10 microns, or from greater than about 750 nm to about 100 microns, or larger or smaller particle sizes depending on the desired application. All equipment is purged after processing different formulas or colors to avoid chemical or color cross-contamination.

An emulsified décor product may be prepared in accordance with the following general processing procedure. In a one-gallon glass container, initially an emulsifier is added to a powder, such as a NATURA™ toner and/or a décor particle and mixed to thoroughly coat the powder with the emulsifier. Water is then added to the powder and emulsifier mixture and is blended using an IKA-Werke Eurostar power basic mixer at a speed of about 750 rpm for about 4 hours. Additional additives may be added if so desired at any point during preparation of the décor product. After the 4 hour blending period, the mixture is further mixed by continuously mixing at room temperature on an magnetic stir/heat plate (Isotemp #409N0063 available from Fisher-Scientific) with a 2-inch magnetic stir bar at 100 rpm for an additional 24 hours. Illustratively, an emulsified décor product composition may include the following constituents as shown below in Table No. 9.

TABLE NO. 9

Emulsified Décor Product Composition.

| Constituents | Approx. Weight % |
|---|---|
| Water | 70-97 |
| Surfactant | 0.1-5 |
| Powder | 1.1-40 |
| Adhesive | 0-10 |
| Additive | 0.1-5 |

The present disclosure is further illustrated by the following examples, which should not be construed as limiting in any way. Unless otherwise stated, all percentages recited in these examples are weight percents based on total specified composition weight.

EXAMPLES

The décor particle compositions of examples 1-24 were prepared using the general processing procedure described above by blending (mixing) and processing the constituents on a 19 mm APV laboratory twin screw extruder (Model No. MP19TC-25, manufactured by Baker Perkins) with co-rotating screws at 100° C. barrel temperature, 400 rpm screw speed, and 50% to 90% torque. The extrudate was cooled on chill rolls that resulted in 3/32 inch (about 3 mm) thick solid extrudate sheets. The sheets were broken into flakes no larger than 1 square inch (6.45 cm$^2$) in size. The flakes were ground on air-cooled jet mills and classified to a particle size range of about 0 microns to about 20 microns. The décor products of examples 25-28 was prepared using the general processing procedure described above by mixing the décor particle or toner and emulsifier for a period of time until the décor particles or toner were coated with the emulsifying agent or agents. Water was then added and thoroughly mixed as described above.

In the composition of Table Nos. 10-25, the trademark KUKDO® KD-242G (manufactured by Kukdo Chemical Co., LTD) is a type 3 bisphenol-A epoxy resin with an epoxy equivalent weight of about 700 g/eq. In the composition of Table Nos. 10-17, Huntsman Hardener XB 3086 (manufactured by Huntsman Advanced Materials) is a proprietary phenolic curative containing phenol, 4,4'-(1-methylethylidene) bis-, polymer with 2,2'-[(1-methylethylidene)bis(4,1-phenyleneoxymethylene)]bis[oxirane] (commonly described as a polymer of epoxy resin and bisphenol A), a confidential accelerator, and phenol, 4,4'-(1-methylethylidene)bis- (commonly known as bisphenol A). In the composition of Table Nos. 18-25, Actiron NXJ-60 (manufactured by Advanced Technology & Industrial Co.) is a 2-propylimidazole catalyst. In the composition of Table Nos. 10-13, 18-21, and 26-29, the trademark TI-PURE® TiO$_2$ R-960 (manufactured by E.I. du Pont de Nemours and Company) is a titanium oxide white pigment. In the composition of Table Nos. 11-12, 14-15, 19-20, 22-23, 27, and 30-31, Y 10M (CAS. No. 51274-00-1, manufactured by ABCR) is an iron oxide yellow pigment. In the composition of Table Nos. 11, 19, and 27-29, 274-0033 (CAS No. 5468-75-7, manufactured by ABCR) is a yellow pigment having the chemical formula of 2,2'-((3,3'-dichloro (1,1'-biphenyl)-4,4'-diyl)bis(azo))bis(N-(2-M-ehylphenyl)-3-oxobutyramide). In the composition of Table Nos. 11, 19, and 27, HR-70 Yellow (manufactured by Clariant) is a yellow organic pigment. In the compositions of Table Nos. 26-33 the trademark RUCOTE® 921 polyester (manufactured by Bayer Material Science, LLC) is a low viscosity carboxyl functional polyester having an acid value of 38 mg KOH/g, a hydroxyl number 6 mg KOH/g, a viscosity of 1800 ICI cone and plate at 200° C./cPs, and a Tg of 60° C.

Example 1

Preparation of a White Low Temperature Cure Epoxy Décor Particle

A white low temperature cure epoxy-based décor particle having the composition shown in Table No. 10 below was prepared in the manner described above.

TABLE NO. 10

White Low Temperature Cure Epoxy Composition.

| Constituents | (wt %) |
|---|---|
| KD-242G Epoxy | 48 |
| Huntsman Hardener XB 3086 | 10 |
| P-67 | 1 |
| Oxymelt A-2 | 1 |
| $TiO_2$ R-960 | 40 |

Example 2

Preparation of a Yellow Low Temperature Cure Epoxy Décor Particle

A yellow low temperature cure epoxy-based décor particle having the composition shown in Table No. 11 below was prepared in the manner described above.

TABLE NO. 11

Yellow Low Temperature Cure Epoxy Décor Particle Composition.

| Constituents | (wt %) |
|---|---|
| KD-242G Epoxy | 49 |
| Huntsman Hardener XB 3086 | 11 |
| P-67 | 1 |
| Oxymelt A-2 | 1 |
| $TiO_2$ R-960 | 20 |
| Y 10M Iron Oxide Yellow Pigment | 4 |
| 274-0033 | 2.2 |
| HR-70 Yellow Pigment | 1.8 |
| $BaSO_4$ | 10 |

Example 3

Preparation of a Red Low Temperature Cure Epoxy Décor Particle

A red low temperature cure epoxy-based décor particle having the composition shown in Table No. 12 below was prepared in the manner described above.

TABLE NO. 12

Red Low Temperature Cure Epoxy Décor Particle Composition.

| Constituents | (wt %) |
|---|---|
| KD-242G Epoxy | 48.5 |
| Huntsman Hardener XB 3086 | 10.3 |
| P-67 | 1 |
| Oxymelt A-2 | 1.04 |
| $TiO_2$ R-960 | 5.13 |
| Y 10M Iron Oxide Yellow Pigment | 0.03 |
| RT-172-D Pigment | 2.5 |
| F5RK-A Pigment | 1.5 |
| $BaSO_4$ | 30 |

Example 4

Preparation of a Blue Low Temperature Cure Epoxy Décor Particle

A blue low temperature cure epoxy-based décor particle having the composition shown in Table No. 13 below was prepared in the manner described above.

TABLE NO. 13

Blue Low Temperature Cure Epoxy Décor Particle Composition.

| Constituents | (wt %) |
|---|---|
| KD-242G Epoxy | 49.25 |
| Huntsman Hardener XB 3086 | 10.75 |
| P-67 | 1 |
| Oxymelt A-2 | 1.05 |
| $TiO_2$ R-960 | 15. |
| 15-1101 A4R Pigment | 2.5 |
| BK 5099 | 0.45 |
| $BaSO_4$ | 20 |

Example 5

Preparation of a Brown Low Temperature Cure Epoxy Décor Particle

A brown low temperature cure epoxy-based décor particle having the composition shown in Table No. 14 below was prepared in the manner described above.

TABLE NO. 14

Brown Low Temperature Cure Epoxy Décor Particle Composition.

| Constituents | (wt %) |
|---|---|
| KD-242G Epoxy | 51.67 |
| Huntsman Hardener XB 3086 | 9.13 |
| P-67 | 1 |
| Oxymelt A-2 | 1 |
| $TiO_2$ RCL-6 | 1.18 |
| Y 10M Iron Oxide Yellow Pigment | 2.54 |
| BK 5099 | 2 |
| RO 8097 | 1.48 |
| $BaSO_4$ | 30 |

Example 6

Preparation of an Iron Oxide Yellow Low Temperature Cure Epoxy Décor Particle

An iron oxide yellow low temperature cure epoxy-based décor particle having the composition shown in Table No. 15 below was prepared in the manner described above.

TABLE NO. 15

Iron Oxide Yellow Low Temperature Cure Epoxy Décor Particle Composition.

| Constituents | (wt %) |
|---|---|
| KD-242G Epoxy | 57.8 |
| Huntsman Hardener XB 3086 | 10.2 |
| P-67 | 1 |
| Oxymelt A-2 | 1 |

TABLE NO. 15-continued

| Iron Oxide Yellow Low Temperature Cure Epoxy Décor Particle Composition. | |
|---|---|
| Constituents | (wt %) |
| Y 10M Iron Oxide Yellow Pigment | 20 |
| BaSO$_4$ | 10 |

Example 7

Preparation of a Iron Oxide Red Low Temperature Cure Epoxy Décor Particle

An iron oxide red low temperature cure epoxy-based décor particle having the composition shown in Table No. 16 below was prepared in the manner described above.

TABLE NO. 16

| Iron Oxide Red Low Temperature Cure Epoxy Décor Particle Composition. | |
|---|---|
| Constituents | (wt %) |
| KD-242G Epoxy | 57.8 |
| Huntsman Hardener XB 3086 | 10.2 |
| P-67 | 1 |
| Oxymelt A-2 | 1 |
| RO 8097 | 20 |
| BaSO$_4$ | 10 |

Example 8

Preparation of an Ultra Marine Blue Low Temperature Cure Epoxy Décor Particle

An ultra marine blue low temperature cure epoxy-based décor particle having the composition shown in Table No. 17 below was prepared in the manner described above.

TABLE NO. 17

| Ultra Marine Blue Low Temperature Cure Epoxy Décor Particle Composition. | |
|---|---|
| Constituents | (wt %) |
| KD-242G Epoxy | 57.8 |
| Huntsman Hardener XB 3086 | 10.2 |
| P-67 | 1 |
| Oxymelt A-2 | 1 |
| UMB-304 | 20 |
| BaSO$_4$ | 10 |

Example 9

Preparation of a White Low Temperature Cure Epoxy-Polyester Hybrid Décor Particle A white low temperature cure epoxy-polyester hybrid décor particle having the composition shown in Table No. 18 below was prepared in the manner described above.

TABLE NO. 18

| White Low Temperature Cure Epoxy-Polyester Hybrid Décor Particle Composition. | |
|---|---|
| Constituents | (wt %) |
| KD-242G Epoxy | 28.5 |
| SP 3320 Hybrid Polyester | 29 |
| P-67 | 1 |
| Actiron NXJ-60 | 0.5 |
| Oxymelt A-2 | 1 |
| TiO$_2$ R-960 | 40 |

Example 10

Preparation of a Yellow Low Temperature Cure Epoxy-Polyester Hybrid Décor Particle A yellow low temperature cure epoxy-polyester hybrid décor particle having the composition shown in Table No. 19 below was prepared in the manner described above.

TABLE NO. 19

| Yellow Low Temperature Cure Epoxy-Polyester Hybrid Décor Particle Composition. | |
|---|---|
| Constituents | (wt %) |
| KD-242G Epoxy | 29.75 |
| SP 3320 Hybrid Polyester | 29.75 |
| P-67 | 1 |
| Actiron NXJ-60 | 0.5 |
| Oxymelt A-2 | 1 |
| TiO$_2$ R-960 | 20 |
| Y 10M Iron Oxide Yellow Pigment | 4 |
| 274-0033 Pigment | 2.2 |
| HR-70 Yellow Pigment | 1.8 |
| BaSO$_4$ | 10 |

Example 11

Preparation of a Red Low Temperature Cure Epoxy-Polyester Hybrid Décor Particle

A red low temperature cure epoxy-polyester hybrid décor particle having the composition shown in Table No. 20 below was prepared in the manner described above.

TABLE NO. 20

| Red Low Temperature Cure Epoxy-Polyester Hybrid Décor Particle Composition. | |
|---|---|
| Constituents | (wt %) |
| KD-242G Epoxy | 29.15 |
| SP 3320 Hybrid Polyester | 29.15 |
| P-67 | 1 |
| Actiron NXJ-60 | 0.5 |
| Oxymelt A-2 | 1.04 |
| TiO$_2$ R-960 | 5.13 |
| Y 10M Iron Oxide Yellow Pigment | 0.03 |
| RT-172-D Pigment | 2.5 |
| F5RK-A Pigment | 1.5 |
| BaSO$_4$ | 30 |

Example 12

Preparation of a Blue Low Temperature Cure Epoxy-Polyester Hybrid Décor Particle A blue low temperature cure epoxy-polyester hybrid décor particle having the composition shown in Table No. 21 below was prepared in the manner described above.

TABLE NO. 21

Blue Low Temperature Cure Epoxy-Polyester Hybrid Décor Particle Composition.

| Constituents | (wt %) |
|---|---|
| KD-242G Epoxy | 29.75 |
| SP 3320 Hybrid Polyester | 29.75 |
| P-67 | 1 |
| Actiron NXJ-60 | 0.5 |
| Oxymelt A-2 | 1.05 |
| TiO$_2$ R-960 | 15 |
| 15-1101 A4R Pigment | 2.5 |
| BK 5099 | 0.45 |
| BaSO$_4$ | 20 |

Example 13

Preparation of a Brown Low Temperature Cure Epoxy-Polyester Hybrid Décor Particle A brown low temperature cure epoxy-polyester hybrid décor particle having the composition shown in Table No. 22 below was prepared in the manner described above.

TABLE NO. 22

Brown Low Temperature Cure Epoxy-Polyester Hybrid Décor Particle Composition.

| Constituents | (wt %) |
|---|---|
| KD-242G Epoxy | 30.1 |
| SP 3320 Hybrid Polyester | 30.2 |
| P-67 | 1 |
| Actiron NXJ-60 | 0.5 |
| Oxymelt A-2 | 1 |
| TiO$_2$ RCL-6 | 1.18 |
| Y 10M Iron Oxide Yellow Pigment | 2.54 |
| BK 5099 | 2 |
| RO 8097 | 1.48 |
| BaSO$_4$ | 30 |

Example 14

Preparation of an Iron Oxide Yellow Low Temperature Cure Epoxy-Polyester Hybrid Décor Particle An iron oxide yellow low temperature cure epoxy-polyester hybrid décor particle having the composition shown in Table No. 23 below was prepared in the manner described above.

TABLE NO. 23

Iron Oxide Yellow Low Temperature Cure Epoxy-Polyester Hybrid Décor Particle Composition.

| Constituents | (wt %) |
|---|---|
| KD-242G Epoxy | 33.75 |
| SP 3320 Hybrid Polyester | 33.75 |
| P-67 | 1 |
| Actiron NXJ-60 | 0.5 |
| Oxymelt A-2 | 1 |
| Y 10M Iron Oxide Yellow Pigment | 20 |
| BaSO$_4$ | 10 |

Example 15

Preparation of an Iron Oxide Red Low Temperature Cure Epoxy-Polyester Hybrid Décor Particle An iron oxide red low temperature cure epoxy-polyester hybrid décor particle having the composition shown in Table No. 24 below was prepared in the manner described above.

TABLE NO. 24

Iron Oxide Red Low Temperature Cure Epoxy-Polyester Hybrid Décor Particle Composition.

| Constituents | (wt %) |
|---|---|
| KD-242G Epoxy | 33.75 |
| SP 3320 Hybrid Polyester | 33.75 |
| P-67 | 1 |
| Actiron NXJ-60 | 0.5 |
| Oxymelt A-2 | 1 |
| RO 8097 | 20 |
| BaSO$_4$ | 10 |

Example 16

Preparation of an Ultra Marine Blue Low Temperature Cure Epoxy-Polyester Hybrid Décor Particle An ultra marine blue temperature cure epoxy-polyester hybrid décor particle having the composition shown in Table No. 25 below was prepared in the manner described above.

TABLE NO. 25

Ultra Marine Blue Low Temperature Cure Epoxy-Polyester Hybrid Décor Particle Composition.

| Constituents | (wt %) |
|---|---|
| KD-242G Epoxy | 33.75 |
| SP 3320 Hybrid Polyester | 33.75 |
| P-67 | 1 |
| Actiron NXJ-60 | 0.5 |
| Oxymelt A-2 | 1 |
| UMB-304 | 20 |
| BaSO$_4$ | 10 |

Example 17

Preparation of a White Low Temperature Cure Polyester-TGIC Décor Particle

A white low temperature cure polyester-TGIC décor particle having the composition shown in Table No. 26 below was prepared in the manner described above.

TABLE NO. 26

| White Low Temperature Cure Polyester-TGIC Décor Particle Composition. | |
|---|---|
| Constituents | (wt %) |
| Rucote 921 Polyester | 54 |
| TGIC | 4 |
| P-67 | 1 |
| Oxymelt A-2 | 1 |
| $TiO_2$ R-960 | 40 |

Example 18

Preparation of a Yellow Low Temperature Cure Polyester-TGIC Décor Particle

A yellow low temperature cure polyester-TGIC décor particle having the composition shown in Table No. 27 below was prepared in the manner described above.

TABLE NO. 27

| Yellow Low Temperature Cure Polyester-TGIC Décor Particle Composition. | |
|---|---|
| Constituents | (wt %) |
| Rucote 921 Polyester | 55.75 |
| TGIC | 4.25 |
| P-67 | 1 |
| Oxymelt A-2 | 1 |
| $TiO_2$ R-960 | 20 |
| Y 10M Iron Oxide Yellow Pigment | 4 |
| 274-0033 Pigment | 2.2 |
| HR-70 Yellow Pigment | 1.8 |
| $BaSO_4$ | 10 |

Example 19

Preparation of a Red Low Temperature Cure Polyester-TGIC Décor Particle

A red low temperature cure polyester-TGIC décor particle having the composition shown in Table No. 28 below was prepared in the manner described above.

TABLE NO. 28

| Red Low Temperature Cure Polyester-TGIC Décor Particle Composition. | |
|---|---|
| Constituents | (wt %) |
| Rucote 921 Polyester | 54.6 |
| TGIC | 4.2 |
| P-67 | 1 |
| Oxymelt A-2 | 1.04 |
| $TiO_2$ R-960 | 5.13 |
| 274-0033 Pigment | 0.03 |
| RT-172-D | 2.5 |

TABLE NO. 28-continued

| Red Low Temperature Cure Polyester-TGIC Décor Particle Composition. | |
|---|---|
| Constituents | (wt %) |
| F5RK-A | 1.5 |
| $BaSO_4$ | 30 |

Example 20

Preparation of a Blue Low Temperature Cure Polyester-TGIC Décor Particle

A blue low temperature cure polyester-TGIC décor particle having the composition shown in Table No. 29 below was prepared in the manner described above.

TABLE NO. 29

| Blue Low Temperature Cure Polyester-TGIC Décor Particle Composition. | |
|---|---|
| Constituents | (wt %) |
| Rucote 921 Polyester | 55.75 |
| TGIC | 4.25 |
| P-67 | 1 |
| Oxymelt A-2 | 1.05 |
| $TiO_2$ R-960 | 15 |
| 274-0033 Pigment | 0.03 |
| 15-1101 A4R Pigment | 2.5 |
| BK 5099 | 0.45 |
| $BaSO_4$ | 20 |

Example 21

Preparation of a Brown Low Temperature Cure Polyester-TGIC Décor Particle

A brown low temperature cure polyester-TGIC décor particle having the composition shown in Table No. 30 below was prepared in the manner described above.

TABLE NO. 30

| Brown Low Temperature Cure Polyester-TGIC Décor Particle Composition. | |
|---|---|
| Constituents | (wt %) |
| Rucote 921 Polyester | 56.5 |
| TGIC | 4.3 |
| P-67 | 1 |
| Oxymelt A-2 | 1 |
| $TiO_2$ RCL-6 | 1.18 |
| Y 10M Iron Oxide Yellow Pigment | 2.54 |
| BK 5099 | 2 |
| RO 8097 | 1.48 |
| $BaSO_4$ | 30 |

Example 22

Preparation of an Iron Oxide Yellow Low Temperature Cure Polyester-TGIC Décor Particle An iron oxide yellow low temperature cure polyester-TGIC décor particle having the composition shown in Table No. 31 below was prepared in the manner described above.

TABLE NO. 31

Iron Oxide Yellow Low Temperature Cure Polyester-TGIC Décor Particle Composition.

| Constituents | (wt %) |
|---|---|
| Rucote 921 Polyester | 63.3 |
| TGIC | 4.7 |
| P-67 | 1 |
| Oxymelt A-2 | 1 |
| Y 10M Iron Oxide Yellow Pigment | 20 |
| BaSO$_4$ | 10 |

Example 23

Preparation of an Iron Oxide Red Low Temperature Cure Polyester-TGIC Décor Particle An iron oxide red low temperature cure polyester-TGIC décor particle having the composition shown in Table No. 32 below was prepared in the manner described above.

TABLE NO. 32

Iron Oxide Red Low Temperature Cure Polyester-TGIC Décor Particle Composition.

| Constituents | (wt %) |
|---|---|
| Rucote 921 Polyester | 63.3 |
| TGIC | 4.7 |
| P-67 | 1 |
| Oxymelt A-2 | 1 |
| RO 8097 | 20 |
| BaSO$_4$ | 10 |

Example 24

Preparation of a Ultra Marine Blue Low Temperature Cure Polyester-TGIC Décor Particle An ultra marine blue temperature cure polyester-TGIC décor particle having the composition shown in Table No. 33 below was prepared in the manner described above.

TABLE NO. 33

Ultra Marine Blue Low Temperature Cure Polyester-TGIC Décor Particle Composition.

| Constituents | (wt %) |
|---|---|
| Rucote 921 Polyester | 63.3 |
| TGIC | 4.7 |
| P-67 | 1 |
| Oxymelt A-2 | 1 |
| UMB-304 | 20 |
| BaSO$_4$ | 10 |

Example 25

Preparation of a Blue Low Temperature Cure Epoxy Décor Product

A blue low temperature cure epoxy-based décor product having the composition shown in Table No. 34 below was prepared in the manner described above.

TABLE NO. 34

Blue Low Temperature Cure Epoxy Décor Product Composition.

| Constituents | (wt %) |
|---|---|
| Water | 96.85 |
| ALCOPRINT ™ PTU | 0.15 |
| Composition of Table No. n13 | 3 |

Example 26

Preparation of a Blue Low Temperature Cure Epoxy-Polyester Hybrid Décor Product

A blue low temperature cure epoxy-polyester hybrid décor product having the composition shown in Table No. 35 below was prepared in the manner described above.

TABLE NO. 35

Blue Low Temperature Cure Epoxy-Polyester Hybrid Décor Product Composition.

| Constituents | (wt %) |
|---|---|
| Water | 96.85 |
| ALCOPRINT ™ PTU | 0.15 |
| Composition of Table No. 21 | 3 |

Example 27

Preparation of a Blue Low Temperature Cure Polyester-TGIC Décor Product

A blue low temperature cure polyester-TGIC décor product having the composition shown in Table No. 36 below was prepared in the manner described above.

TABLE NO. 36

Blue Low Temperature Cure Polyester-TGIC Décor Product Composition.

| Constituents | (wt %) |
|---|---|
| Water | 96.85 |
| ALCOPRINT ™ PTU | 0.15 |
| Composition of Table No. 29 | 3 |

Example 28

Preparation of a Blue Low Temperature Cure NATURA® Based Décor Product

A blue low temperature cure NATURA® based décor product having the composition of shown in Table No. 37 below, was prepared in the manner described above. Blue (cyan) NATURA® toner and clear NATURA® toner from Sawgrass Technologies, Inc. were purchased from ACP Technologies (I.D. Nos. 127 and 131, respectively).

TABLE NO. 37

Blue Low Temperature NATURA ® Based Décor Product.

| Constituents | (wt %) |
|---|---|
| Water | 96.85 |
| ALCOPRINT ™ PTU | 0.15 |
| Blue NATURA ® Toner | 1.5 |
| Clear NATURA ® Toner | 1.5 |

Example 29

Application, Affixation, Reversibility and Durability of the Décor Products of Examples 25-28 on a Soft Surface Décor products of the present disclosure were tested for the ability to be applied to a nylon test carpet, removal (reversibility) from the nylon test carpet prior to an affixation step, affixation to the nylon test carpet using heat as the energy source, and durability after affixation to the nylon test carpet.

The four individual décor products of Examples 25-28 were thoroughly mixed and individually placed into 8 oz. PET bottles with finger pump fine mist sprayers having an output of 60 micron particle size (N2862524410WHT3, bottle neck—24/410; available from ebottles.com, Inc.). Four two-foot by two-foot pieces of nylon test carpet were vacuumed using a Bissell CLEANVIEW® II vacuum cleaner manufactured by Bissell Homecare, Inc. to remove loose fibers and dirt. The specifications of the nylon test carpet utilized are indicated in Table 38.

TABLE 38

Nylon Test Carpet and Polyester Test Carpet Specifications.

| | Nylon Test Carpet | Polyester Test Carpet |
|---|---|---|
| Style | 7522 Favored One | SP501 |
| Manufacturer | Mohawk Industries | Mohawk Industries |
| Pile Yarn Content | Filament 100% Nylon | Spun 100% Polyester |
| Yarn Twists per inch | 4.25 × 4.25 | 5.0 × 4.8 |
| Fabric Type | Cut Pile | Cut Pile |
| Fiber Treatment | Ultrastrand with soil & stain | Mohawk APP Polyester W/SGC |
| Gauge | 5/32 | 1/8 C |
| Pile Height | 0.485 | 0.440 |
| Stitches per inch | 7.83 | 8.50 |
| Certified Pile Weight | 25.20 oz. | 39.50 oz. |
| Total Weight | 56.29 oz. | 71.03 oz. |
| Density | 1871 | 3232 |
| Dye Method | Fluidye | Beck |
| Primary Backing | Woven Polypropylene | Woven Polypropylene |
| Secondary Backing | Woven Polypropylene | Woven Polypropylene |
| Performance Appearance Retention Rating | 3.50 | 3.25 |

For each of the four pieces of nylon test carpet, the baseline color of each of three spots over which a respective décor product was applied was determined using a Minolta data processor model No. DP-301 combined with a Minolta model No. CR-310 chroma meter (both manufactured by Konica Minolta Sensing Americas, Inc.) that was set to the "L-a-b" setting to record ΔE (color change) and calibrated according to the manufacturer's instructions.

The following tests were performed separately for each of the four décor products of Examples 25-28. Prior to application of the décor product, a stencil made of a disposable absorbent material available from Kimberly-Clark Corp. with a nylon mesh backing was centered on the surface of the nylon test carpet sample. Subsequently, the décor product was applied as a gentle mist to the nylon test carpet from the finger sprayer at distance of 8-10 inches from the nylon test carpet and at a rate to saturate the top surface of the nylon test carpet. The applied décor product was allowed to dry overnight at ambient temperature and humidity on the nylon test carpet. Once dried one half of the applied décor product pattern was removed from the nylon test carpet using a Shop-Vac® 1×1® wet/dry vacuum with hose attachment (1¼ inch diameter×4 feet). The vacuum characteristics include 1 peak horsepower, 115 cubic feet/minute of air flow, 52 inches of sealed pressure, and electrical ratings of 120 V, 60 Hz, and 5.5 A. The pattern was vacuumed twenty times in one direction and then twenty times in the opposite direction over the same area. Once vacuumed, L-a-b measurements were taken from the vacuumed areas of the nylon test carpet with the Minolta data processor and Minolta chroma meter.

The un-vacuumed décor product pattern was subsequently affixed on the nylon test carpet by placing an absorbent paper towel (WYPALL® X60 reinforced wipes from Kimberly-Clark Corp.) over the décor product pattern and heating the décor product pattern using a household iron (Hamilton-Beach Model #14340) set at the highest setting (cotton). Heat was applied through the absorbent paper towel in a circular motion for 2½ minutes per square ft of décor product. Subsequently, the paper towel was removed from the nylon test carpet and L-a-b values were measured on the affixed décor product pattern using the Minolta data processor and Minolta chroma meter specified above.

To determine the resilience of the affixed décor product on the nylon test carpet, one half of the affixed décor product was vacuumed twenty times (using a back and forth motion) with a Shop-Vac® 1×1® wet/dry vacuum with hose attachment. The L-a-b values of the vacuumed and affixed versus the affixed-only (unvacuumed) areas were taken using Minolta data processor combined with a Minolta chroma meter as mentioned above.

Reversibility, affixation, and durability of the décor products of Examples 25-28 are shown below in Table Nos. 39-42.

TABLE NO. 39

Reversibility, Affixation, and Durability of the Blue Low Temperature Cure Epoxy Décor Product of Example 25.

| | L | a | b | ΔE |
|---|---|---|---|---|
| Initial | 55.54 | 4.72 | 11.28 | — |
| Application | 45.53 | 4.83 | −15.43 | 28.52 |
| Reversibility | 51.48 | 4.64 | 9.94 | 4.28 |
| Affixation | 39.11 | 2.51 | −7.66 | 25.17 |
| Durability (vacuumed) | 41.89 | 1.99 | −6.38 | 22.49 |
| Durability (not vacuumed) | 37.09 | 2.55 | −8.66 | 27.25 |

TABLE NO. 40

Reversibility, Affixation, and Durability of the Blue Low Temperature Cure Epoxy-Polyester Hybrid Décor Product of Example 26.

| | L | a | b | ΔE |
|---|---|---|---|---|
| Initial | 53.05 | 5.01 | 11.52 | — |
| Application | 47.00 | 4.19 | −4.35 | 17.00 |
| Reversibility | 50.63 | 4.99 | 10.52 | 2.62 |
| Affixation | 44.01 | 3.31 | 0.39 | 14.44 |
| Durability (vacuumed) | 45.73 | 3.11 | 0.70 | 13.20 |
| Durability (not vacuumed) | 42.72 | 3.67 | −0.20 | 15.68 |

TABLE NO. 41

Reversibility, Affixation, and Durability of the Blue Low Temperature Cure Polyester-TGIC Décor Product of Example 27.

|  | L | a | b | ΔE |
|---|---|---|---|---|
| Initial | 54.85 | 4.78 | 11.23 | — |
| Application | 47.17 | 4.47 | −10.84 | 23.37 |
| Reversibility | 51.47 | 4.78 | 10.48 | 3.46 |
| Affixation | 43.19 | 3.37 | −7.45 | 22.07 |
| Durability (vacuumed) | 42.06 | 3.27 | −6.38 | 21.82 |
| Durability (not vacuumed) | 42.51 | 3.50 | −5.60 | 20.91 |

TABLE NO. 42

Reversibility, Affixation, and Durability of the Blue Low Temperature NATURA ® Based Décor Product of Example 28.

|  | L | a | b | ΔE |
|---|---|---|---|---|
| Initial | 54.95 | 4.79 | 11.31 | — |
| Application | 42.72 | 1.58 | −11.09 | 25.72 |
| Reversibility | 50.89 | 4.70 | 11.37 | 4.06 |
| Affixation | 38.45 | −3.01 | −10.75 | 28.63 |
| Durability (vacuumed) | 37.05 | −2.80 | −8.62 | 27.84 |
| Durability (not vacuumed) | 38.23 | −2.63 | −10.17 | 28.21 |

Example 30

Determination of Glass transition temperatures (Tg) and melting temperatures (Tm) of Surface Substrates Tg and Tm of surface substrates were measured using a Model Q100 Differential Scanning Calorimeter (TA Instruments, Inc.) at a heating rate of 20° C./min. Specifically, in this way, the nylon carpet of Table No. 38 was measured to have a Tg of 40-45° C. and a Tm of 257° C. Further, a polyester carpet of Table No. 38 was measured to have a Tg of 140-150° C. and a Tm of 247° C.

INDUSTRIAL APPLICATION

The method disclosed herein allows for the application of a décor product to be applied to a surface, and more specifically a soft surface such as a carpet, a rug, draperies, curtains, upholstery, and the like. By applying the décor product to the soft surface, perceived aesthetic quality of the soft surface is improved and may extend the useful life of the soft surface before need for replacement.

The disclosure has been presented in an illustrative manner in order to enable a person of ordinary skill in the art to make and use the disclosure, and the terminology used is intended to be in the nature of description rather than of limitation. It is understood that the disclosure may be practiced in ways other than as specifically disclosed, and that all modifications, equivalents, and variations of the present disclosure, which are possible in light of the above teachings and ascertainable to a person of ordinary skill in the art, are specifically included within the scope of the impending claims. All patents, patent publications, and other references cited herein are incorporated herein by reference in their entirety.

What is claimed is:

1. A method of applying a composition to a surface, the method comprising:

applying an effective amount of a composition in a preselected pattern to a selected surface to affect a color change thereon, the composition comprises a colorant, a surface-active agent, at least one of a polymer or a resin, and at least about 70 wt % of a liquid;

allowing the composition to substantially dry on the surface to form substantially dry particles greater than about 1 micron in size attached to the surface; and applying energy to the substantially dry particles to achieve a film greater than about 0.1 micron in thickness on the surface.

2. The method of claim 1, wherein the substantially dry particles are characterized by the ability to be removable from a nylon test carpet by vacuuming that results in a ΔE on the nylon test carpet of about 20 or less.

3. The method of claim 1, wherein the polymer comprises at least one of a thermoset polymer or a thermoplastic polymer.

4. The method of claim 1, wherein the dry particles have a first energy level and the film has a second energy level.

5. The method of claim 1, wherein the composition is formulated to be substantially removed from the selected surface before the step of applying energy to the substantially dry particles.

6. The method of claim 5, wherein the composition further comprises at least one substantially homogeneous décor particle, a first additive, and a liquid carrier, and wherein the décor particle comprises a second additive, the colorant, and at least one of:

an epoxy resin and a curative, an epoxy resin, an acid-terminated polyester resin, and an accelerant, or an acid-terminated polyester resin and a curative.

7. The method of claim 1, wherein the selected surface comprises a soft surface.

8. The method of claim 1, wherein the composition further comprises an additive.

9. The method of claim 8, wherein the additive comprises at least one of a stabilizer, an induction agent, a susceptor, a magnetic responsive agent, a metallic particle, an anti-wicking agent, a thickening agent, an adhesive, a binder, a surfactant, a lubricant, a viscosity modifier, a humectant, a propellant, an inorganic particulate material, or a pH neutralizing agent.

10. The method of claim 1, wherein the energy is applied by at least one of heat, steam, an electromagnetic field, or a chemical.

11. The method of claim 1, wherein the composition further comprises at least one of an ammonia-based chemistry, a water-based chemistry, an acid-based chemistry, an aqueous fabric paint, a thermally releasable coating, a peelable coating agent, a strippable coating agent, or an alkali soluble resin.

12. A method of applying a colorant to a surface, the method comprising:

applying an effective amount of a liquid-based composition containing a colorant in a preselected pattern to a selected surface to affect a color change thereon, the liquid-based composition formulated to be applied in the effective amount to a nylon test carpet and to substantially dry to form particles greater than about 1 micron in size attached thereto, and upon vacuuming of the nylon test carpet resulting in a ΔE of about 20 or less.

13. The method of claim 12, wherein the liquid-based composition comprises a décor product and the method further comprises:

selecting a design device that includes the décor product;

placing the design device adjacent a surface;

applying a release mechanism to the design device, wherein the step of applying of the release mechanism releases the décor product from the design device onto the surface;

removing the design device from the surface;

allowing the décor product to substantially dry on the surface to form a substantially dry décor product attached thereto; and at least one of substantially removing the dry décor product from the surface or substantially affixing the dry décor product thereon;

wherein the dry décor product is formulated to be substantially affixed to the surface and can be substantially removed from the surface before the dry décor product is affixed thereto.

14. The method of claim 12 further comprising:

applying to the surface a consumer aid comprising a color predicting aid and a pattern;

selecting a design device and the liquid-based composition, the liquid-based composition comprising a décor product that is formulated to be substantially affixed to the surface by at least one of chemical curing or mechanical bonding; and applying the décor product to the surface using the design device;

wherein the décor product substantially dries on the surface to form a substantially dry décor product attached thereto and wherein the substantially dry décor particle can be substantially removed from the surface before it is substantially affixed thereto.

15. The method of claim 14, wherein the consumer aid further comprises at least one of a design template, a color matching aid, a color blending sheet, a colorimeter, a color scanner, a color carpet chip, a color chart, or a color graph.

16. The method of claim 12, wherein the step of applying the effective amount of the liquid-based composition to the selected surface further comprises:

selecting a design device;

placing the design device adjacent a soft surface;

applying to a cutout portion of the design device the liquid-based composition that comprises a décor product that is formulated to be substantially affixed to the soft surface upon application of energy thereto;

removing the design device from the soft surface;

allowing the décor product to substantially dry on the soft surface to form a substantially dry décor product attached thereto; and at least one of substantially removing the dry décor product from the soft surface or substantially affixing the dry décor product thereon;

wherein the dry décor product can be substantially removed from the soft surface before application of energy thereto.

17. The method of claim 16, wherein the step of removing of the décor product from the surface comprises a vacuuming process.

18. The method of claim 16, wherein the step of affixing of the décor product to the soft surface comprises exposing the décor product to at least one of heat, steam, an electromagnetic field, or a chemical.

19. The method of claim 18, wherein décor product is affixed over a predetermined period of about 1 microsecond to about 12 hours.

20. The method of claim 18, wherein the décor product is affixed using at least one of chemical curing, mechanical bonding, a heat-emitting tool, an induction field-emitting tool, or a radiation emitting source.

21. The method of claim 16, wherein the décor product is affixed to the soft surface at a temperature less than about 260° C. and has a viscosity of equal to or less than about 2000 centipoises prior to application to the surface.

22. The method of claim 16, wherein the décor product, once applied to the soft surface, is substantially attached to the surface until the décor product is substantially removed or substantially affixed thereto.

23. The method of claim 16, wherein the décor product comprises at least one of a colorant, a particle, or a coating.

24. The method of claim 16, wherein the soft surface is pretreated prior to application of the décor product by at least one of cleaning, vacuuming, steam cleaning, bleaching, pH balancing, adjusting the pH, sweeping, painting, scrubbing, wetting, drying, heating, cooling, sanding, buffing, coating, or removing a coating therefrom.

25. The method of claim 16, wherein the removal of the décor product from the soft surface is facilitated by at least one of a surfactant, a zinc oxide, an alcohol, a blowing agent, a buffering agent, a mildly alkaline solution, a polar solution, a non-polar solution, a detergent, or a soap.

26. The method of claim 16, wherein the décor product is determined to be substantially affixed to the soft surface by using a consumer aid that indicates by a change in color that the décor product is substantially affixed to the surface.

27. The method of claim 16, wherein the design device comprises a stencil having a first layer, a second layer, and a support layer, wherein at least one of the first layer or the second layer comprises at least one of a peripheral edge or a cutout portion, the peripheral edge or cutout portion defining at least one of an indicium, a pattern, a shape, or a design, wherein the cutout portion provides a passage through at least the first layer and the second layer;

wherein the support layer comprises an optional adherent mechanism.

28. The method of claim 16, wherein the décor product comprises on a weight to weight basis:

about 0.1% to about 5% of a surfactant;

about 0% to about 10% of an adhesive;

about 1.1% to about 40% of a powder; and about 0.1% to about 5% of an additive.

29. The method of claim 12, wherein the liquid-based composition comprises a décor product that includes an encapsulated décor particle, wherein the décor particle further comprises a shell, a colorant, and an additive.

30. The method of claim 29, wherein the décor product is allowed to substantially dry on the selected surface to form a substantially dry décor product attached thereto.

31. The method of claim 29 further comprising at least one of removing the substantially dry décor product from the surface or treating the substantially dry décor product to release the colorant and additive from the encapsulated décor particle; wherein the substantially dry décor product is formulated to be substantially removable from the surface prior to being treated.

32. The method of claim 29, wherein the step of treating of the microencapsulated décor particle at least one of breaks, heats, weakens, or dissolves the shell.

33. The method of claim 12, wherein the pattern is applied using a design device that protects a portion of the selected surface from at least one of application, removal, or substantial affixation of the composition.

34. The method of claim 33, wherein the design device is disposed between the selected surface and the liquid-based composition and protects an area adjacent to the preselected pattern from receipt of the liquid-based composition.

35. The method of claim 33, wherein the liquid-based composition is applied to the design device and to the selected surface substantially simultaneously.

36. The method of claim 12, wherein the liquid-based composition comprises an additive and a liquid carrier; wherein the liquid-based composition is formulated to be substantially removable from the surface after being substantially attached thereto.

37. A method of applying a colorant to a surface, the method comprising:

applying to a selected surface in a preselected pattern an effective amount of a liquid-based composition comprising a colorant and a particle having a thermoset polymer to affect a color change thereon, the liquid-based composition formulated to be applied to a nylon test carpet in the effective amount to substantially dry to form particulates greater than about 1 micron in size attached thereto and to result in a ΔE of about 20 or less upon vacuuming of the nylon test carpet.

38. A method of applying a colorant to a surface, the method comprising:

applying to a selected surface in a preselected pattern an effective amount of a water-based composition comprising a colorant and a particle to affect a color change thereon, the water-based composition formulated to be applied to a nylon test carpet in the effective amount to substantially dry to form particulates having a mean particle size of greater than about 1 micron attached thereto and to result in a ΔE of about 20 or less upon vacuuming of the nylon test carpet.

39. A method of affecting a color change on a surface, the method comprising:

applying to a selected surface in a preselected pattern an effective amount of a liquid-based composition comprising a particle having a colorant and a polymer to affect a color change on the surface, the liquid-based composition formulated to be applied to the surface in the effective amount to substantially dry to form particulates greater than about 1 micron in size attached thereto, and to be substantially removable from a textile prior to application of energy to the particulates; and forming a film greater than about 0.1 micron in thickness on the surface by melting the particulates.

40. A method of affecting a color change on a surface, the method comprising:

applying an effective amount of a composition comprising a water-based carrier and at least one of a polymer or a resin to a selected surface to affect a color change thereon, the composition formulated to form substantially dry particles greater than about 1 micron in size upon substantial removal of the water-based carrier; and forming a film greater than about 0.1 micron in thickness on the surface by application of energy sufficient to melt the at least one polymer or resin;

wherein the composition is formulated to result in a ΔE of about 20 or less upon vacuuming of the surface prior to formation of the film.

* * * * *